US011245843B2

(12) United States Patent
Tadano et al.

(10) Patent No.: US 11,245,843 B2
(45) Date of Patent: Feb. 8, 2022

(54) IMAGING APPARATUS AND IMAGING METHOD FOR IMPROVEMENT OF REPRODUCTION IMAGE QUALITY

(71) Applicant: SONY CORPORATION, Tokyo (JP)

(72) Inventors: Ryuichi Tadano, Kanagawa (JP); Hiroshi Yamamoto, Chiba (JP); Sho Nakagawa, Kanagawa (JP); Takayoshi Ozone, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 138 days.

(21) Appl. No.: 16/609,851

(22) PCT Filed: Mar. 5, 2018

(86) PCT No.: PCT/JP2018/008290
§ 371 (c)(1),
(2) Date: Oct. 31, 2019

(87) PCT Pub. No.: WO2018/211781
PCT Pub. Date: Nov. 22, 2018

(65) Prior Publication Data
US 2020/0084375 A1 Mar. 12, 2020

(30) Foreign Application Priority Data
May 18, 2017 (JP) .............................. JP2017-099168

(51) Int. Cl.
H04N 5/232 (2006.01)
H04N 5/225 (2006.01)
(Continued)

(52) U.S. Cl.
CPC ....... H04N 5/23229 (2013.01); G02B 7/1828 (2013.01); G03B 5/00 (2013.01);
(Continued)

(58) Field of Classification Search
CPC .......... H04N 5/23229; H04N 5/23238; H04N 5/2256; H04N 5/232; H04N 5/23258;
(Continued)

(56) References Cited
U.S. PATENT DOCUMENTS
2008/0131107 A1 6/2008 Ueno
2009/0021591 A1 1/2009 Sako
(Continued)

FOREIGN PATENT DOCUMENTS
CN 101350877 A 1/2009
CN 103002187 A 3/2013
(Continued)

OTHER PUBLICATIONS
Extended European Search Report of EP Application No. 18802896.3, dated Apr. 3, 2020, 09 pages.
(Continued)

Primary Examiner — Twyler L Haskins
Assistant Examiner — Akshay Trehan
(74) Attorney, Agent, or Firm — Chip Law Group

(57) ABSTRACT

Information on posture data that can be used for processing on a frame basis can be acquired for moving image data to be captured. For the purpose, in an imaging apparatus including an imaging unit that captures an image by an optical system to generate image data, a posture data generation unit that generates posture data of a casing including the imaging unit at a timing corresponding to the image data, a notification unit that performs notification for correlating the image data with the posture data on the basis of a trigger, and a detector that detects the notification by the notification unit are provided.

20 Claims, 56 Drawing Sheets

(51) Int. Cl.
  *G02B 7/182* (2021.01)
  *G03B 11/04* (2021.01)
  *H04N 5/235* (2006.01)
  *H04N 5/243* (2006.01)
  *H04N 5/06* (2006.01)
  *H04N 5/77* (2006.01)
  *G03B 5/00* (2021.01)
  *G03B 15/00* (2021.01)
  *G03B 17/00* (2021.01)

(52) U.S. Cl.
  CPC ............ *G03B 11/045* (2013.01); *G03B 15/00* (2013.01); *G03B 17/00* (2013.01); *H04N 5/06* (2013.01); *H04N 5/2256* (2013.01); *H04N 5/232* (2013.01); *H04N 5/2353* (2013.01); *H04N 5/23238* (2013.01); *H04N 5/23258* (2013.01); *H04N 5/243* (2013.01); *H04N 5/77* (2013.01); *G03B 11/041* (2013.01)

(58) Field of Classification Search
  CPC ........ H04N 5/2353; H04N 5/243; H04N 5/06; H04N 5/77; G03B 5/00; G03B 11/045; G03B 11/041; G03B 15/00; G03B 17/00; G03B 17/24; G02B 7/1828
  USPC ...................................................... 348/222.1
  See application file for complete search history.

(56) References Cited

U.S. PATENT DOCUMENTS

| | | | |
|---|---|---|---|
| 2010/0302410 A1 | 12/2010 | Naito | |
| 2013/0002892 A1 | 1/2013 | Sako | |
| 2013/0147984 A1 | 6/2013 | Matsui | |
| 2014/0092278 A1 | 4/2014 | Takahashi et al. | |
| 2015/0181121 A1* | 6/2015 | Tohyama | H04N 5/232411 348/222.1 |
| 2015/0334281 A1* | 11/2015 | Shirakawa | H04N 5/2328 348/208.2 |
| 2016/0155224 A1* | 6/2016 | Matsui | H04N 1/00323 348/135 |
| 2016/0165111 A1* | 6/2016 | Uemura | H04N 5/2254 348/208.11 |

FOREIGN PATENT DOCUMENTS

| | | | | |
|---|---|---|---|---|
| CN | 103548337 A | 1/2014 | | |
| CN | 103988123 A | 8/2014 | | |
| CN | 104735345 A | 6/2015 | | |
| CN | 105100593 A | 11/2015 | | |
| CN | 105637413 A | 6/2016 | | |
| DE | 112011105928 T5 | 9/2014 | | |
| DE | 102015107434 A1 | 11/2015 | | |
| EP | 2018038 A2 | 1/2009 | | |
| EP | 2518989 A2 | 10/2012 | | |
| EP | 2717563 A1 | 4/2014 | | |
| EP | 2887643 A1 | 6/2015 | | |
| GB | 2511679 A | 9/2014 | | |
| GB | 2527663 A | 12/2015 | | |
| GB | 2534058 A | 7/2016 | | |
| GN | 103988123 A | 8/2014 | | |
| JP | 11-168657 A | 6/1999 | | |
| JP | 2006-287330 A | 10/2006 | | |
| JP | 2006287330 A | * 10/2006 | ............. | H04N 5/232 |
| JP | 2008-141518 A | 6/2008 | | |
| JP | 2008-193333 A | 8/2008 | | |
| JP | 2008193333 A | * 8/2008 | ............... | G06T 1/00 |
| JP | 4416017 B2 | 2/2010 | | |
| JP | 2010-187354 A | 8/2010 | | |
| JP | 2015-119401 A | 6/2015 | | |
| JP | 2015-216602 A | 12/2015 | | |
| JP | 5920863 B2 | 5/2016 | | |
| JP | 2016-105534 A | 6/2016 | | |
| JP | 2016-149752 A | 8/2016 | | |
| JP | 6071903 B2 | 2/2017 | | |
| JP | 2017-049052 A | 3/2017 | | |
| JP | 6435265 B2 | 12/2018 | | |
| KR | 10-2009-0009123 A | 1/2009 | | |
| KR | 10-2014-0004224 A | 1/2014 | | |
| KR | 10-2015-0085121 A | 7/2015 | | |
| WO | 2012/164807 A1 | 12/2012 | | |
| WO | 2013/084337 A1 | 6/2013 | | |
| WO | 2015/025878 A1 | 2/2015 | | |
| WO | 2017/038680 A1 | 3/2017 | | |

OTHER PUBLICATIONS

Office Action for CN Patent Application No. 201880030954.3 dated Jan. 13, 2021, 07 pages of Office Action and 09 pages of English Translation.
International Search Report and Written Opinion of PCT Application No. PCT/JP2018/008290, dated Apr. 17, 2018, 10 pages of ISRWO.

* cited by examiner

FIG. 38A
FIG. 38B
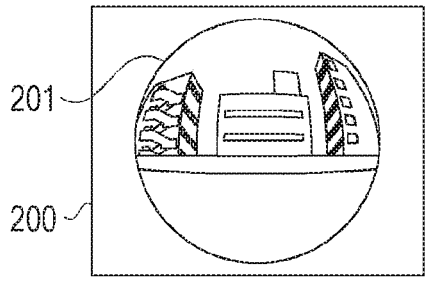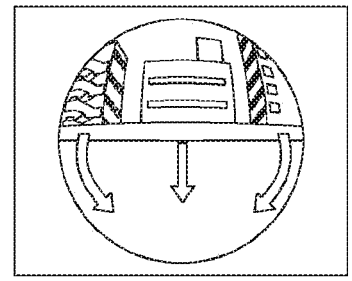
VERTICAL SHAKE
FISHEYE IMAGE: BLUR DIRECTION CHANGES DEPENDING ON POSITION
PROJECT TO VERTICAL CELESTIAL SPHERE
FIG. 38C
FIG. 38D
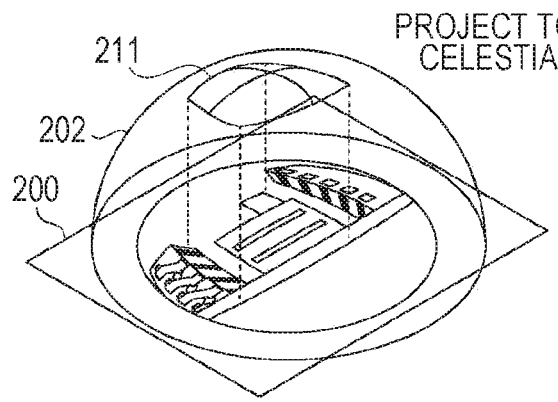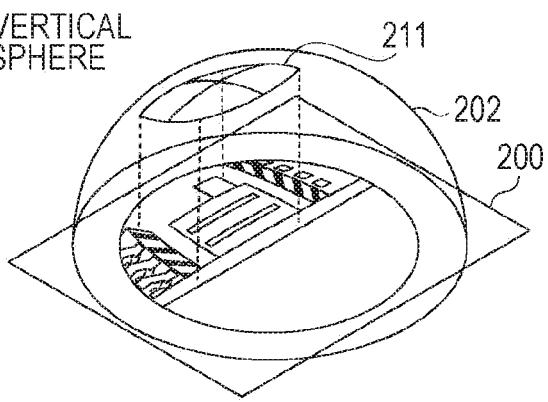
MOTION ON VERTICAL CELESTIAL SPHERICAL SURFACE:
COMMON IN ENTIRE SCREEN
CANCEL CAMERA SHAKE BY CHANGING CUT-OUT POSITION
CUT-OUT AND DISTORTION CORRECTION
FIG. 38E
FIG. 38F
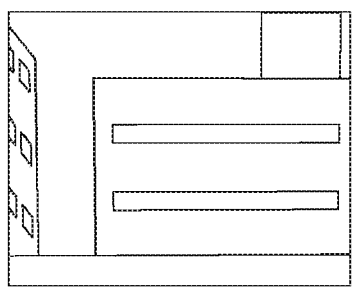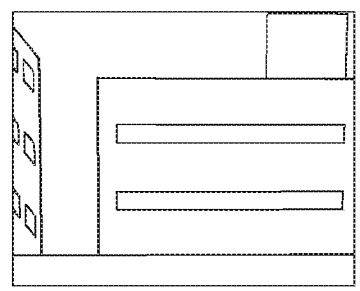
STABLE IMAGE WITH NO BLUR FIG. 39A
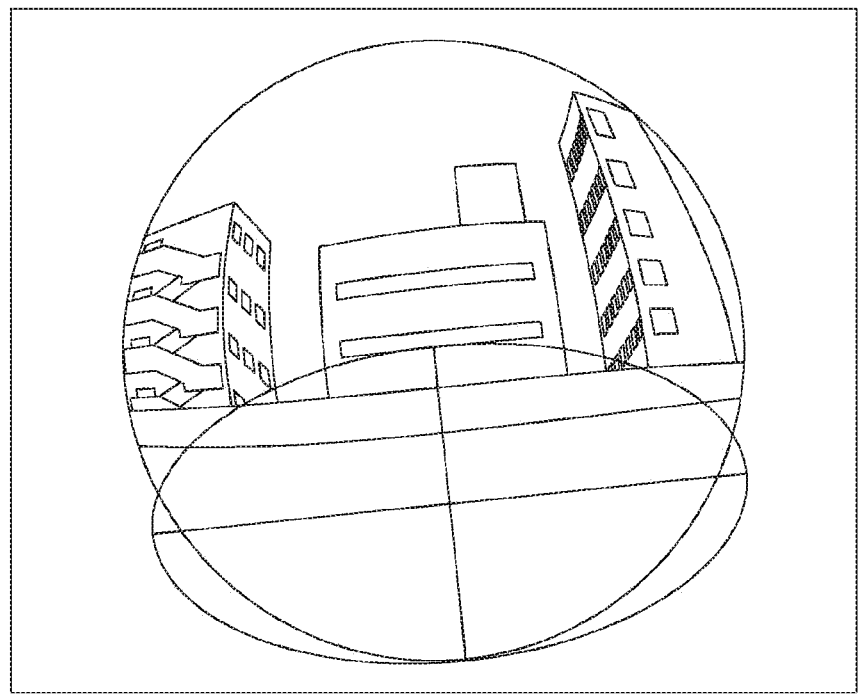
FIG. 39B
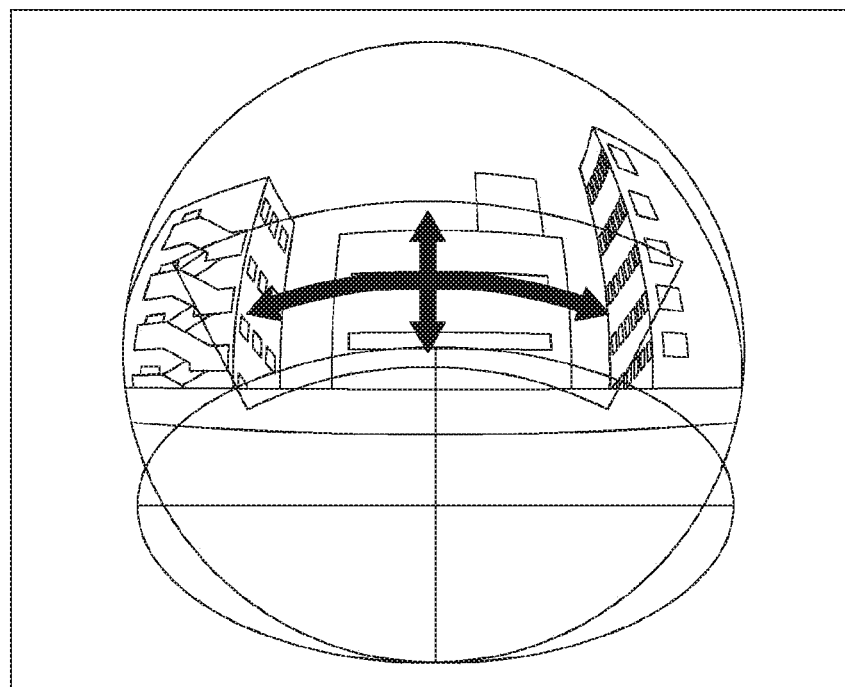

FIG. 44
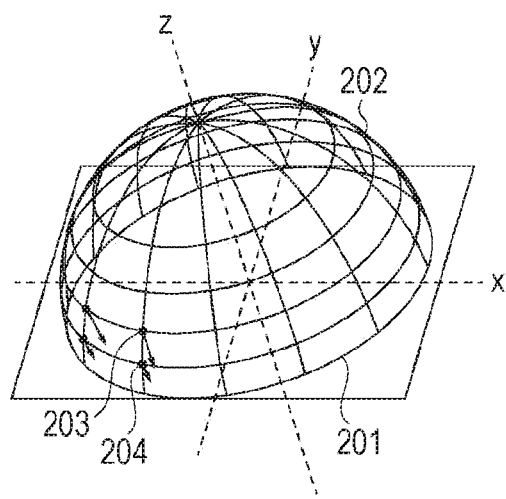
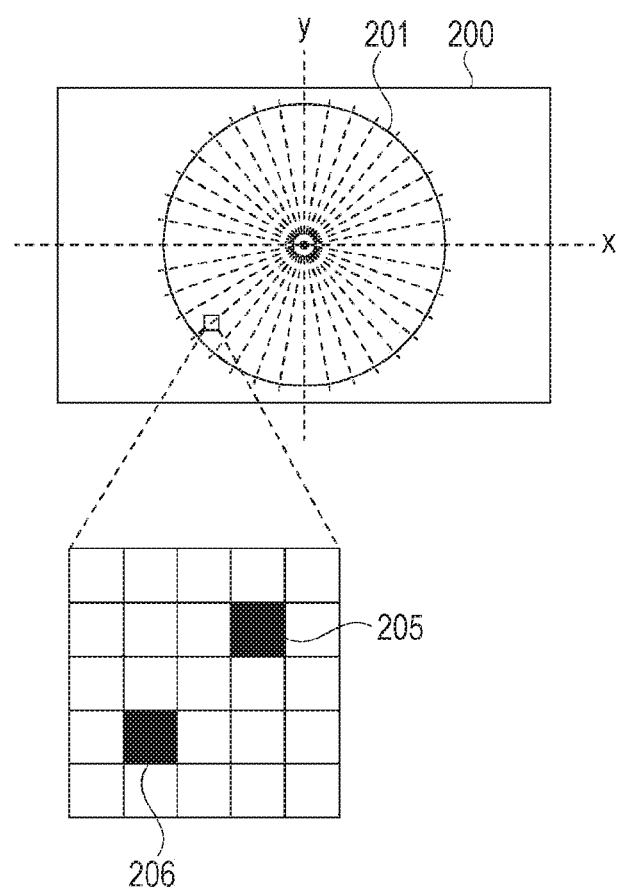

PROCESS WITH OUTPUT COORDINATE PLAIN

CONVERT TO NORMALIZED SPACE

ROTATION

CALCULATE CELESTIAL SPHERICAL
CORRESPONDING POINT
IN PERSPECTIVE PROJECTION

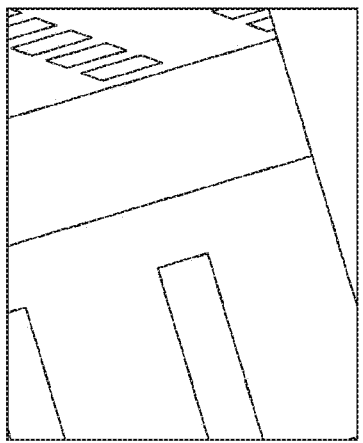
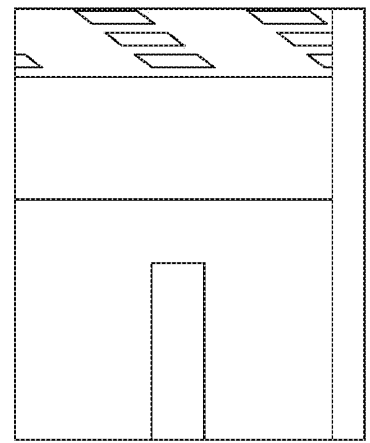
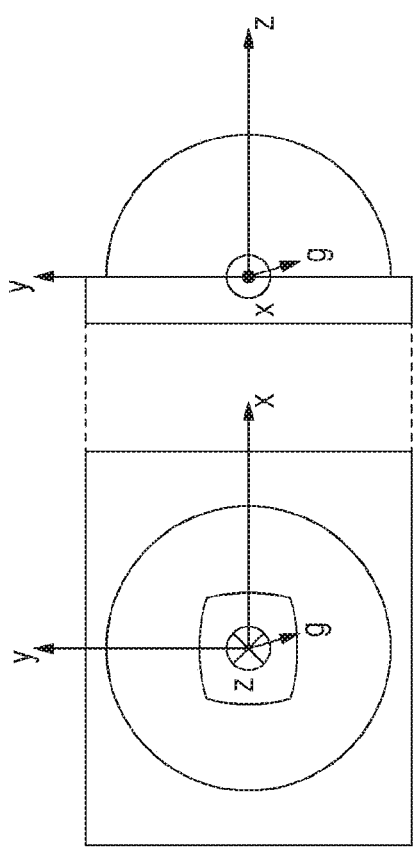
FIG. 48A
FIG. 48B
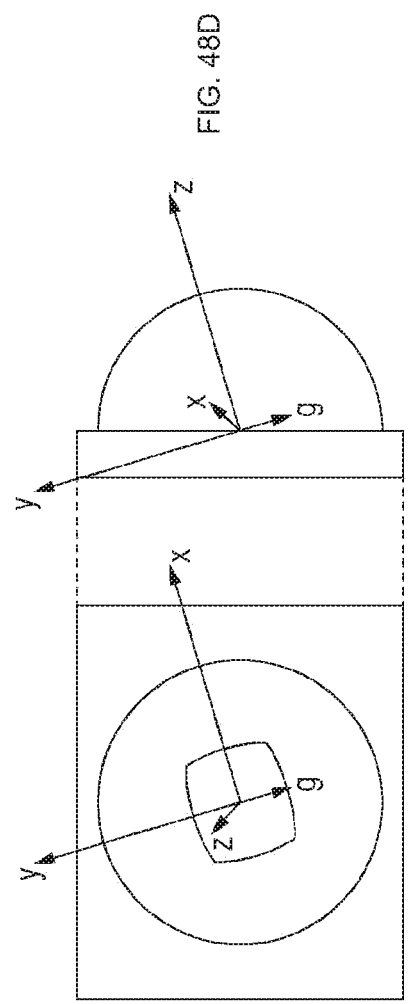
FIG. 48C
FIG. 48D

IMAGING APPARATUS AND IMAGING METHOD FOR IMPROVEMENT OF REPRODUCTION IMAGE QUALITY

CROSS REFERENCE TO RELATED APPLICATIONS

This application is a U.S. National Phase of International Patent Application No. PCT/JP2018/008290 filed on Mar. 5, 2018, which claims priority benefit of Japanese Patent Application No. JP 2017-099168 filed in the Japan Patent Office on May 18, 2017. Each of the above-referenced applications is hereby incorporated herein by reference in its entirety.

TECHNICAL FIELD

The present technology relates to an imaging apparatus and an imaging method, and more particularly to an imaging apparatus and an imaging method for capturing a moving image using a fisheye lens.

BACKGROUND ART

There is known an imaging apparatus using, for example, a fisheye lens for capturing a field of view wider than that of a normal central projection lens. Also known is capturing a so-called celestial sphere image by capturing an image using a fisheye lens.

The following Patent Document 1 discloses a capturing device that records information of an inclination angle at the time of recording so that correction can be performed on moving image data captured in this way.

CITATION LIST

Patent Document

Patent Document 1: Japanese Patent Application Laid-Open No. 2016-149752

SUMMARY OF THE INVENTION

Problems to be Solved by the Invention

For example, it is considered that a moving image is captured using a fisheye lens. In this case, for improvement of the reproduction image quality, blur correction on image data as a moving image or correction of distortion (fisheye distortion) that occurs when an image captured by a fish-eye lens is two-dimensionally displayed is important.

For this purpose, information for blur correction and fisheye distortion correction must be acquired.

Therefore, the present technology aims to enable proper acquisition of posture data used for correction when capturing a moving image.

Solutions to Problems

An imaging apparatus according to the present technology includes: an imaging unit that generates image data; a posture data generation unit that generates posture data; a notification unit that performs notification for correlating the image data and the posture data on the basis of a trigger; and a detector that detects notification by the notification unit.

For example, moving image capturing of a half celestial sphere image, a full celestial sphere image, and the like by the optical system is performed using a fisheye lens as the optical system of the non-central projection method. In this case, for example, posture data of a casing corresponding to each frame of a moving image is output. The notification and detection for correlating the image data with the posture data can be performed.

In the imaging apparatus according to the present technology described above, the notification unit may perform notification so that notification information is included in the captured image data.

For example, in image data as a moving image, it can be known from the image data which time point frame is used as a basis for starting posture data generation.

In the imaging apparatus according to the present technology described above, the notification unit may be a light emitting unit, and the detector may be the imaging unit.

By causing the light emitting unit to emit light, a frame of an image of high luminance different from the subject light is formed in the image data.

For example, in a frame corresponding to an image captured by the imaging unit at the light emission timing of the light emitting unit, pixel data of luminance by the light emission is formed as information for leading frame identification.

In the imaging apparatus according to the present technology described above, it is considered that the light emission period of the light emitting unit is a time within one frame period.

By causing the light emitting unit to emit light, a frame of a high luminance image is formed, but the image becomes an image different from the subject light, in other words, an image which is originally unnecessary, so the light emission period is shortened.

In the imaging apparatus according to the present technology described above, it is considered that the posture data generation unit performs posture data generation once per frame on the basis of a frame synchronization signal asynchronous with the imaging unit.

The imaging apparatus is formed with an imaging system that performs image data generation as a moving image and a posture data generation system including the posture data generation unit as an asynchronous system.

Furthermore, in the imaging apparatus according to the present technology described above, it is also considered that the posture data generation unit performs posture data generation once or a plurality of times per frame on the basis of a frame synchronization signal common with the imaging unit.

The frame synchronization signal common to the imaging system that performs image data generation as a moving image and the posture data generation system including the posture data generation unit is used.

In the imaging apparatus according to the present technology described above, it is considered that the light emitting unit is provided so as to expose only an imaging element which is out of the incident range of the subject light by the optical system in the imaging unit.

The high luminance image by the light emission of the light emitting unit is only out of the range effective as the subject image.

In the imaging apparatus according to the present technology described above, it is considered that the posture data generation unit generates posture data a plurality of times per frame period of the image data generated by the imaging unit.

Sensor detection data related to the posture is sampled at a sampling rate of higher frequency than that of the frame synchronization signal (vertical synchronization signal) and posture data is generated.

In the imaging apparatus according to the present technology described above, it is considered that, in a case of performing image data generation as an intermittent frame moving image, the posture data generation unit sets the number of times of generation of posture data in one frame period smaller in the ineffective frame period than the number of times in the effective frame period.

Sensor detection data related to posture is sampled at a sampling rate of a frequency higher than a frame synchronization signal (vertical synchronization signal), and posture data generation is performed. In a case where image data generation is performed as so-called time lapse imaging, the sampling rate is reduced in an ineffective frame period.

In the imaging apparatus according to the present technology described above, it is considered that, in a case of performing image data generation as an intermittent frame moving image, the posture data generation unit performs posture data generation in both the effective frame period and the ineffective frame period.

That is, in a case where image data generation is performed as so-called time lapse imaging in which an effective frame is extracted intermittently to form a moving image (fast-forwarding moving image) among continuous frames, posture data generation is performed even in an ineffective frame period.

In the imaging apparatus according to the present technology described above, it is considered that the posture data generation unit adds information based on a frame synchronization signal to posture data.

For example, a vertical synchronization flag is added to posture data acquired at the timing of the vertical synchronization signal (close to the timing).

In the imaging apparatus according to the present technology described above, it is considered that the posture data generation unit generates posture data based on detection information of a gyro sensor.

For example, angular velocity change at each time point is acquired from the detection information of the three-axis gyro sensor, and generates posture data based thereon.

In the imaging apparatus according to the present technology described above, it is considered that the posture data generation unit generates posture data based on detection information of an acceleration sensor.

Posture change with respect to the gravity direction at each time point is acquired from the detection information of the acceleration sensor, and posture data based thereon is generated.

In the imaging apparatus according to the present technology described above, it is considered that the trigger is based on detection of the user operation.

That is, according to the user operation, the notification unit performs notification for correlating the image data with the posture data.

In the imaging apparatus according to the present technology described above, generation of image data stored as a moving image by the imaging unit and generation of posture data corresponding to image data stored as a moving image by the posture data generation unit are started by a common trigger.

For example, image data generation and posture data generation are started according to operation as recording start operation.

In the imaging apparatus according to the present technology described above, generation of image data stored as a moving image by the imaging unit and generation of posture data corresponding to image data stored as a moving image by the posture data generation unit are started by different triggers.

For example, the recording start operation and the posture recording start operation are provided to the user as separate operations.

In the imaging apparatus according to the present technology described above, it is considered that electronic shutter speed control for controlling the exposure time is performed as the exposure adjustment, and the adjustment range of the exposure time of the electronic shutter speed control is switched between the first range and the second range in which the longest exposure time is set to shorter than that in the first range, on the basis of the detection information of the gyro sensor or the acceleration sensor.

As exposure control, electronic shutter speed control is performed so as to increase the exposure time in a dark state. The adjustment range of the exposure time in this case is changed on the basis of the detection information of the gyro sensor or the acceleration sensor.

In the imaging apparatus according to the present technology described above, it is considered that, the gain adjustment of the imaging signal is further performed in the imaging unit as the exposure adjustment, and in a case where the exposure time is switched to the second range, the gain maximum value in the gain adjustment is made higher than the gain maximum value in a case of the first range.

As a result, by raising the maximum value of the gain adjustment by an amount corresponding to the reduction of the maximum value of the exposure time, it is possible to prevent the image from becoming dark.

An imaging method according to the present technology is an imaging method of an imaging apparatus including a casing, an optical system that forms an image of a non-central projection method, and an imaging element unit that captures an image by the optical system, and includes an image data generation procedure for generating image data as a moving image from an output of the imaging element unit, and a posture data generation procedure for generating posture data of the casing corresponding to each frame of the image data.

Effects of the Invention

According to the present technology, by providing a notification unit that performs notification for correlating image data with posture data, and a detector that detects the notification, appropriate acquisition of the posture used for correction of each frame, for example, when capturing a moving image, is enabled.

Note that the effects described herein are not necessarily limited, and any of the effects described in the present disclosure may be applied.

BRIEF DESCRIPTION OF DRAWINGS

FIGS. 38A, 38B, 38C, 38D, 38E, and 38F are explanatory diagrams of blur correction of image data of an embodiment.

FIGS. 39A and 39B are explanatory diagrams of gravity direction correction of an image of an embodiment.

FIG. 44 is an explanatory diagram of correspondence between a fisheye image and a virtual spherical surface of an embodiment.

FIGS. 48A, 48B, 48C, and 48D are explanatory views of gravity direction correction of an embodiment.

MODE FOR CARRYING OUT THE INVENTION

Hereinafter, embodiments will be described in the following order with reference to the attached drawings.
<1. Configuration of Imaging Apparatus>
<2. Shift of Operation State>
<3. Internal Configuration Example I of Imaging Apparatus>
<4. Configuration of Information Processing Apparatus>
<5. Posture Data>
<6. Exposure Adjustment>
<7. Microphone>
<8. Internal Configuration Example II of Imaging Apparatus>
<9. Internal Configuration Example III of Imaging Apparatus>
<10. Reproduction/Edit Screen in Information Processing Apparatus>
<11. Image Correction Processing in Reproduction>
<12. Functional Configuration of Information Processing Apparatus>
<13. Processing Example by Information Processing Apparatus>
<14. Summary of Information Processing Apparatus>

<15. Application Example>
<16. Present Technology>

1. Configuration of Imaging Apparatus

Note that, in the following description, an imaging person side of the imaging apparatus is described as the rear, and a subject side is described as the front. Then, the right and left direction viewed from the imaging person of the camera is described. Furthermore, the gravity direction is described as the vertical direction. Moreover, the direction orthogonal to the gravity direction is referred to as the horizontal direction.

Figure 1:
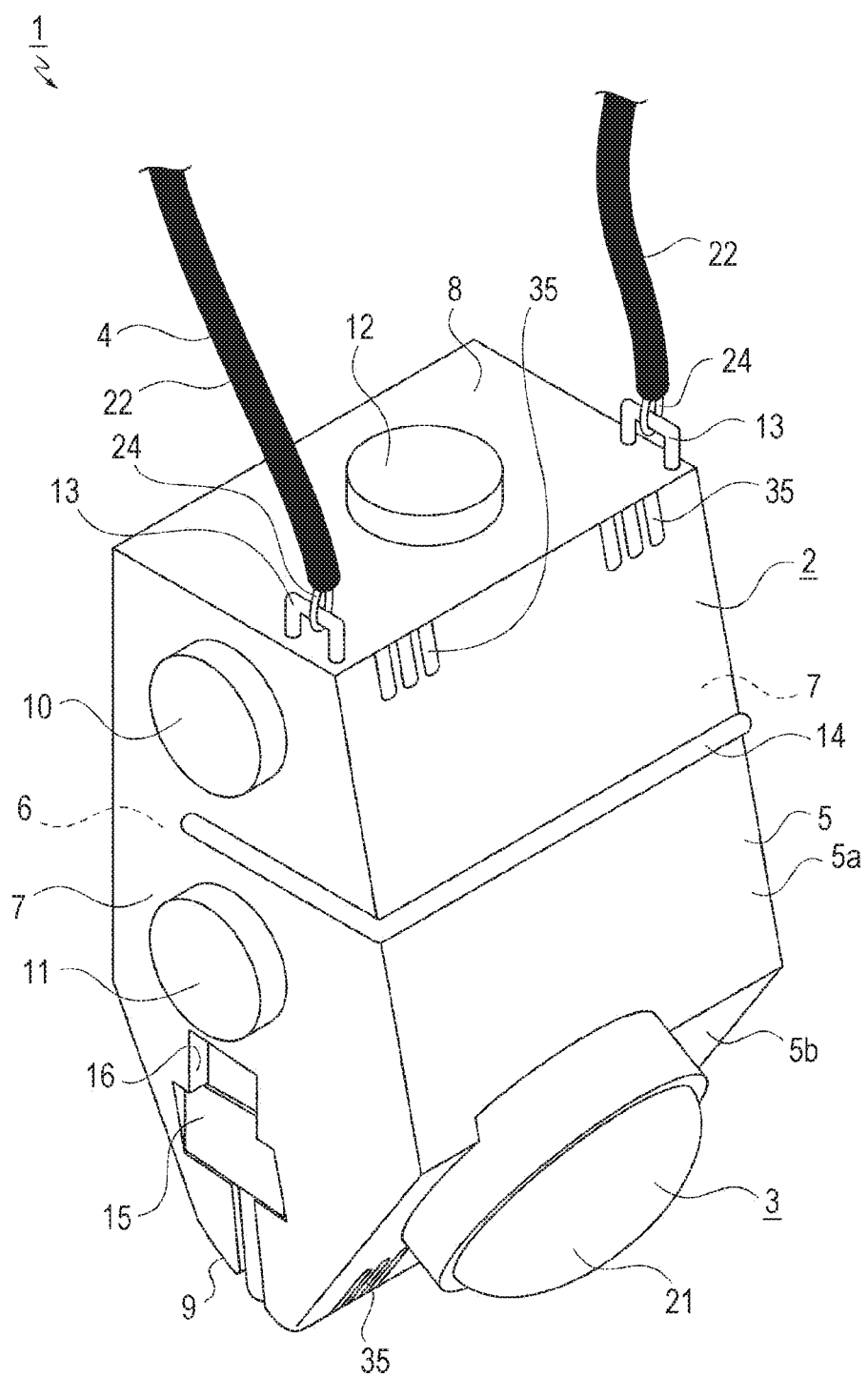
FIG. 1 is a perspective view of an imaging apparatus according to an embodiment of the present technology.
Figure 2:
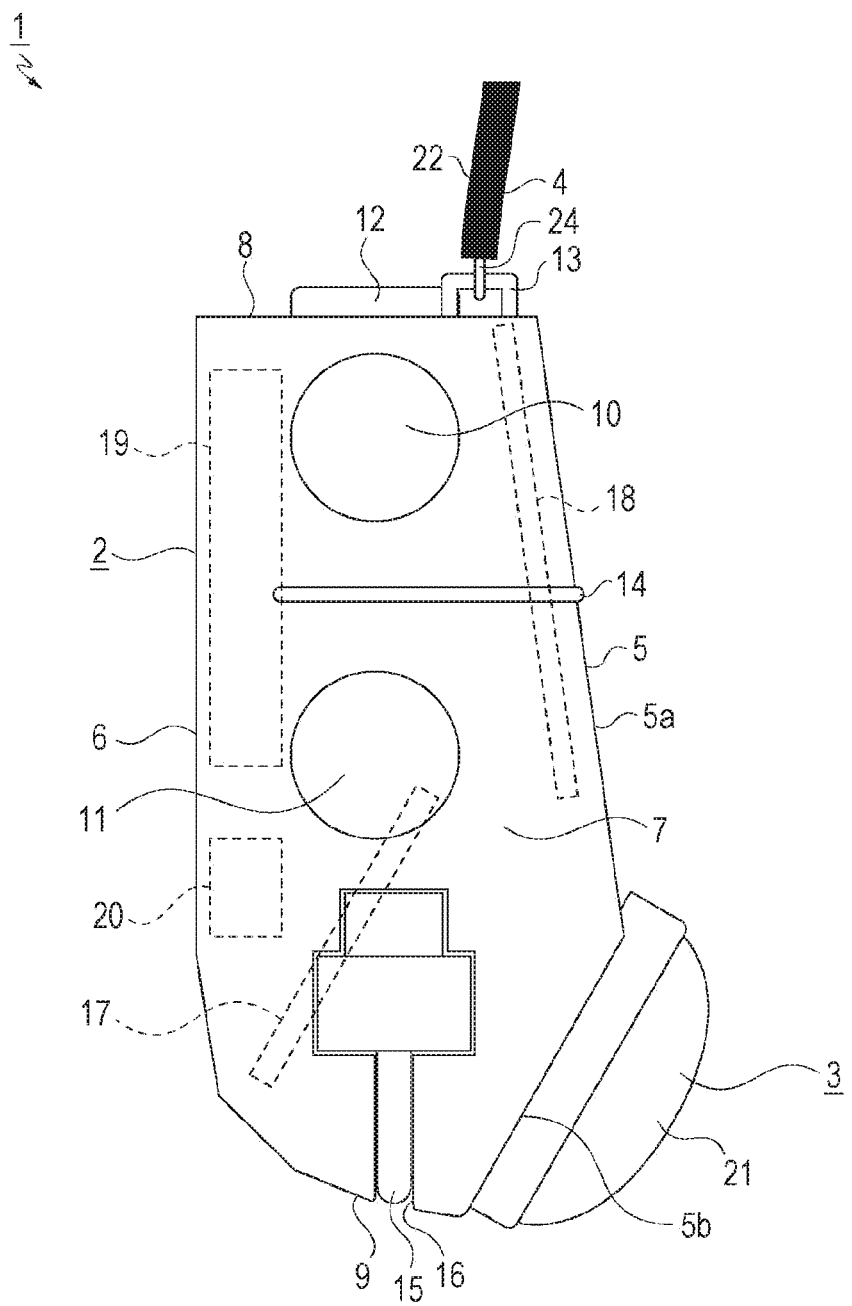
FIG. 2 is a side view of the imaging apparatus.

As shown in FIGS. 1 and 2, an imaging apparatus 1 includes a box-shaped casing 2 in which various members are accommodated, an optical system 3 including various lenses attached to the casing 2, and a strap 4 attached to the casing 2.

The casing 2 has a substantially rectangular box shape including a front surface portion 5, a rear surface portion 6 (back surface portion), left and right side surface portions 7 and 7, an upper surface portion 8, and a lower surface portion 9. The width of the casing 2 in the up and down direction is larger than the width in the right and left direction. Note that the upper surface portion 8 and the lower surface portion 9 are defined in a state in which the casing 2 is suspended from the neck of the imaging person (user). In other words, since being a surface which comes to an upper part in the state shown in FIGS. 1 and 2 (in other words, the state of being suspended), it is referred to as the upper surface portion 8. This is similar for the lower surface portion 9.

The front surface portion 5 includes an upper portion 5a that is a flat portion inclined slightly above the horizontal, and a lower portion 5b that is flat surface continuing downward from a lower end of the upper portion 5a and inclined approximately 30° below the horizontal, and has the optical system 3 attached thereto.

Figure 3:
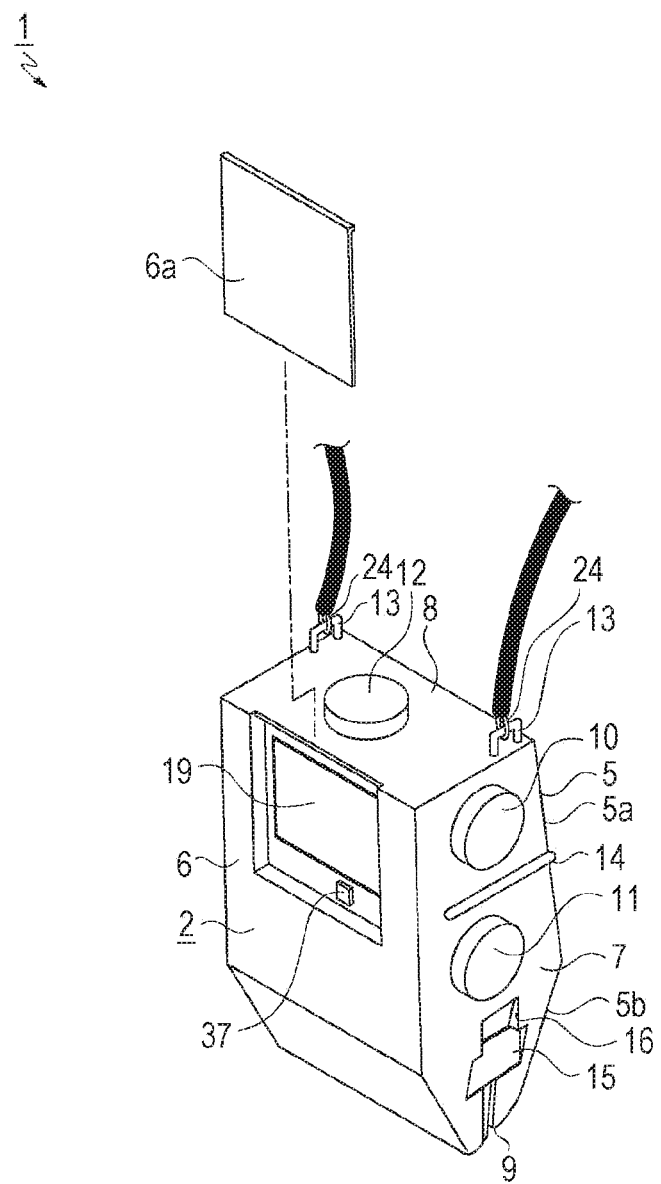
FIG. 3 is a perspective view showing a state in which a lid part is removed.

A part of the rear surface portion 6 is a sliding lid part 6a (see FIG. 3).

The right side surface portion 7 of the casing 2 viewed from the imaging person is provided with a moving image button 10 for performing a moving image capturing operation and a time lapse button 11 for performing a time-lapse moving image capturing operation. The time lapse button 11 is provided below the moving image button 10.

The upper surface portion 8 of the casing 2 is provided with a function button 12 for performing various functions. The operation and function of the imaging apparatus 1 in a case where each button is pressed will be described later.

In the casing 2, the operators provided on the left and right side surface portions 7 and 7 are only the moving image button 10 and the time lapse button 11, and both operators are provided on the right side surface portion 7. In other words, no operator is provided on the left side surface portion 7.

It is generally considered that, when operating the moving image button 10 or the time lapse button 11 provided on the right side surface portion 7, the user presses the right button while placing a finger on the left side surface portion 7. Then, if there is a button also on the left side, the user may accidentally press the button on the left side.

On the other hand, in the imaging apparatus 1 of the present embodiment, the occurrence of the above-described erroneous operation can be prevented because the operator is not provided in the left side surface portion 7. In particular, in the case of imaging a situation during work or the like, it is easy to press each operator without looking at the hand by preventing an erroneous operation, so that the operation efficiency is not hindered and a preferable imaging state can be easily maintained.

Attachment parts 13 and 13 for attaching the strap 4 are provided on the upper surface portion 8 of the casing 2 so as to be separated from each other to the left and right. The attachment part 13 is, for example, U-shaped opened toward the upper surface portion 8.

At the central portion in the vertical direction of the casing 2, a notifying unit 14 is provided across the right side surface portion 7, the upper portion 5a of the front surface portion 5, and the left side surface portion 7. The notifying unit 14 has a function of emitting light to notify the imaging person and the surrounding people of the state of the imaging apparatus and the like, and includes, for example, a light source such as a light emitting diode (LED), a drive circuit of the light source, and a cover lens for diffusing light.

An accommodation recess 16 for accommodating a connector cable 15 is provided from the upper end to the lower end of the left side surface portion 7 of the casing 2, the left end to the right end of the lower surface portion 9, and the lower end to the central portion of the right side surface portion 7.

The connector cable 15 is, for example, pulled out from the inside to the outside of the casing 2 at the upper end of the left side surface portion 7, and, is accommodated in the accommodation recess 16 over the left side surface portion 7, the lower surface portion 9, and the right side surface portion 7 in the state shown in FIG. 1. The connector cable 15 is used to transmit image data and the like captured by the imaging apparatus 1 to an external terminal and the like.

The connector cable is, for example, a universal serial bus (USB) cable or the like.

Inside the casing 2, an imaging substrate 17 for capturing an image formed by the optical system 3, a control substrate 18 for performing various pieces of processing related to the imaging apparatus 1, and a battery 19 for supplying a drive voltage to each unit are arranged (see FIG. 2).

The imaging substrate 17 includes an imaging element, peripheral circuits, and the like.

The battery 19 can be removed by sliding the lid part 6a.

In addition, a card slot (not shown) for inserting a card-type storage medium, a vibration unit 20 for vibrating the imaging apparatus 1, a microphone (described later) for audio input (recording), and the like are appropriately arranged in the inside of the casing 2. Furthermore, a wireless communication button 37 is also arranged in the casing 2. The wireless communication button 37 is, for example, exposed by sliding the lid part 6a, and can be pressed (see FIG. 3).

The optical system 3 includes a fisheye lens 21 arranged closest to the subject and other lens groups (not shown). Note that the fisheye lens 21 is an example of an optical system that forms an image by a method other than the central projection method which is a general projection method. Examples of methods other than the central projection method include, for example, an equidistant projection method, an equisolid angle projection method, an orthographic projection method, a stereoscopic projection method, and the like.

Figure 4A:
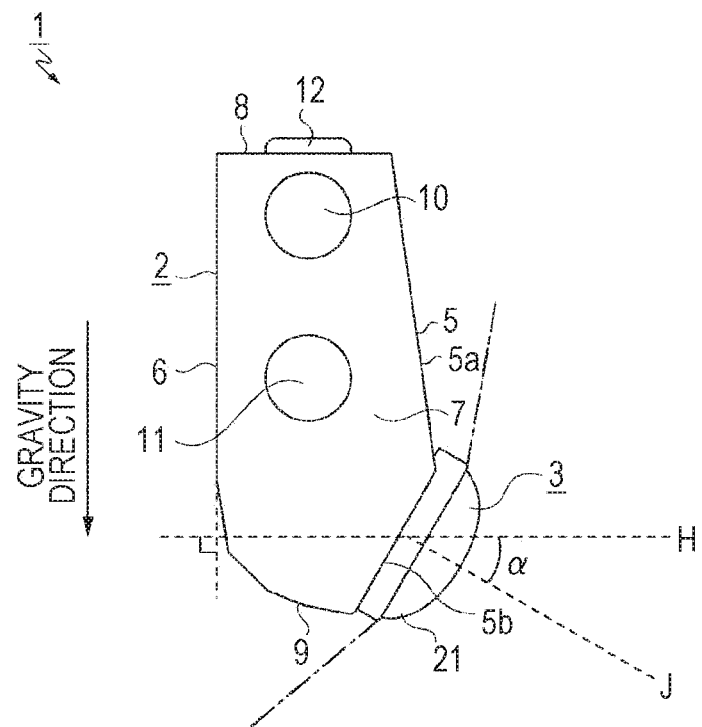
FIGS. 4A and 4B are views for explaining an angle of view of an optical system.
Figure 4B:
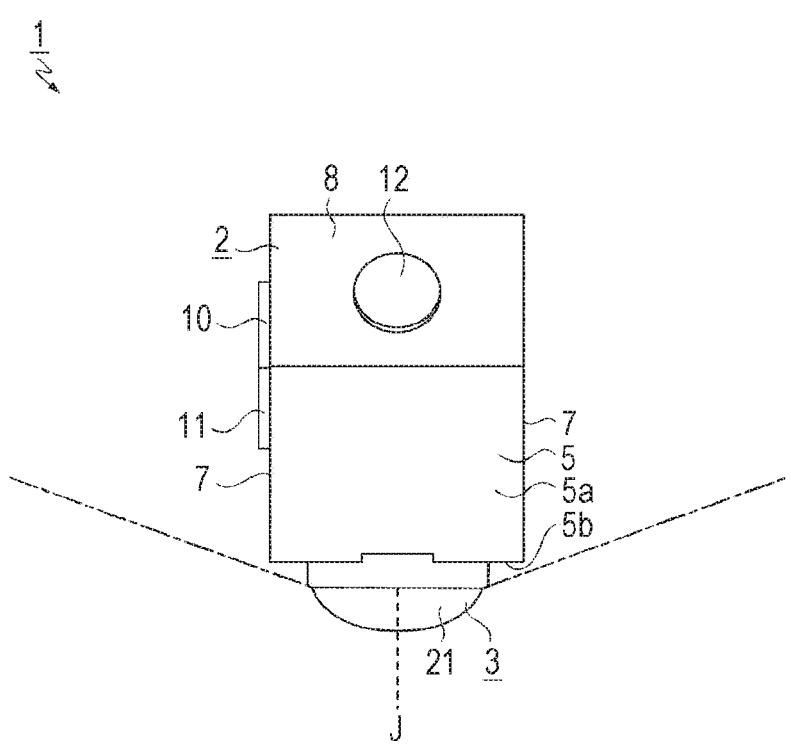

FIG. 4A is a side view of the imaging apparatus 1, and FIG. 4B is a view showing the imaging apparatus 1 from substantially above. An angle of view of the fisheye lens 21 included in the optical system 3 is shown by an alternate long and short dash line in each drawing. As shown, the angle of view of the fisheye lens 21 is 180° or more, for example, 220°.

In the imaging apparatus 1 of the present embodiment, as shown in FIG. 4B, the width in the right and left direction of the casing 2 is smaller than the width in the up and down direction. Accordingly, the casing 2 is prevented from being reflected at the angle of view in the right and left direction only by providing the optical system 3 so as to project forward.

As a result, it is possible to perform imaging by sufficiently drawing out the performance of the optical system 3 having the fisheye lens 21 or the like with a wide angle of view.

Furthermore, as shown in FIG. 4A, in a state in which the rear surface portion 6 is along the gravity direction (vertical direction), an optical axis J of the fisheye lens 21 is a straight line inclined below the horizontal direction with respect to the subject. Specifically, the optical system 3 is attached to the lower portion 5b of the front surface portion 5 inclined approximately 30° below the horizontal, and the optical system 3 is attached so that the direction of the surface of the lower portion 5b and the optical axis J of the optical system are parallel. Thus, the upper portion of the casing 2 is prevented from being reflected at the angle of view of the fisheye lens 21.

As a result, it is possible to perform wide-range imaging by utilizing the wide angle of view of the fisheye lens 21.

Note that although the rear surface portion 6 shown in FIG. 4A and the like is plane, the rear surface portion 6 may be non-planar. For example, the rear surface portion 6 may include a curved surface in part, or have a wave-like shape. Even with such a rear surface portion 6, in the state where the rear surface portion 6 is along the gravity direction, the optical axis J of the fisheye lens 21 is a straight line inclined below the horizontal direction with respect to the subject.

Figure 5A:
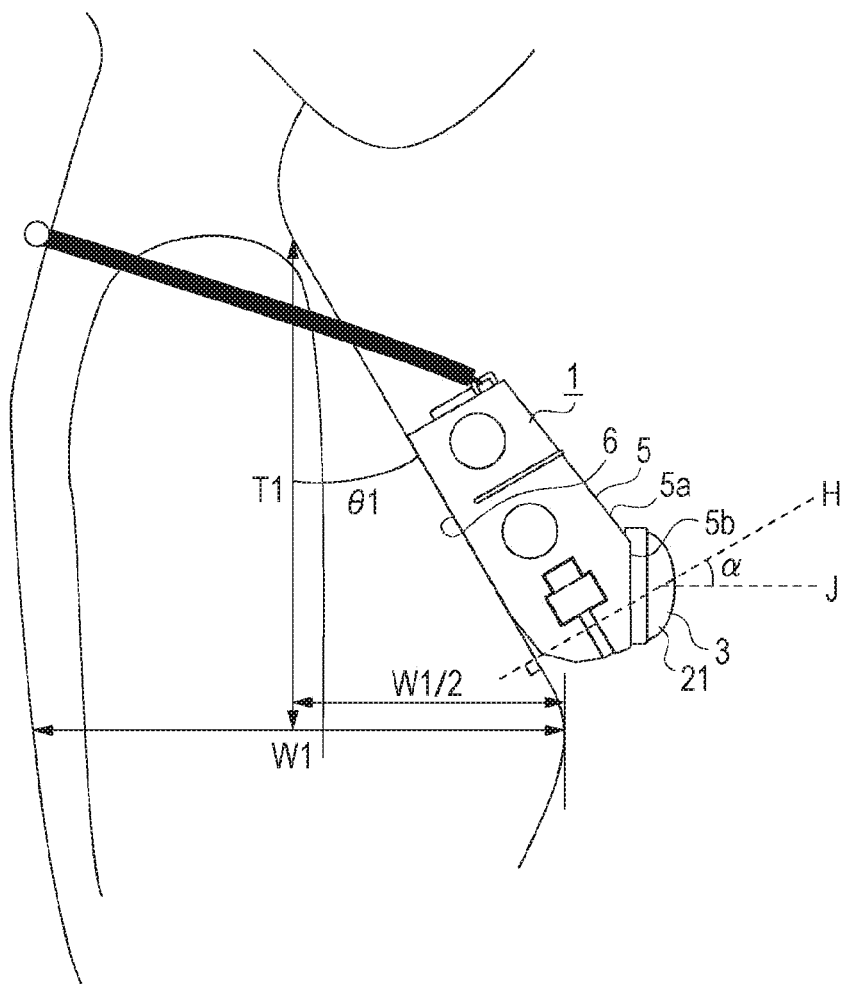
FIGS. 5A and 5B are views showing an imaging apparatus in a state of being placed on the chest part.

FIG. 5A is a view showing a general human chest orientation with respect to the horizontal direction. Assuming that the angle formed by the vertical plane with the human chest in the upright state is θ1, it is preferable that the angle between the rear surface portion 6 of the casing 2 and the lower portion 5b of the front surface portion 5 be θ1. As a result, the optical axis J of the optical system 3 is directed substantially forward in a state where the rear surface portion 6 is placed on the upright chest part of the imaging person. Accordingly, it is possible to capture an image that is substantially the same as the field of view of the imaging person, and to take a captured image having realistic feeling as if sharing the imaging person's experience through the captured image.

A specific example will be given.

Assuming that the average of the chest thickness W1 of a woman is 220.7 and the average of the difference T1 between the cervical point height and the papillary height is 195.7, θ1=arctan ((W1/2)/T1) is established, and θ1 becomes 29.4°. In such a specific example, the optical system 3 is attached to the lower portion 5b of the front surface portion 5 inclined approximately 30° below the horizontal as in the present embodiment, so that the imaging apparatus 1 is in a preferable posture in a case of being used by being suspended from the neck.

Furthermore, in this example, the variation of W1 is set to 156.50702 to 284.893, and the variation of T1 is set to 187.2749 to 204.1251, in consideration of the variation between individuals (3σ). In this case, the variation of θ1 is 22.7° to 34.9°. Note that, σ represents a standard deviation.

Figure 5B:
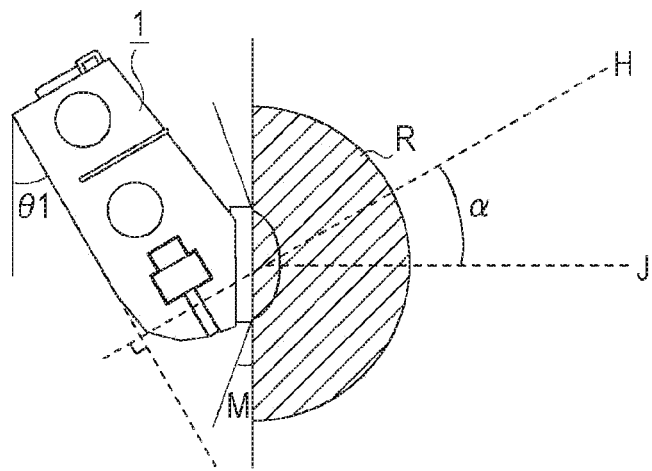

Furthermore, a case will be considered in which the front 180° of the imaging apparatus 1 (the range R indicated by hatching in FIG. 5B) is set as the imaging range.

Assuming that the angle of view of the fisheye lens is φ, the margin M of the angle of view of the fisheye lens can be expressed by the following equation.

$$M = (\varphi - \pi)/2$$

For example, in a case of φ=220°, M is 20°. In other words, in the state where the optical axis J of the optical system of the imaging apparatus 1 placed on the chest is in the vertical direction, the upper side margin and the lower side margin of the fisheye lens both are 20°.

In such a state, in order to cover the range R indicated by hatching as the imaging range, it is required that the angle α (in other words, the inclination of the optical axis J) between the line H orthogonal to the rear surface portion 6 and the optical axis J of the optical system 3 is set to (θ1−(φ−π)/2) or more and (θ1+(φ−π)/2) or less.

Assuming that the angle θ1 between the chest and the vertical plane is 30° and the angle of view φ is 220°, the angle α is 10° to 50°. By satisfying this condition, it is possible for an imaging person with an average chest inclination to capture an image of the range of 180° in front of the imaging person without difficulty.

In other words, the imaging apparatus 1 is configured so that, in the state where the casing 2 is simply suspended, the optical axis J of the optical system 3 faces substantially 30° downward, and when the casing 2 is placed on the chest of the imaging person, the optical axis J faces substantially forward (substantially horizontal).

Note that, in a case of using in the state where the casing 2 is placed on the chest, since the vibration unit 20 is provided in the inside of the casing 2, the vibration of the vibration unit 20 can be transmitted to the imaging person's chest. In other words, various notification functions can be made to work effectively.

Note that, in general, in the imaging apparatus 1, when the vibration unit 20 provided in the casing 2 is vibrated during capturing an image, a blur may occur in the captured image. Therefore, it is considered that processing of vibrating the casing 2 is not usually performed. However, since the imaging apparatus 1 according to the present embodiment is configured to be able to perform processing for blur correction as described later at the time of reproduction of the captured image, it is possible to vibrate the casing 2 during capturing an image.

The strap 4 has two string parts 22 and 22. A male connector 23 is attached to one end of one of the string parts 22 and an annular attached unit 24 is provided at the other end.

A female connector 25 is attached to one end of the other string parts 22, and an attached unit 24 is provided at the other end.

By inserting and attaching the male connector 23 to the female connector 25, the two string parts 22 and 22 are coupled. Then, the attached units 24 of each string part 22 are attached to the attachment parts 13 and 13 of the casing 2 so that the strap 4 and the upper surface portion 8 of the casing 2 form an annular part 26 (see FIG. 6).

The annular part 26 is, for example, an annular shape larger than a human neck and an annular shape smaller than a human head circumference. As a result, it is possible to prevent the strap 4 from coming off the head when the imaging person lowers the head, so that it is possible to prevent damage or the like of the imaging apparatus 1. Then, since the imaging apparatus 1 can be inserted and attached in a state in which the imaging person takes various postures, imaging can be performed in various situations.

Figure 7:
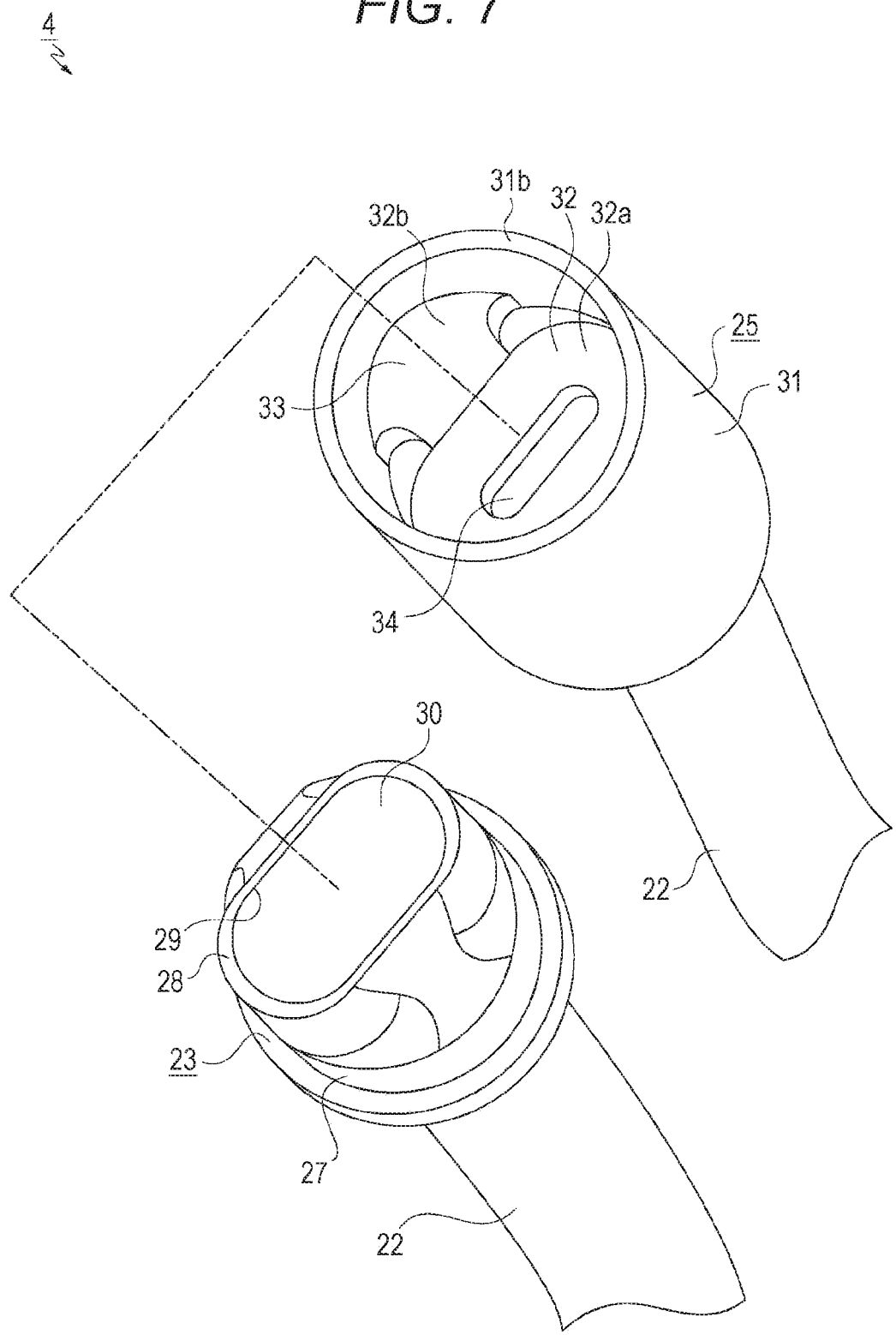
FIG. 7 is a perspective view of a male connector and a female connector.

The male connector 23 and the female connector 25 are inserted and attached by magnetic force. This will be specifically described with reference to FIG. 7.

The male connector 23 includes a cylindrical base part 27 and an oval projecting part 28 axially projecting from the base part 27. One end of the base part 27 in the axial direction is an attachment surface 27a (see FIGS. 8A, 8B, 8C, and 8D) to which the string part 22 is attached. The oval projecting part 28 has an oval cross-sectional shape orthogonal to the axial direction, and a magnet mounting hole 29 is formed in the central portion. A magnet 30 is inserted into the magnet mounting hole 29.

The female connector 25 includes a cylindrical part 31 and a partition plate 32 provided inside the cylindrical part 31. One end of the cylindrical part 31 is an attachment end 31a to which the string part 22 is attached, and the other end is an opening end 31b. The partition plate 32 includes an oval surface portion 32a having a shape (oval shape) substantially the same as the cross-sectional shape of the oval projecting part 28 of the male connector 23. Furthermore, the portion outside the oval surface portion 32a of the partition plate 32 is an inclined surface portion 32b. The inclined surface portion 32b includes an inclined surface that approaches the opening end 31b as it approaches the outer circumferential side, and the inclined surface functions as a guide part 33.

A magnet 34 is attached between the partition plate 32 and the attachment end 31a. The magnet 30 and the magnet 34 are attached so as to attract each other when the male connector 23 is inserted and attached to the female connector 25.

The function of the guide part 33 will be described with reference to FIGS. 8A, 8B, 8C, and 8D. Note that FIGS. 8A, 8B, 8C, and 8D are schematically shows the outline of the male connector 23 and the female connector 25.

Figure 8A:
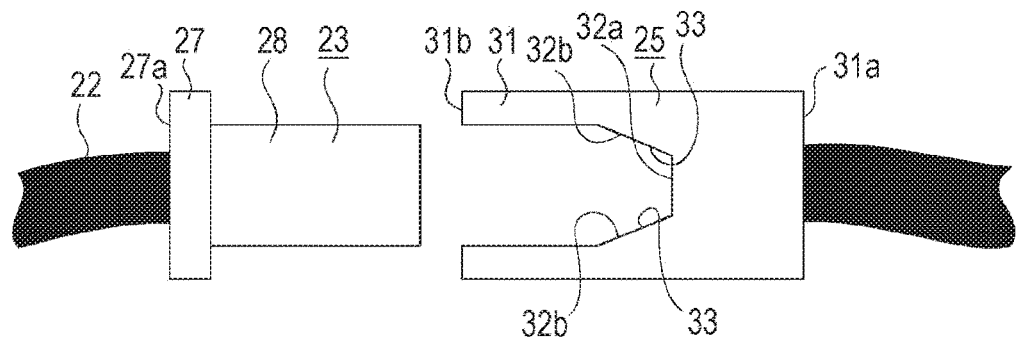
FIGS. 8A, 8B, 8C, and 8D are schematic views showing a state in which a male connector is inserted while being rotated with respect to the female connector.

FIG. 8A shows a state before the male connector 23 is inserted and attached to the female connector 25. A state in which the male connector 23 is inserted into the female connector 25 from this state until the oval projecting part 28 contacts the inclined surface portion 32b as the guide part 33 is a state shown in FIG. 8B.

Moreover, in order to insert the male connector 23 into the female connector 25, it is necessary to rotate the male connector 23 to either one direction. Since the cross-sectional shape of the oval projecting part 28 of the male connector 23 is not a perfect circle but an oval shape, the oval projecting part 28 is moved backward between the guide parts 33 and 33 by rotation.

Figure 8B:
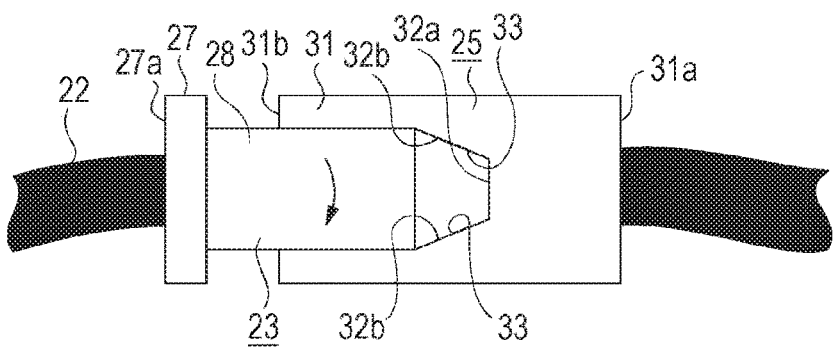
Figure 8C:
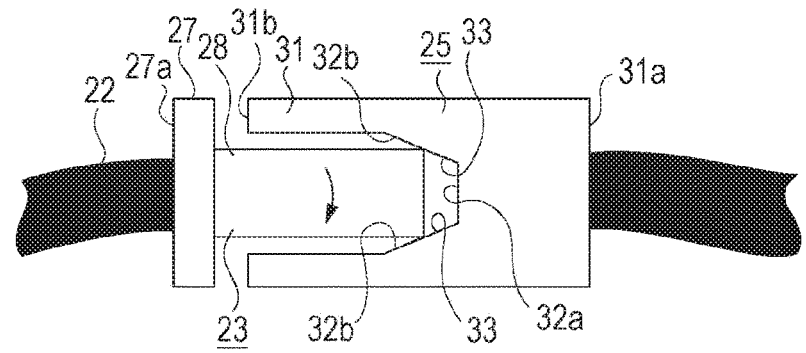
Figure 8D:
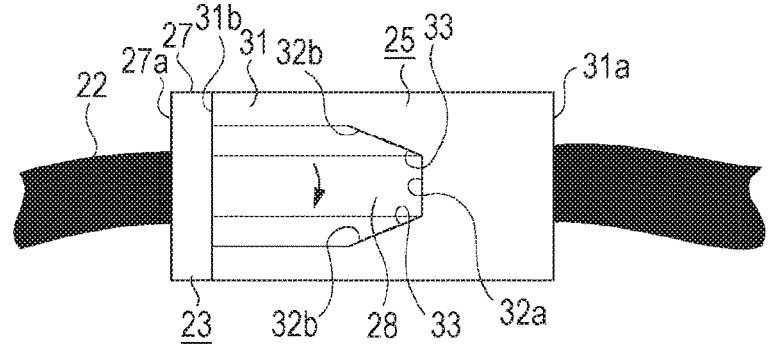

FIG. 8C shows a state in which the male connector 23 is rotated approximately 45° from the state shown in FIG. 8B. FIG. 8D shows a state in which the male connector 23 is rotated approximately 90° from the state shown in FIG. 8B.

Finally, as shown in FIG. 8D, the tip end surface of the oval projecting part 28 and the oval surface portion 32a are in close contact with each other, and thereby, the insertion and attachment of the male connector 23 and the female connector 25 is completed. In this state, the magnet 30 of the male connector 23 and the magnet 34 of the female connector 25 attract each other to ensure a preferable coupling state of the male connector 23 with the female connector 25.

Furthermore, since the male connector 23 and the female connector 25 are coupled by the magnets, a complicated structure for coupling/separating both connectors is not necessary, so that the cost can be reduced and the manufacturing process can be simplified. Furthermore, since this can be realized with a simple structure, damage or the like of both connectors do not occur easily, and lifetime improvement of components can be achieved.

Since the oval projecting part 28 of the male connector 23 is not a perfect circle and moreover, the outer portion of the oval surface portion 32a of the female connector 25 is the inclined surface portion 32b, the male connector 23 does not rotate with respect to the female connector 25 in the state where the male connector 23 is inserted and attached to the female connector 25.

Accordingly, the twisting of the string part 22 does not occur, and the proper state is maintained. Furthermore, the annular part 26 formed by the string part 22 is prevented from becoming small in the wearing state of the imaging apparatus 1, and it can prevent giving discomfort of a neck to a wearer.

Furthermore, as described above, since the annular part 26 is an annular shape smaller than the human head circumference, when mounting the imaging apparatus 1, the user holds the male connector 23 and the female connector 25 in a state where the annular part 26 is released, and connects them behind the neck. At this time, since the annular part 26 can be easily formed by the procedure of FIGS. 8A, 8B, 8C, and 8D, the mounting can be extremely smoothly performed.

The case where the function button 12 provided on the upper surface portion 8 of the casing 2 is pressed while the strap 4 is hung on the neck will be described with reference to FIGS. 9A, 9B, and 9C.

Figure 9A:
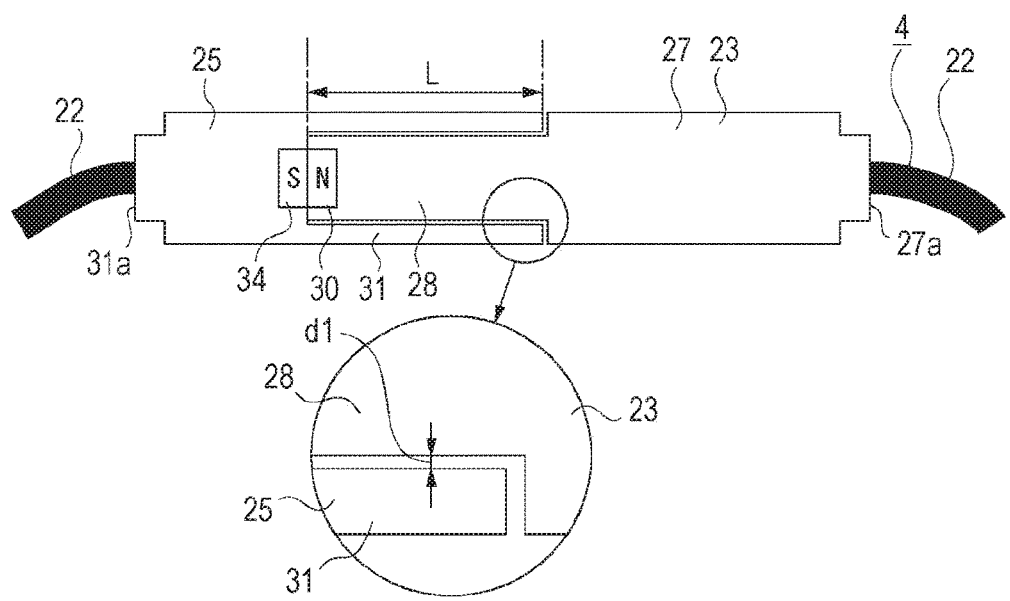
FIGS. 9A, 9B, and 9C are views for explaining a force applied to the connector when a function button is pressed.
Figure 9B:
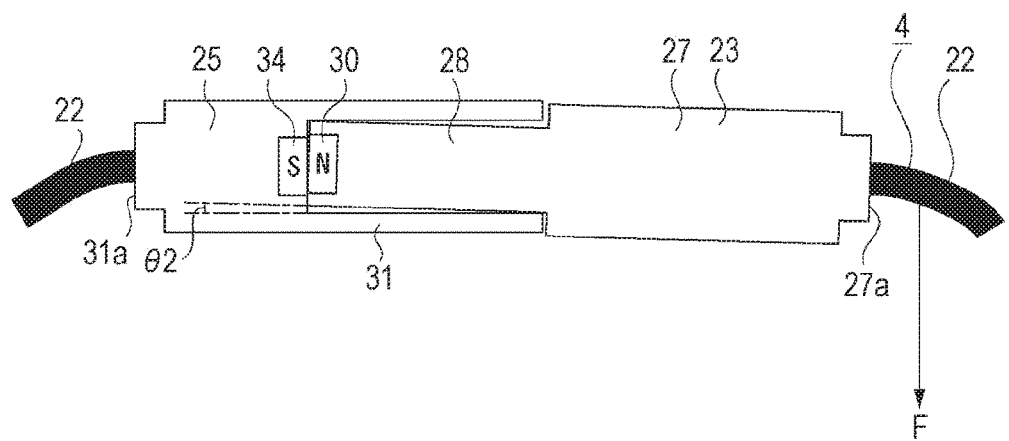

FIGS. 9A and 9B are schematic views simply showing the male connector 23 and the female connector 25.

In the state where the male connector 23 is inserted and attached to the female connector 25, a gap dl is formed between the oval projecting part 28 and the inner surface (or the guide part 33) of the cylindrical part 31.

When the function button 12 is pressed in the state shown in FIG. 9A, a downward force F is applied to the male connector 23 via the strap 4. By this force F, the male connector 23 is inclined with respect to the female connector 25 by an angle θ2 (see FIG. 9B). Note that θ2 is determined by the gap dl and the depth L of the cylindrical part 31 of the female connector 25.

Figure 9C:
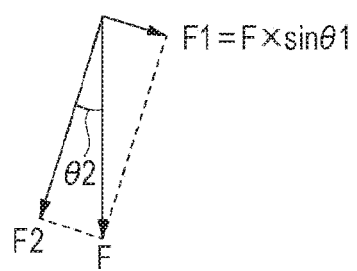

FIG. 9C shows how much force is applied in the direction in which the magnet 30 of the male connector 23 is pulled away from the magnet 34 of the female connector 25 by the force F.

The force F1 applied in the direction in which the magnet 30 is pulled away from the magnet 34 is $F \times \sin(\theta 2)$.

Assuming that the attractive force acting between the magnet 30 and the magnet 34 is F3, the male connector 23 is pulled away from the female connector 25 when the condition of F1> F3 is satisfied, and the annular state of the strap 4 is released.

For example, when the gap dl and the depth L are formed such that $\sin(\theta 2)$ is about 0.1, both magnets are separated in a case where the condition of $F \times \sin(\theta 2) > F3$ is satisfied. In other words, it is when F is made into ten times or more force of F3. Accordingly, in a case where the function button 12 is pressed by a force less than ten times the attractive force F3 acting between both magnets, the annular state of the strap 4 is maintained and the imaging apparatus 1 does not have to be dropped from the neck.

In this way, by setting the gap dl and the depth L appropriately, even if the function button 12 is pressed without holding the imaging apparatus 1 suspended from the neck, the male connector 23 and the female connector 25 of the strap 4 are not separated and the imaging apparatus 1 does not fall. In other words, the operation of pressing the function button 12 becomes easy, and the operability of various pieces of operation for imaging can be secured.

Furthermore, since the function button 12 can be pressed without holding the casing 2 by hand, the function button 12 can be pressed without touching various lenses provided in the optical system 3, so that it is possible to prevent the lens from being scratched or attached with dirt. Furthermore, it is possible to prevent a hand or the like from being reflected in image data.

Moreover, by appropriately setting the gap D1 and the depth L, even when a load is applied to the male connector 23 and the female connector 25 of the strap 4 by the weight of the casing 2 and the components arranged therein, the connector does not easily come off, and the imaging apparatus 1 is prevented from falling off. Similarly, even in a case where a load is applied to the connector portion by the operation of the imaging person, it is difficult for the imaging apparatus 1 to come off.

By the way, the optical axis J of the optical system 3 may be configured to face substantially forward in a state in which the casing 2 of the imaging apparatus 1 is simply suspended. For example, the imaging apparatus 1 is used not only in a state in which the rear surface portion 6 is placed on the chest of the imaging person, but also in other states. Specifically, as shown in FIG. 10, a case may be considered where the imaging apparatus is used in a bent state of the imaging person.

Figure 10:
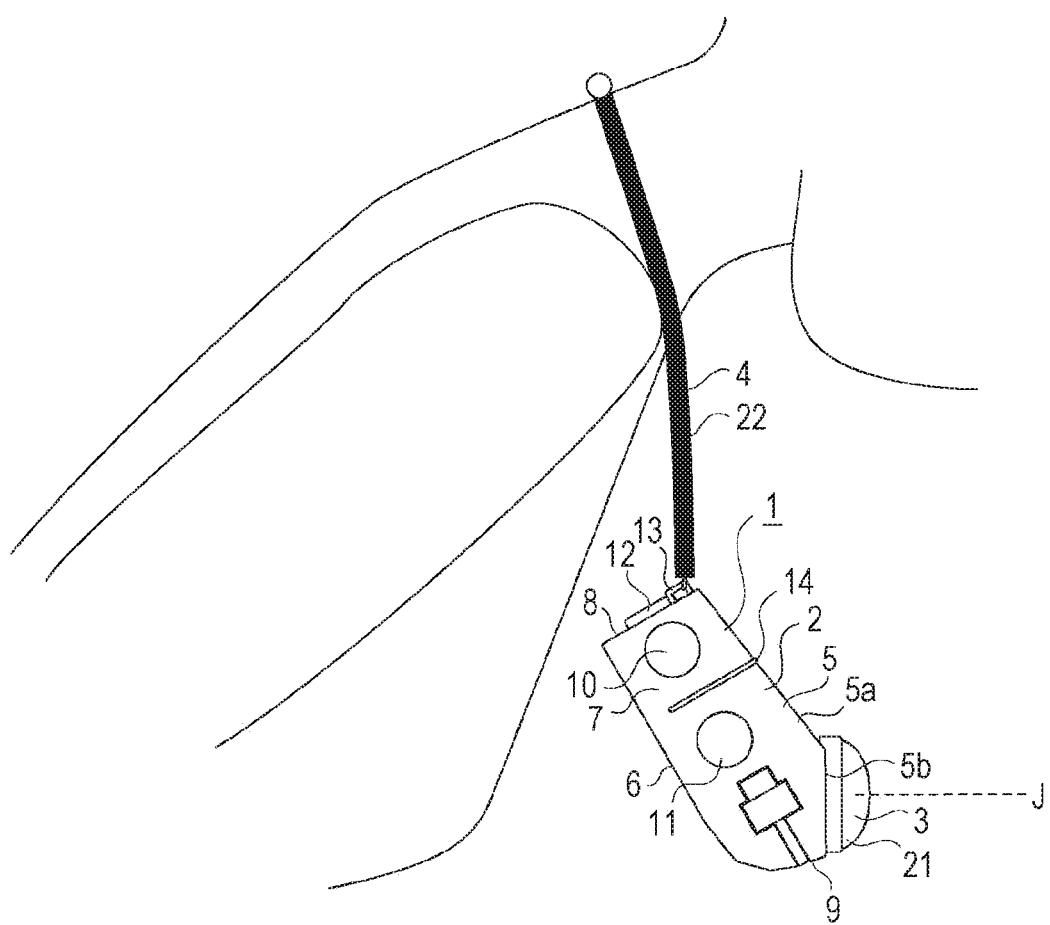
FIG. 10 is a view showing the imaging apparatus in a state of being hung from the neck.

In the state shown in FIG. 10, the imaging apparatus 1 is suspended by the strap 4 suspended from the neck. The imaging apparatus 1 of the present embodiment may be configured such that the optical axis J of the optical system 3 faces substantially forward even in a state where the imaging apparatus 1 is suspended by the strap 4.

Figure 11:
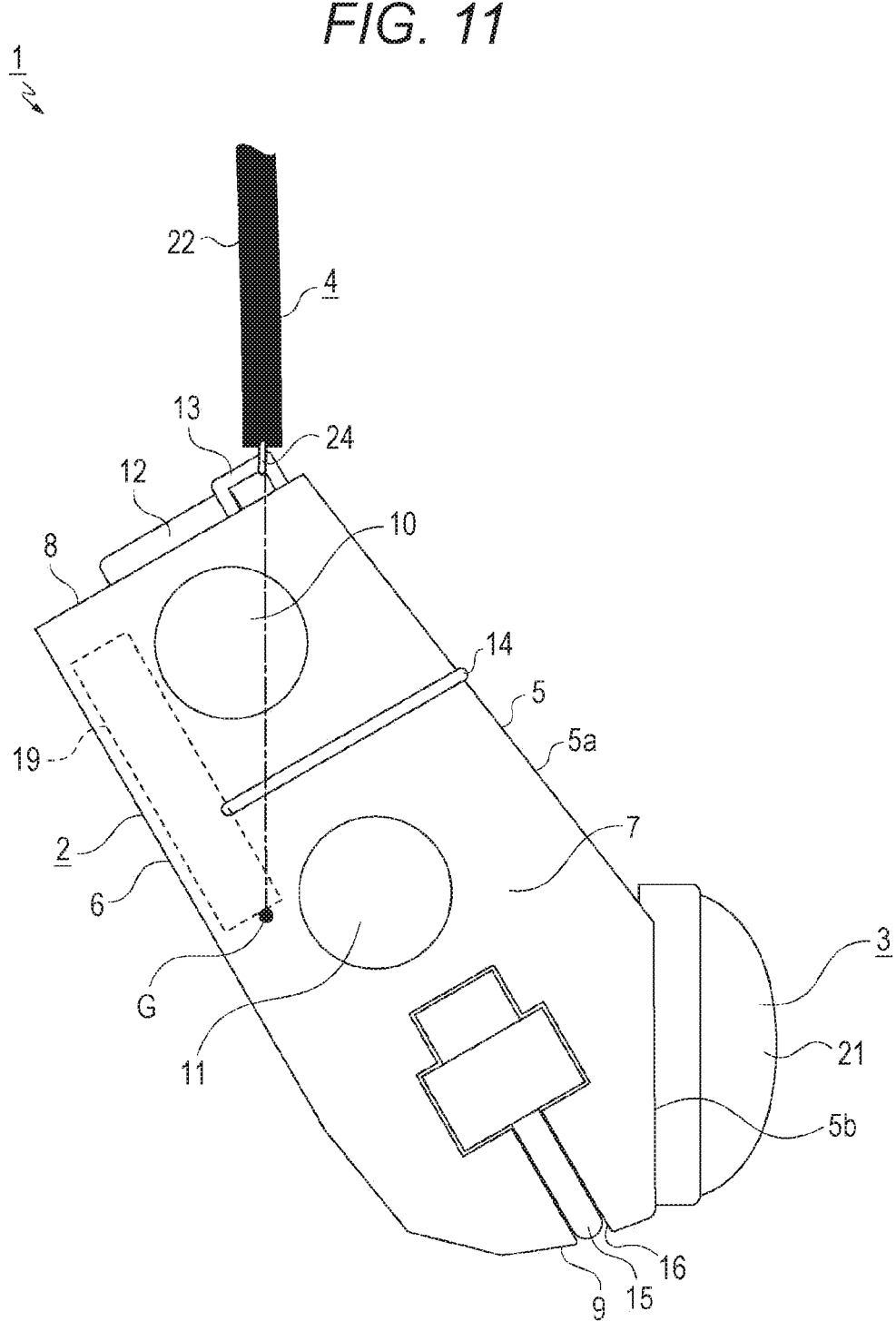
FIG. 11 is a view showing a position of the center of gravity of the imaging apparatus.

This will be specifically described with reference to FIG. 11.

The approximate center of gravity position of the imaging apparatus 1 is determined by a member having a large weight among the members included in the imaging apparatus 1. For example, in a case where the battery 19 and the optical system 3 included in the imaging apparatus 1 are members having a large weight, the approximate position of the center of gravity is determined by the arrangement positions of the members.

Furthermore, the posture (the posture of the casing 2) of the imaging apparatus 1 in a state of being suspended from the neck is such that the position at which the strap 4 is attached (the attachment part 13) and the center of gravity position are aligned in the vertical direction. FIG. 11 shows the positional relationship between the center of gravity position G of the imaging apparatus 1 and the attachment part 13 of the strap 4 by a one-dot chain line. As shown in the drawing, the center of gravity position G is located in the vertical direction with respect to the attachment part 13 (or the attached unit 24).

Each part of the imaging apparatus 1 is arranged such that the optical axis J of the optical system 3 is in the horizontal direction in a state where the center of gravity position G and the attachment part 13 are aligned in the vertical direction.

In other words, when the posture of the imaging apparatus 1 is set so that the optical axis J of the optical system 3 is in the horizontal direction, a member having a large weight (the optical system 3) is arranged at the front side of the attachment position of the strap 4 (contact position of the attached unit 24 and the attachment part 13), and a member having a large weight (battery) is arranged at the rear side of the attachment position.

As a result, the optical axis J of the optical system 3 is directed substantially forward in a state where the imaging apparatus 1 is suspended by the strap 4. In other words, even when the imaging person takes a bent posture, it is possible to capture an image of the front of the imaging person in the horizontal direction without supporting the imaging apparatus 1 by hand.

Furthermore, even if the imaging person takes the bent posture and the upright posture alternately, the change in the up and down direction of the optical system 3 of the imaging apparatus 1 is reduced, so that it is possible to capture a captured image with less blur.

The imaging apparatus 1 includes a microphone 35 for audio input.

For example, two microphones 35 are provided separately along the upper end of the upper portion 5a of the front surface portion 5 to the left and right, and two microphones 35 are provided separately along the lower end of the lower portion 5b of the front surface portion 5 to the left and right (see FIGS. 1, 12A, 12B, and 12C).

The imaging apparatus 1 further includes a three-axis gyro sensor (described later) and a three-axis acceleration sensor (described later) as a posture data generation unit inside the casing 2. The posture data is data indicating the posture of the imaging apparatus 1 and is used for various corrections as described later.

The three-axis gyro sensor and the three-axis acceleration sensor may be anywhere as long as they are attached to a rigid body included in the imaging apparatus 1.

Furthermore, a lens cover 36 for covering a front end portion of the optical system 3 included in the imaging apparatus 1, in other words, a part of the fisheye lens 21 exposed from the casing 2 is provided.

Figure 12A:
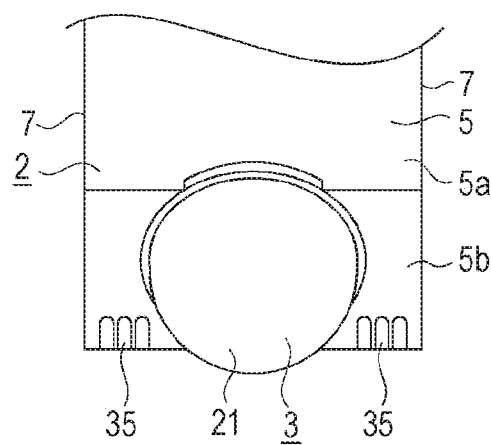
FIGS. 12A, 12B, and 12C are schematic views showing the imaging apparatus provided with a lens cover.
Figure 12B:
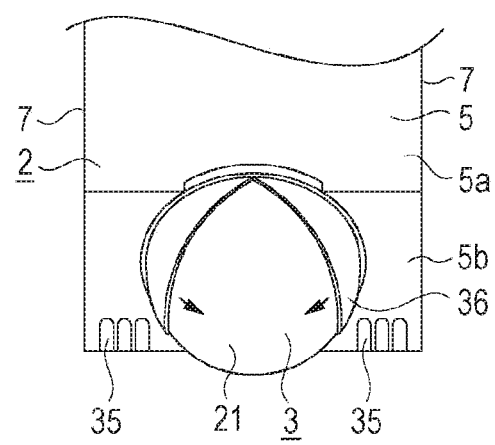
Figure 12C:
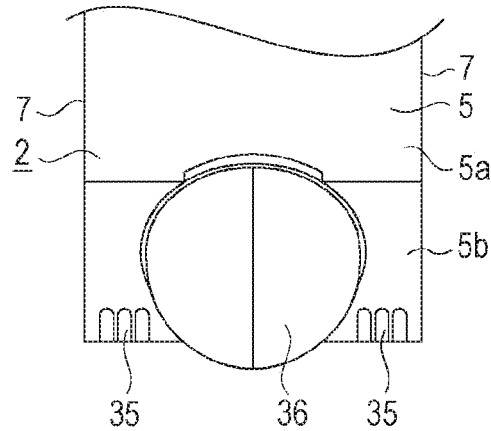

The lens cover 36 is, for example, a slide type, and is configured to be movable between an "open position" (see FIG. 12A) for exposing the fisheye lens 21 so as to enable imaging as needed and a "protection position" (see FIG. 12C) for covering all or part of the fisheye lens 21. Note that FIG. 12B shows a state in which the lens cover 36 is being moved from the open position to the protection position.

By attaching the lens cover 36 to the optical system 3, it is possible to prevent the lens from being damaged by inadvertently touching the lens during non-imaging.

Furthermore, by covering the optical system 3 with the lens cover 36 at the time of non-imaging, it is possible to notify the surroundings of the non-imaging state.

Note that in a case where the lens cover 36 is moved from the open position to the protection position when the imaging apparatus 1 is in the imaging state, the imaging may be stopped or temporarily stopped. Furthermore, in addition to stopping or temporarily stopping imaging, voltage supply to the imaging substrate 18 or the like may be stopped.

As a result, the power consumption of the imaging apparatus 1 can be suppressed, and the imaging time can be extended. Furthermore, it is also possible to make the battery 19 mounted in the imaging apparatus 1 small by suppressing the power consumption.

Moreover, by stopping the voltage supply, it is possible to prolong the life of each part.

Figure 13:
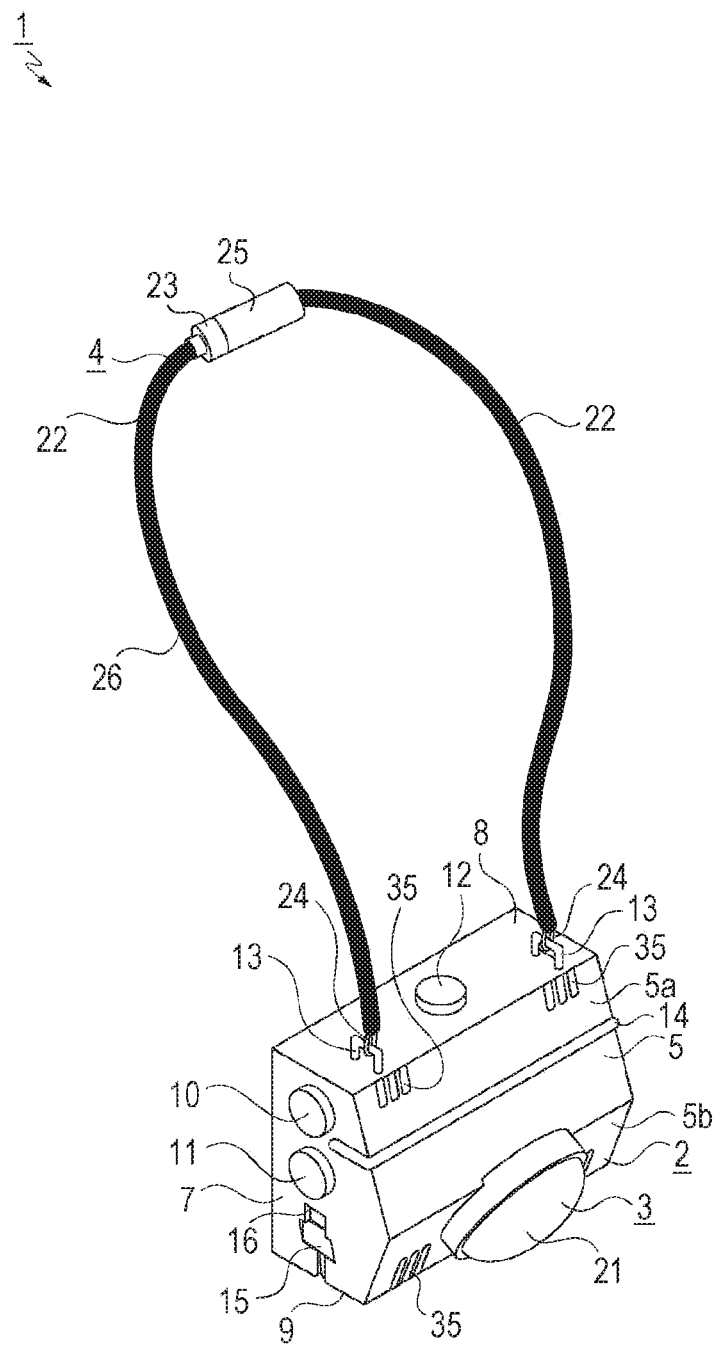
FIG. 13 is a perspective view showing an example in which a casing is horizontally elongated.

Note that various shapes of the imaging apparatus 1 can be considered. Although the example of the vertically long shape has been described above, it may be horizontally long as shown in FIG. 13. In other words, the configuration of each part similar to FIG. 1 is provided in the casing 2 whose shape is elongated in the lateral direction.

With such a shape, when the casing 2 is swung in the right and left direction in a state where the imaging apparatus 1 is placed on the chest of the imaging person, a preferable placement state of the rear surface portion 6 in the chest is ensured, and the casing 2 is prevented from being swung more than the shake in the right and left direction of the imaging person.

Note that as the lateral width of the casing 2 is increased, it becomes easier to maintain a preferable placement state against lateral shake, but it is preferable that the right and left ends of the casing 2 not be reflected in the angle of view of the fisheye lens 21.

By providing the casing 2 with a laterally long shape so that the right and left ends of the casing 2 do not enter the angle of view of the fisheye lens 21, the imaging apparatus 1 resistant to lateral shake can be provided while making the most of the angle of view of the fisheye lens 21.

Furthermore, the number of microphones 35 can be variously considered. A plurality of microphones 35 may be provided to collect stereo sound, or monaural sound may be collected with one microphone 35.

Figure 6:
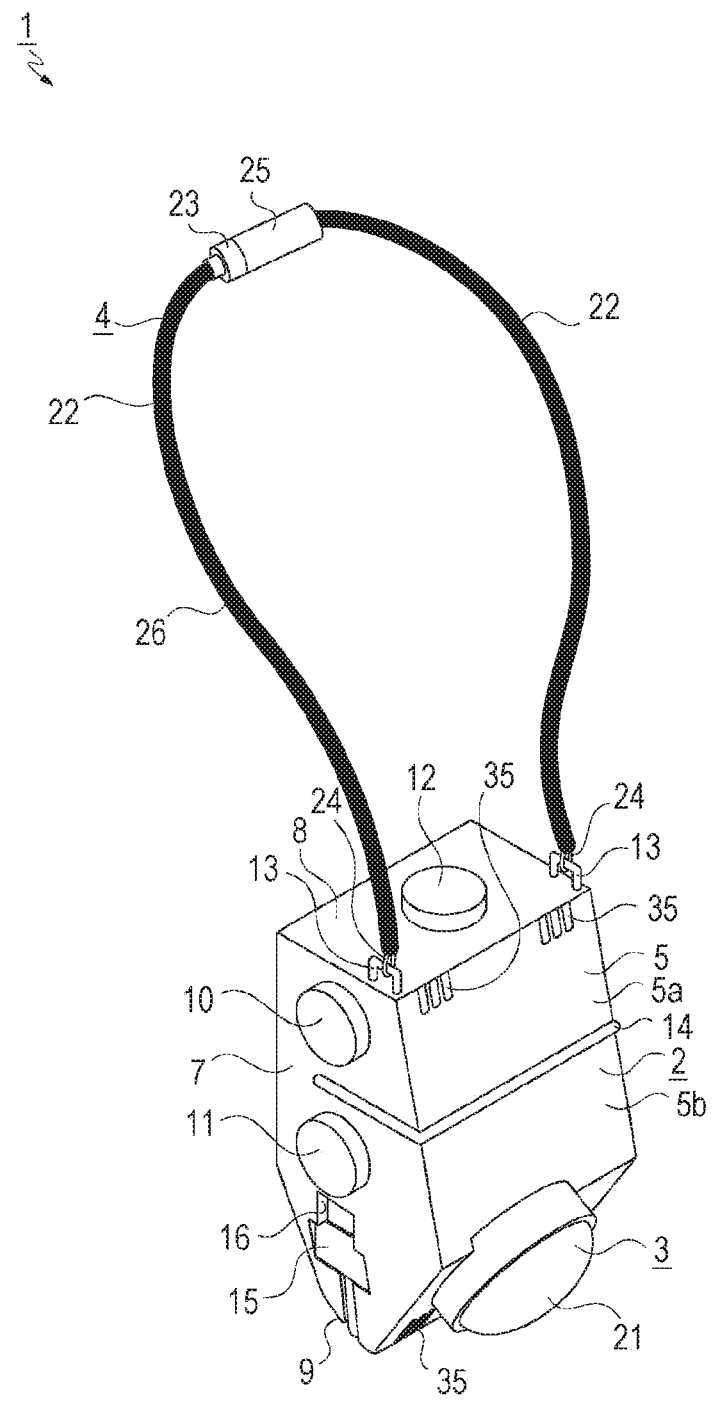
FIG. 6 is a perspective view of the imaging apparatus.
Figure 14:
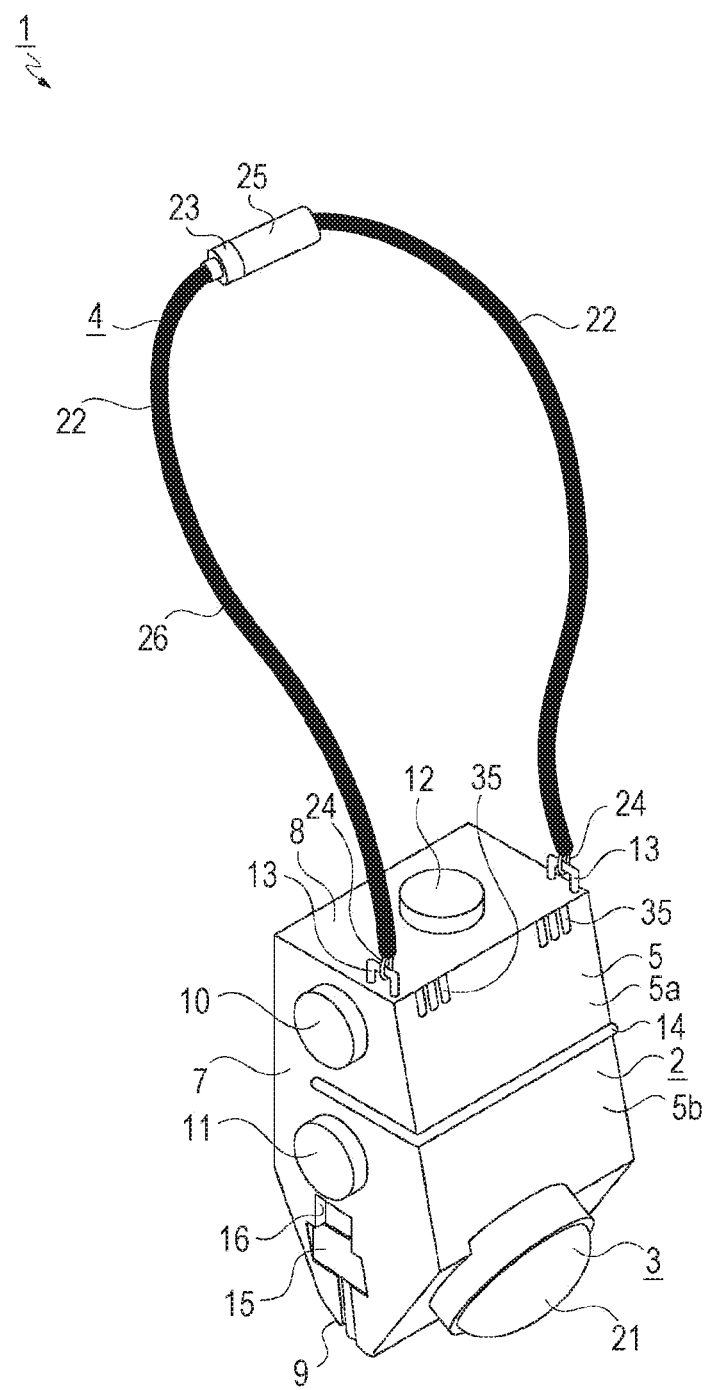
FIG. 14 is a perspective view showing an example in which a microphone is provided only at an upper part of the housing.

Various arrangements can be considered as to the arrangement of one or a plurality of microphones 35. For example, in addition to being provided on each of the upper portion and lower portion of the casing 2 as shown in FIG. 6, the microphone 35 may be provided only on the upper portion of the casing 2 as shown in FIG. 14.

Furthermore, although not shown, the microphone 35 may be provided only on the lower portion of the casing 2.

Moreover, the microphone 35 may be provided in the string part 22 of the strap 4, in the male connector 23, or in the female connector 25.

Furthermore, as the microphone 35, a microphone 35 adopting a bone conduction system may be used.

Moreover, various examples can be considered as to the arrangement and the number of the vibration units 20.

In the example described above, although the example in which the vibration unit 20 is provided in the casing 2 is shown, the vibration unit 20 may be provided in the strap 4. For example, the vibration unit 20 may be provided to the string part 22 of the strap 4, the male connector 23, or the female connector 25.

Figure 15A:
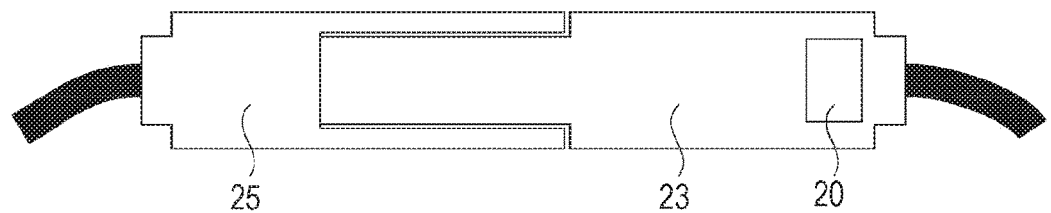
FIGS. 15A, 15B, and 15C are explanatory views showing an example in which a vibration unit is provided in the connector portion of a strap.
Figure 15B:
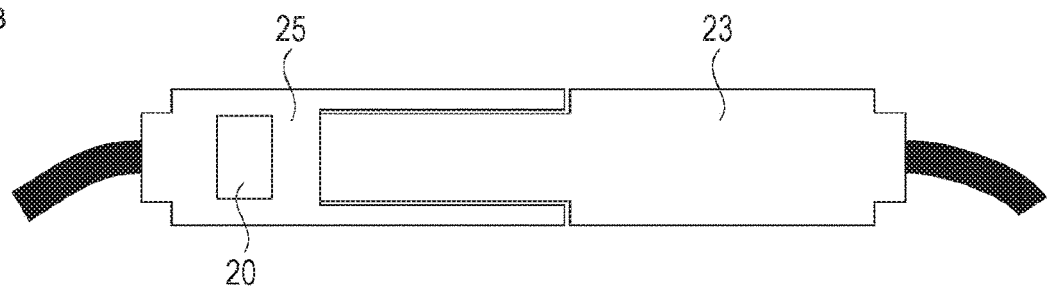
Figure 15C:
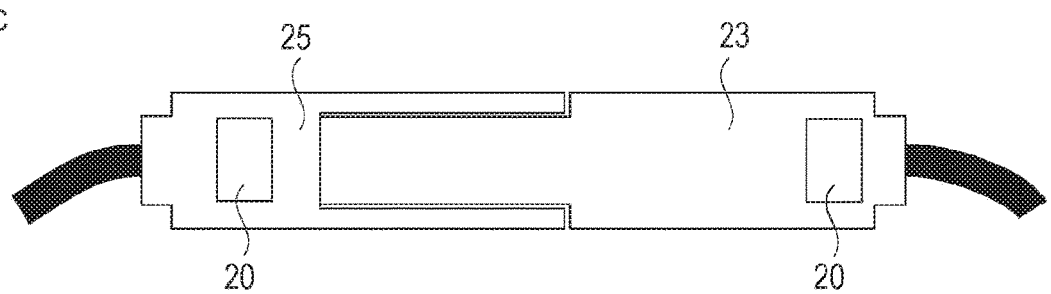

FIGS. 15A, 15B, and 15C show some examples in which the vibration unit 20 is provided to the male connector 23 and the female connector 25.

In the example shown in FIG. 15A, the vibration unit 20 is provided only in the male connector 23, and in the example shown in FIG. 15B, the vibration unit 20 is provided only in the female connector 25.

By providing the vibration unit 20 in one connector, it is possible to efficiently notify an imaging person using the vibration unit 20 while reducing the number of components and the cost.

In the example shown in FIG. 15C, the vibration units 20 and 20 are provided on both the male connector 23 and the female connector 25. By providing the vibration unit 20 in both connectors, it is possible to give a reliable notification to the imaging person by strong vibration. Furthermore, the notification pattern can be increased by providing two vibration units 20 and 20. For example, a notification pattern for vibrating only the vibration unit 20 provided in the male connector 23, a notification pattern for vibrating only the vibration unit 20 provided in the female connector 25, a notification pattern for vibrating both of the vibration units 20 and 20 alternately, or the like can be used. Accordingly, it is possible to give notification of a plurality of pieces of information using the vibration unit 20 by giving different pieces of notification information to each.

Note that the imaging apparatus 1 is used by hanging the strap 4 on the neck so that the connector portion contacts the neck of the imaging person. Accordingly, as shown in each drawing, by providing the vibration unit 20 in the connector portion, it is possible to transmit the vibration to the neck portion of the imaging person, so that the notification can be made reliably and easily noticed by the imaging person.

An example in which the attachment unit 500 including the optical system and the detecting unit 131 is attached to another camera device 501 will be described. Note that the optical system 3 included in the attachment unit 500 may be a part of lenses or the like for complementing the optical system included in the camera device 501. For example, the camera device 501 is a smartphone, and the attachment unit 500 includes a fisheye lens 21 or the like for complementing the optical system of the smartphone. In other words, a desired image may be obtained by combining the optical system of the attachment unit 500 and the optical system of the camera device 501.

Figure 16:
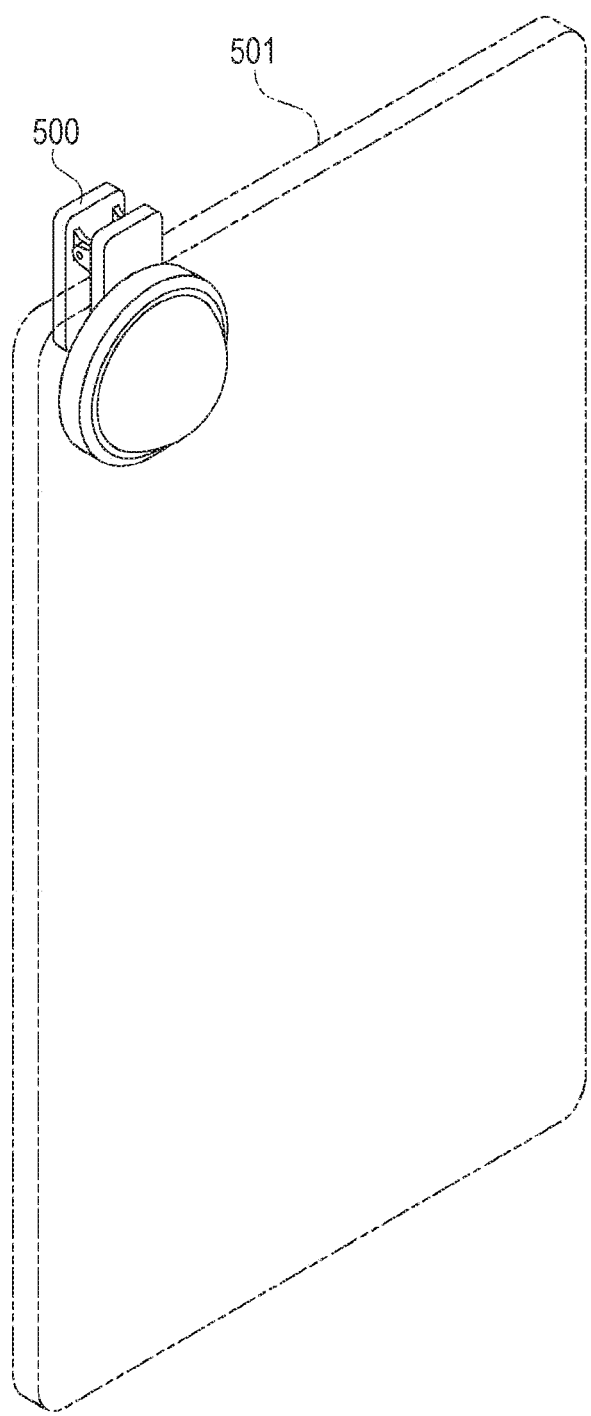
FIG. 16 is an explanatory view showing another form of the imaging apparatus.

FIG. 16 shows an example in which the attachment unit 500 is attached to a smartphone as the camera device 501. The optical system included in the attachment unit 500 includes a fisheye lens.

Even if the imaging apparatus 1 includes such a camera device 501 and the attachment unit 500, the various effects described above can be obtained.

Figure 17:
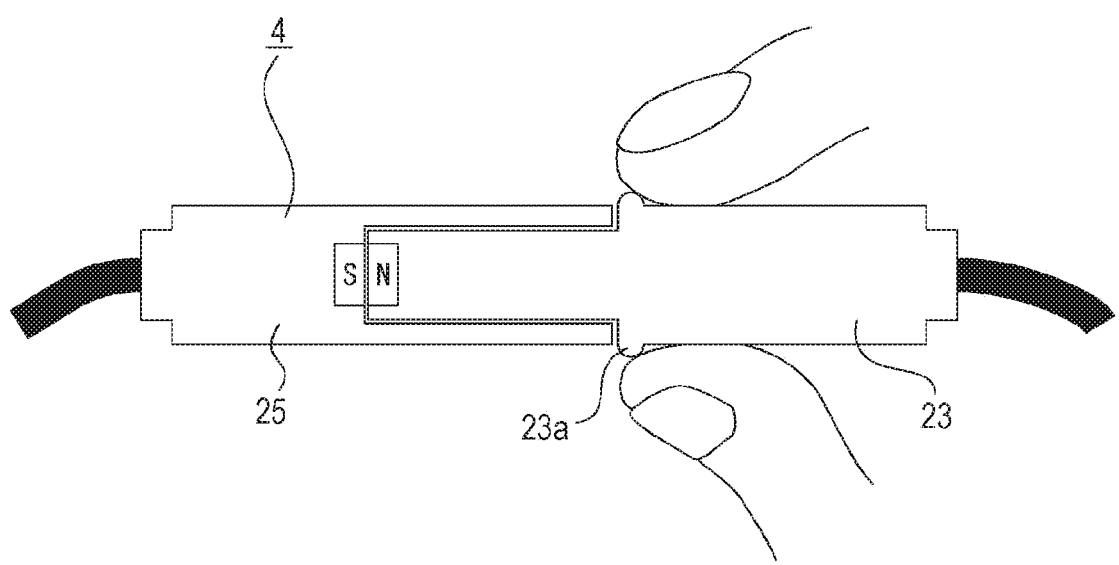
FIG. 17 is a view showing another example of the connector portion of the strap.

FIG. 17 is a view showing another example of the connector portion.

The male connector 23 includes an insertion portion inserted into the female connector 25 and a non-insertion portion other than the insertion portion, and a flange-shaped gripping portion 23a may be formed at an end portion of the non-insertion portion.

In a case of inserting and attaching the male connector 23 to the female connector 25, the finger hooks on the gripping portion 23a so that the finger does not slip toward the female connector 25 than the gripping portion 23a.

This prevents the finger from being pinched between the male connector 23 and the female connector 25.

Furthermore, in a case where the male connector 23 is removed from the female connector 25, the force required for removal can be reduced by hooking the finger on the gripping portion 23a. In other words, it is easy to remove.

2. Shift of Operation State

Figure 18:
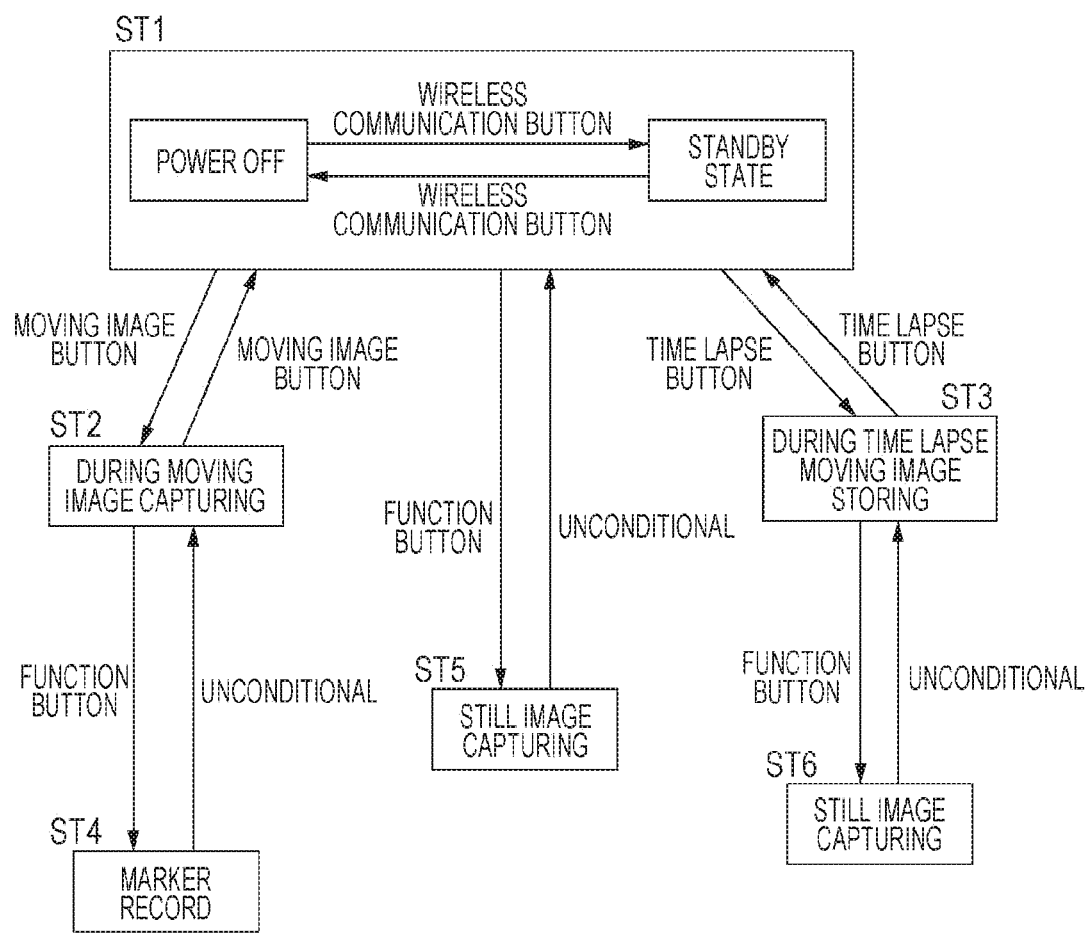
FIG. 18 is a state shift diagram of an operation state.

An example of the shift of the operation state of the imaging apparatus 1 is shown in FIG. 18.

A state ST1 indicates that the imaging apparatus 1 is in the "power off state" or the "standby state".

In this case, the standby state refers to a state in which wireless communication is possible with an external device by a communication method such as wireless fidelity (Wi-Fi, registered trademark), for example. For example, in a state in which wireless communication with an external device such as a portable terminal is established, the imaging person can perform operation corresponding to the above-described moving image button 10, time lapse button 11, and function button 12 by the operation of the external device.

Switching between the power off state and the standby state is performed, for example, by pressing the wireless communication button 37 described above. The wireless communication button 37 is not provided, for example, on the outer circumferential surface of the casing 2 in order to prevent an erroneous operation, and is provided inside the casing 2 which enables operation when the lid part 6a that shields an accommodation part of the battery 19 is opened.

In the state ST1, when the moving image button 10 is pressed, the state shifts to a "moving image capturing state" set as a state ST2. The moving image capturing state is a state in which an image formed by the optical system 3 is captured at a predetermined frame rate to generate/store moving image data. In this state, for example, when the notifying unit 14 lights in red, notification of the imaging state to the surroundings is performed.

When the time lapse button 11 is pressed in the state ST1, the state shifts to a "time lapse moving image storing state" set as a state ST3. In the time lapse moving image storing state, effective frames are intermittently extracted from continuous frames to be captured, and moving image data (fast-forwarding moving image) is generated and stored. In this state, for example, when the notifying unit 14 lights in blue, notification of the imaging state to the surroundings is performed.

Note that the moving image data as the time lapse moving image may be generated by alternately shifting the time lapse moving image storing state and the power off state. Specifically, for example, in a case of capturing each of still images constituting a time lapse moving image at an interval of 3 seconds, after capturing one still image, the imaging apparatus 1 may be shifted to the power off state until the next imaging timing comes. Alternatively, processing to shift the imaging element to the sleep mode or processing to shift the signal processing unit (Digital Signal Processor (DSP) or the like) to the low power consumption mode may be performed.

As a result, the power consumed by the imaging apparatus 1 can be reduced when generating the time lapse moving image data, so that the imaging time can be extended.

Furthermore, the moving image data generated by the imaging apparatus 1 is the same as normal moving image data, and thinning of still image data as a component may be performed from the moving image data on another information processing apparatus that performs the editing at the time of editing the moving image data to generate a time lapse moving image.

As a result, the processing of the imaging apparatus 1 of generating/storing moving image data in the state ST2 and the processing of the imaging apparatus 1 of generating/storing the time lapse moving image data in the state ST3 are substantially the same, so that the processing can be simplified.

When the function button 12 is pressed in the moving image capturing state in the state ST2, the state shifts to a "marker recording state" set as a state ST4. In the marker recording state, editing points for later moving image editing are recorded. For example, it is possible to reproduce moving image data from a scene where a marker is recorded at the time of moving image editing, delete moving image data based on a portion where the marker is recorded, or the like.

After the marker is recorded in the marker recording state, the imaging apparatus 1 automatically shifts to the moving image capturing state of the state ST2.

In the time lapse moving image storing state of the state ST3, when the function button 12 is pressed, the state shifts to a "still image capturing state" set as a state ST6. In the still image capturing state, an image formed by the optical system 3 is captured and stored as still image data.

After the still image is stored in the still image capturing state, the imaging apparatus 1 automatically shifts to the time lapse moving image storing state of the state ST3.

Note that in a case where the function button 12 is pressed in the state ST3, the state may be shifted not to the state ST6 but to the state ST4. In other words, a marker may be recorded in the frame of the time lapse moving image performed immediately before or after.

Furthermore, these shifting may be switched on the basis of the operation mode of pressing the function button 12. For example, in a case where the function button 12 is pressed for a short time, the state may shift from the state ST3 to the state ST6, and in a case where the function button 12 is pressed for a long time, the state may shift from the state ST3 to the state ST4.

Alternatively, the shift destination state may be switched according to the number of times the function button 12 is pressed within a predetermined time.

In the state ST1, when the function button 12 is pressed, the state shifts to a "still image capturing state" set as a state ST5. In the still image capturing state, an image formed by the optical system 3 is captured and stored as still image data.

After the still image is stored in the still image capturing state, the imaging apparatus 1 automatically shifts to the state ST1.

Note that, in the still image capturing state set as the state ST5 and the state ST6, an electronic shutter sound or the like may be output from the audio output unit provided in the casing 2 at the timing of storing the still image data. This makes it known to the surrounding people that the still image has been captured.

Furthermore, notification may be performed by blinking the notifying unit 14, for example, instead of sound output. Of course, the sound output and lighting of the notifying unit 14 may be performed simultaneously.

By performing notification according to each state, it is possible to prevent an image from being captured without a subject person being aware.

The notifying unit 14 performs notification according to each of the above-described states, but may give notification of other states. For example, in a state where the consumption of the battery 19 included in the imaging apparatus 1 is large and the remaining operation time is short, the notifying unit 14 may blink in red, for example, to give notification of a decrease in battery capacity.

As a result, the imaging person can recognize the battery decrease, and can take measures such as withholding the operation in order to extend the imaging time.

Furthermore, in order to notify that the card type storage medium is not inserted, the notifying unit 14 may be caused to turn on red and blue alternately.

Note that, in order to simultaneously give notification of the state of the states ST1 to ST6 and the decrease in battery capacity, the notifying unit 14 provided over the right side surface portion 7, the upper portion 5a of the front surface portion 5, and the left side surface portion 7 may be separated partially so that a plurality of notification functions is provided. For example, a part of the notifying units 14 provided on the left and right side surface portions 7 may blink in red to give notification of a decrease in battery capacity, and a part of the notifying units 14 provided in the information unit 5a of the front surface portion 5 may blink in red to notify that the imaging apparatus 1 is in the state ST1.

Other than this, a plurality of notification functions may be divided in time series. Specifically, after giving notification about the decrease in the battery capacity for 3 seconds, notification of which state the imaging apparatus 1 is for 3 seconds may be given.

Furthermore, as described above, in the imaging apparatus 1, image data generation as a moving image including each frame at a predetermined frame rate (moving image capturing in the state ST2) and image data generation as an intermittent moving image having an intermittent frame as a valid frame at a predetermined frame rate (time lapse moving image storing in the state ST3) can be selectively performed.

In other words, at the time of action, the imaging person can select the recording of the moving image and the intermittent moving image (time lapse moving image).

Furthermore, time lapse moving image can reduce the amount of data in a longer-time moving image or enables enjoying unique video effects of time lapse moving image.

3. Internal Configuration Example I of Imaging Apparatus

An internal configuration example I of the imaging apparatus 1 will be described with reference to FIG. 19.

Figure 19:
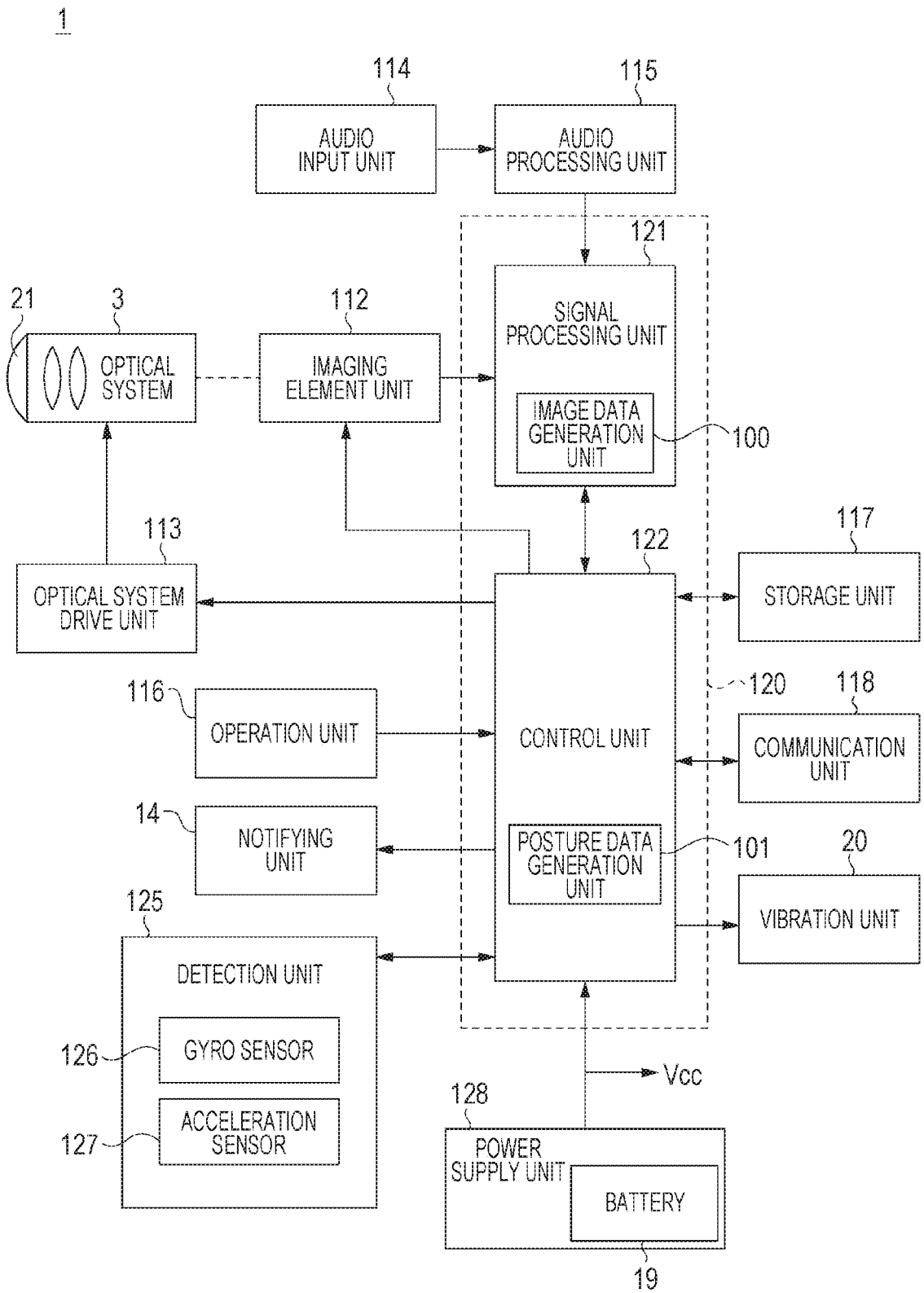
FIG. 19 is a functional block diagram of the imaging apparatus.

As shown in FIG. 19, the imaging apparatus 1 includes an optical system 3, an imaging element unit 112, an optical system drive unit 113, an audio input unit 114, an audio processing unit 115, an operation unit 116, a storage unit 117, a communication unit 118, a signal processing unit 121, a control unit 122, a detection unit 125, a power supply unit 128, a vibration unit 20, and a notifying unit 14.

First, the optical system 3, the imaging element unit 112, and the signal processing unit 121 are provided as an imaging unit that captures an image by a lens optical system and generates image data.

The optical system 3 is configured to have a fisheye lens 21, a focus lens, a condenser lens, and the like. Moreover, it is also considered that a zoom lens and an aperture mechanism are provided. The light from the subject is collected on the imaging element unit 112 by the optical system 3.

The fisheye lens 21 collects light by projection (for example, equidistant projection) other than central projection and guides the light to the imaging element unit 112 in the subsequent stage. Note that the projection method of the fisheye lens 21 is not limited to equidistant projection as long as it is other than central projection. For example, it may be orthographic projection or isometric projection.

Furthermore, the image captured using the fisheye lens 21 is included in the category of what is called a wide angle image.

The imaging element unit 112 has an imaging element such as a charge coupled device (CCD) or a complementary metal oxide semiconductor (CMOS), and a peripheral circuit system.

The imaging element unit 112 performs, for example, correlated double sampling (CDS) processing, automatic gain control (AGC) processing, and the like on the electric signal obtained by photoelectric conversion in the imaging element, and further performs analog/digital (A/D) conversion processing. Then, an imaging signal as digital data is output to the signal processing unit 121 in the subsequent stage.

The imaging signal includes a plurality of pixels arrayed in a two-dimensional grid, obtained by the array of imaging elements, and includes a circular fisheye image as a subject image incident through the fisheye lens 21.

The optical system drive unit 113 drives the focus lens in the optical system 3 on the basis of the control of the control unit 122 to perform the focus operation.

Furthermore, in a case where the optical system 3 is provided with a stop mechanism or a zoom lens, the optical system drive unit 113 drives the stop mechanism in the optical system 3 on the basis of the control of the control unit 122 to perform exposure adjustment, or drives the zoom lens to perform a zoom operation, in some cases.

The signal processing unit 121 is configured as an image processing processor by, for example, a DSP or the like. The signal processing unit 121 performs various types of signal processing on the digital signal (captured image signal) from the imaging element unit 112.

For example, the signal processing unit 121 performs noise removal processing, color correction processing, edge enhancement processing, resolution conversion processing, codec processing, and the like on the captured image signal.

In the case of the present embodiment, the imaging apparatus 1 normally performs moving image capturing as a moving image or a time lapse moving image, and thus the signal processing unit 121 exerts functions as an image data generation unit 100 that generates image data as a moving image from the output of the imaging element unit 112.

As the audio input unit 114, one or a plurality of microphones 35 described above is provided. The audio signal collected by the microphone 35 is subjected to processing such as amplification, equalization, AD conversion, and the like in the audio processing unit 115 and is supplied to the signal processing unit 121 as digital audio data.

The digital audio data is subjected to necessary processing such as digital filter processing, noise removal, encoding, and the like in the signal generation unit 121 and recorded as audio data accompanying the image data.

The control unit 122 includes a microcomputer (operation processing unit) including a central processing unit (CPU), a read only memory (ROM), a random access memory (RAM), a flash memory, and the like.

The CPU performs programs stored in the ROM, flash memory, or the like to control the entire imaging apparatus 1 in an integrated manner.

The RAM is used as a work area for various data processing of the CPU, and is used for temporary storage of data, programs, and the like.

The ROM and flash memory (nonvolatile memory) are used to store the operating system (OS) for the CPU to control each part, content files such as image files, application programs for various pieces of operation, firmware, or the like.

Such a control unit 122 controls operation of each necessary unit for various signal processing instructions in the signal processing unit 121, imaging operation according to the operation of the imaging person, storage and reproduction operation in the storage unit 117, camera operation such as focus/exposure adjustment, communication operation by the communication unit 118 with the external device, or the like.

Furthermore, the control unit 122 outputs image data after signal processing to the storage unit 117 or the communication unit 118 by giving an instruction to the signal processing unit 121.

Moreover, in the present embodiment, the control unit 122 performs processing for generating posture data indicating the posture of the imaging apparatus 1 on the basis of the detection information from the detection unit 125. In particular, posture data is generated corresponding to each frame of image data (moving image) generated by the signal processing unit 121. That is, the control unit 122 exerts the function as the posture data generation unit 101 that generates posture data of the casing of the imaging apparatus 1 at the timing corresponding to each frame of the image data. By generating posture data corresponding to each frame of the image data, it is possible to realize each correction such as blur correction as described later.

Note that the signal processing unit 121 and the control unit 122 may be integrated as a one-chip microcomputer 120 or the like.

The storage unit 117 stores the image data as a moving image, a time lapse moving image, or a still image generated by the signal processing unit 121 (image data generation unit 100) in the storage medium on the basis of the control of the control unit 122. The storage medium may be removable as a memory card, an optical disc, a magnetic tape, or the like, or may be a fixed type hard disk drive (HDD), a semiconductor memory module, or the like.

Furthermore, an encoder or a decoder may be provided in the storage unit 117 to perform compression encoding and decompression decoding of image data, and coded data may be recorded on a storage medium.

Furthermore, the storage unit 117 also stores the posture data generated by the control unit 122 (the posture data generation unit 101) in the storage medium.

Such a storage unit 117 is an aspect of a data output unit that outputs image data and posture data to a storage medium.

In other words, by storing the image data and the posture data in the storage medium, for example, each piece of data can be delivered to the external device. Accordingly, various pieces of processing such as editing processing (details will be described later) can be performed by the external device. Therefore, there is no need to provide a program region for performing these pieces of processing by the imaging apparatus 1 in the storage region of the imaging apparatus 1, and the storage region can be reduced.

The communication unit 118 performs wired or wireless communication with an external device (not shown) on the basis of the control of the control unit 122. In other words, transmission of image data and posture data to an external device, reception of control data from an external device, and the like are performed.

For example, under the control of the control unit 122, the communication unit 118 performs processing for transmitting the image data and posture data stored in the storage unit 117 to an external device. As a result, the imaging apparatus 1 outputs image data and posture data to an external device (not shown) so that the image data as a moving image captured by the external device can be processed using the posture data.

Furthermore, as described above, it is also possible to receive operations corresponding to the moving image button 10, the time lapse button 11, and the function button 12 from an external device by wireless communication or the like.

Figure 20A:
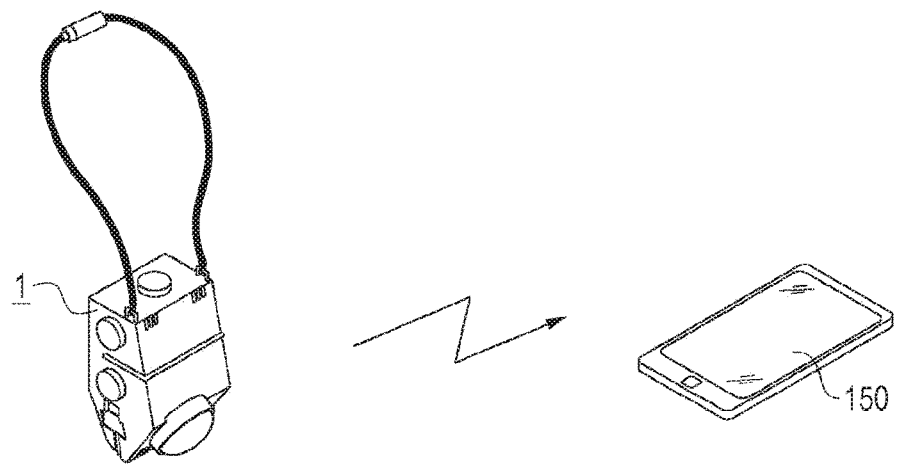
FIGS. 20A, 20B, and 20C are explanatory views of communication between the imaging apparatus and an external device.

For example, as shown in FIG. 20A, the communication unit 118 can transmit image data and posture data to the information processing apparatus 150 as an external device by wireless communication. As wireless communication, for example, it can be considered that communication by a communication method such as a wireless communication standard such as Wi-Fi or Bluetooth is performed.

Figure 20B:
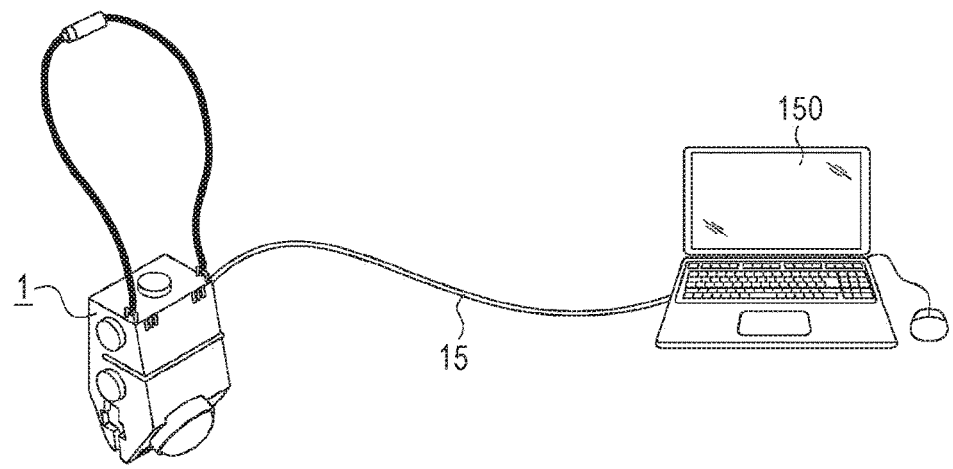

Furthermore, for example, as shown in FIG. 20B, the communication unit 118 can transmit image data and posture data to the information processing apparatus 150 by wired communication. As wired communication, for example, communication using a connector cable 15 such as a USB cable can be considered.

Furthermore, the communication unit 118 may perform communication by various networks such as the Internet, a home network, or a local area network (LAN) as a network communication unit, and transmit and receive various types of data to and from servers on the network, a terminal, or the like.

Such a communication unit 118 is an aspect of a data output unit that outputs image data and posture data to an external device.

In other words, it becomes possible to provide image data and posture data to an external device.

Accordingly, various types of processing (details will be described later) such as editing processing can be performed by the external device, and there is no need to provide a program region for performing those pieces of processing in the storage region of the imaging apparatus 1, so that the storage region can be reduced.

Figure 20C:
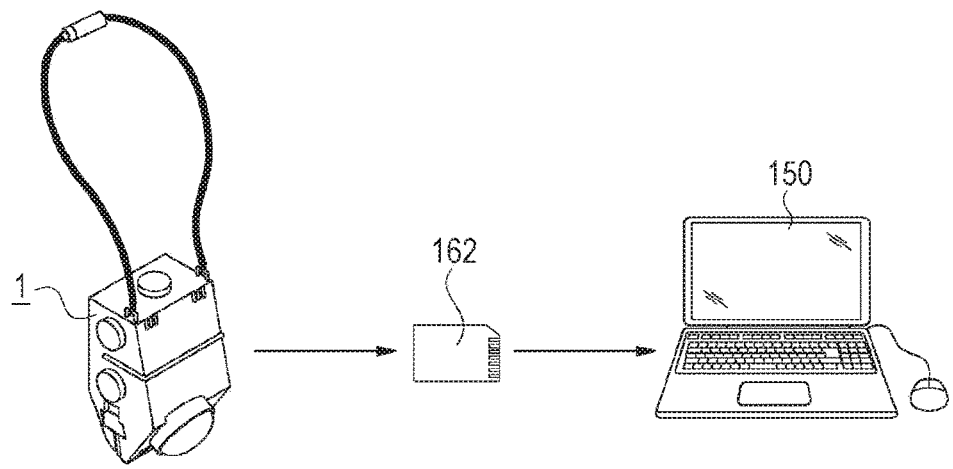

Note that, in a case where image data and posture data are transmitted to the information processing apparatus 150, the transmission may be performed not only via the communication unit 118, but also via a storage medium such as a memory card 162 in which the image data and posture data are stored by the storage unit 117 as shown in FIG. 20C.

The operation unit 116 in FIG. 19 comprehensively shows an input function for inputting operation of the imaging person. In other words, operators of the moving image button 10, the time lapse button 11, the function button 12, and the wireless communication button 37 described above are collectively shown as the operation unit 116.

Operation information of these pieces of operation is supplied to the control unit 122. The control unit 122 performs necessary control to perform the above-described operation shift according to the operation information.

The detection unit 125 comprehensively shows various sensors. Specifically, a gyro sensor 126 for detecting a posture of the imaging apparatus 1 and, for example, a camera shake, an acceleration sensor 127 for detecting a movement acceleration and a gravity direction of the imaging apparatus 1, and the like are provided. The gyro sensor 126 is a three-axis sensor that detects so-called angular velocity in the x, y, and z axis directions. The acceleration sensor 127 is also a three-axis sensor that detects acceleration in the x, y, and z axis directions.

Moreover, although not shown, the detection unit 125 may be provided with an illuminance sensor for detecting an external illuminance for exposure adjustment and the like, a distance measuring sensor for measuring a subject distance, and the like.

The various sensors of the sensor unit 125 each transmit a detection signal to the control unit 122. The control unit 30 can perform various controls using the information detected by the detection unit 125.

In particular, as described above, the control unit 122 performs processing of generating posture data on the basis of detection signals of the gyro sensor 126 and the acceleration sensor 127 by using the function as the posture data generation unit 101.

The vibration unit 20 includes a vibration piece that constitutes a so-called vibrator and its drive system, and generates vibration under the control of the control unit 122.

In the case of the present embodiment, the vibration unit 20 vibrates to warn of the remaining battery level.

As described above, the notifying unit 14 includes an LED that emits light on the casing 2, an LED drive circuit, and a cover lens, and emits light under the control of the control unit 122.

For example, by emitting light during moving image capturing operation, notification is performed to the surrounding people that moving image capturing is performed.

The power supply unit 128 generates a necessary voltage using the battery 7 as a voltage source, and supplies operation power supply Vcc to each unit.

In the present embodiment, the control unit 122 detects the voltage of the battery 7 to monitor the remaining amount of the battery. As a result, for example, when the battery remaining amount decreases, the vibration by the vibration unit 20 is performed to notify the imaging person of the battery remaining amount shortage.

4. Configuration of Information Processing Apparatus

Next, as shown in FIGS. 20A, 20B, and 20C, the configuration of the information processing apparatus 150 that receives image data and posture data from the imaging apparatus 1 will be described. The information processing apparatus 150 is realized by, for example, a hardware configuration as shown in FIG. 21.

Figure 21:
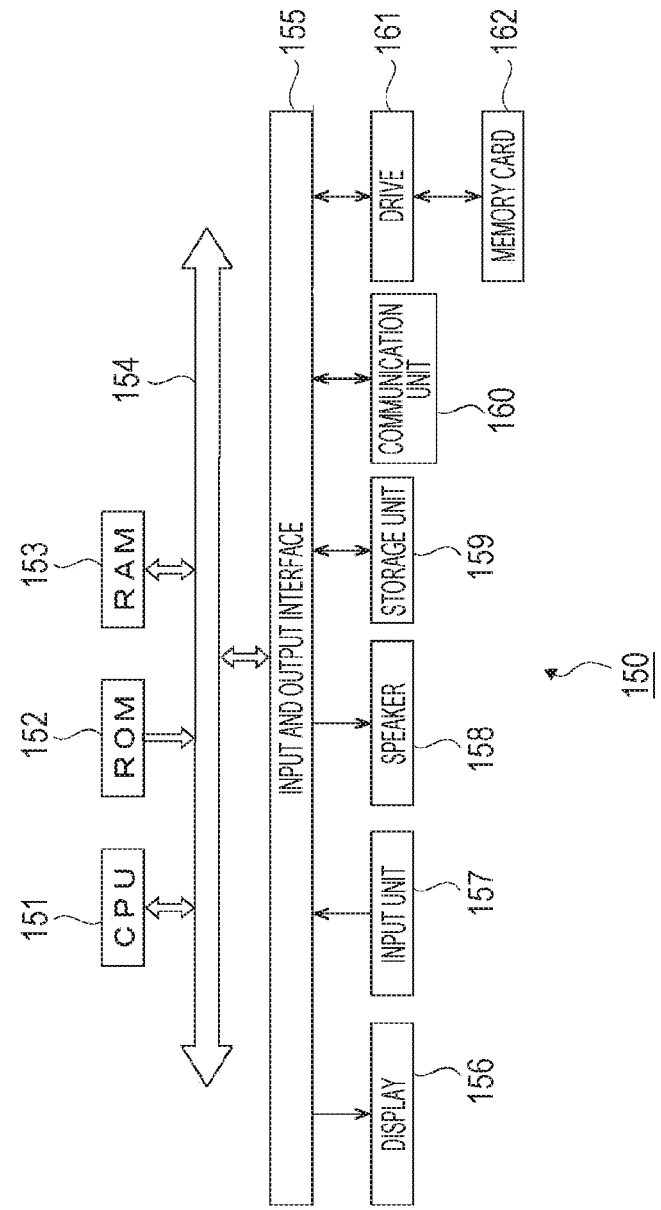
FIG. 21 is an explanatory diagram of a hardware configuration of the information processing apparatus.

The information processing apparatus 150 includes a central processing unit (CPU) 151, a read only memory (ROM) 152, and a random access memory (RAM) 153 as shown in FIG. 21.

The CPU 151 performs various types of processing according to a program stored in the ROM 152 or a program loaded from the storage unit 159 into the RAM 153. Furthermore, the RAM 153 appropriately stores also data or the like necessary for the CPU 151 to execute various types of processing.

The CPU 151, the ROM 152, and the RAM 153 are mutually connected via a bus 154. An input and output interface 155 is also connected to the bus 154.

To the input and output interface 155, a display 156 including such as a liquid crystal panel or an organic electroluminescence (EL) panel, an input unit 157 including such as a keyboard and a mouse, a speaker 158, a storage unit 159 including such as a hard disk drive (HDD) or a communication unit 160, and the like can be connected.

The display 156 may be integral with or separate from the information processing apparatus 150. For example, display of a captured image or an image after correction processing as described later is performed.

The input unit 157 means an input device used by a user who uses the information processing apparatus 150.

The communication unit 160 performs communication processing via a network including the Internet, and communication with devices in peripheral units. At least the communication unit 160 can perform wired or wireless communication with the communication unit 118 of the imaging apparatus 1.

The drive 161 is connected to the input and output interface 155 as needed, the memory card 162 is mounted, and a computer program read from the memory card 162 is installed in the storage unit 159 as needed, or the data processed in the CPU 151 is stored in the memory card 162. Of course, the drive 161 may be a recording and reproduction drive for removable storage media such as a magnetic disk, an optical disc, and a magneto-optical disk.

In such a hardware configuration, various types of processing (described later) as the information processing apparatus 150 of the embodiment can be performed. Specifically, image reproduction and image data editing processing using image data and posture data acquired from the imaging apparatus 1 are performed.

These pieces of processing are realized by software activated by the CPU 151. The program constituting the software is downloaded from a network or read from a removable storage medium and installed in the information processing apparatus 150 of FIG. 21. Alternatively, the program may be stored in advance in an HDD as the storage unit 159 or the like. Then, when the program is activated in the CPU 151, each function of the information processing apparatus 150 is expressed.

Note that the information processing apparatus 150 is not limited to a single information processing apparatus 150 having a hardware configuration as shown in FIG. 21, and a plurality of information processing apparatuses may be systematized. The plurality of information processing apparatuses may be systematized by a LAN or the like, or may be remotely located by a virtual private network (VPN) or the like using the Internet or the like. The plurality of information processing apparatuses may include an information processing apparatus usable by a cloud computing service.

Furthermore, the information processing apparatus 150 can be realized as a personal computer such as a desktop type or a notebook type, or a portable terminal such as a tablet terminal or a smartphone.

The various electronic apparatuses such as an image editing apparatus, a recording and reproducing apparatus, and a television receiver can function as the information processing apparatus 150 by having the configuration as shown in FIG. 21.

5. Posture Data

Posture data generated by the control unit 122 of the imaging apparatus 1 will be described with reference to FIGS. 22 and 23.

The posture data is data indicating the posture of the casing 2 of the imaging apparatus 1 and is generated by the posture data generation unit 101 included in the control unit 122. The posture data is, for example, angular velocity data measured by the gyro sensor 126, acceleration data measured by the acceleration sensor 127, or the like.

Figure 22:
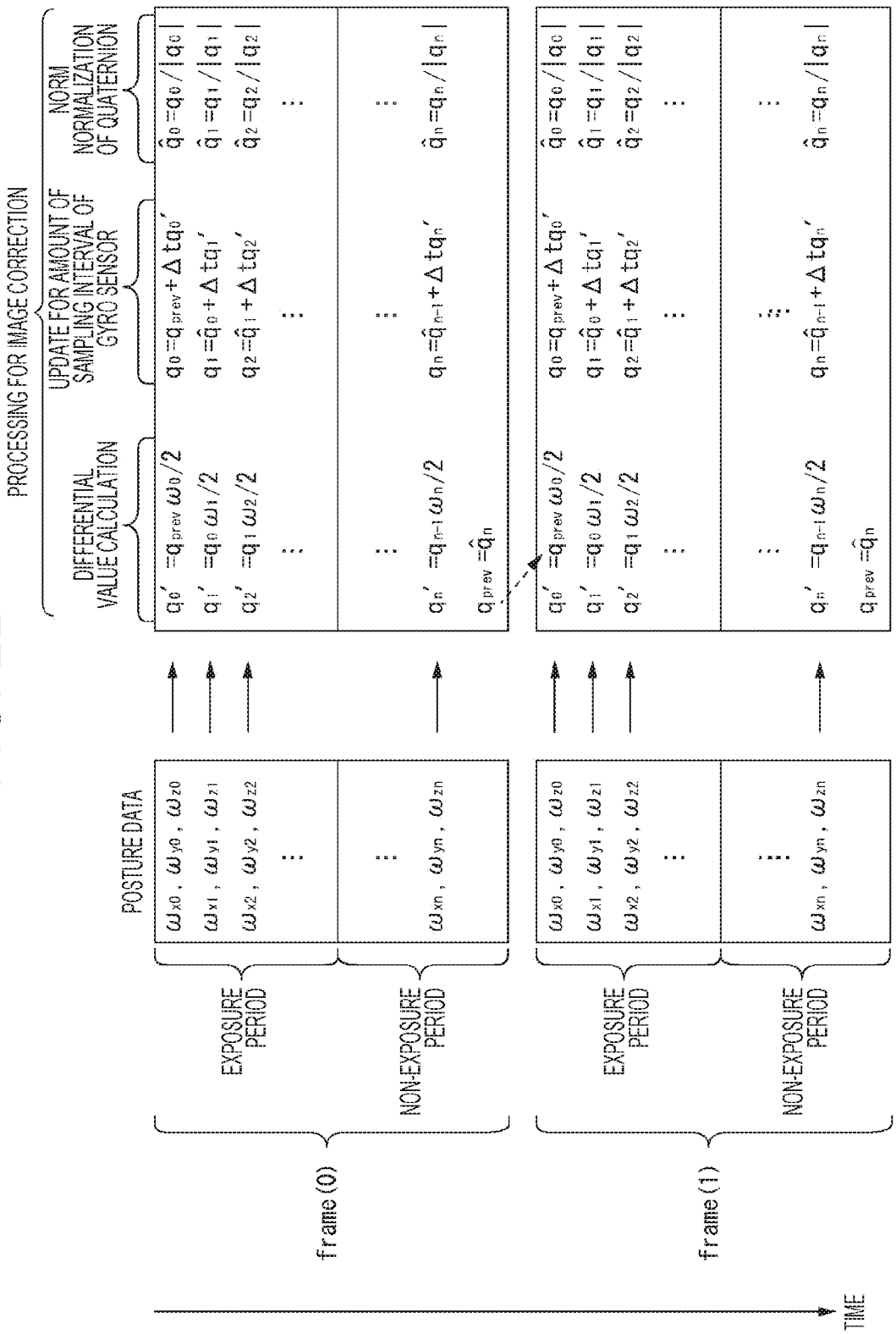
FIG. 22 is an explanatory diagram of posture data and processing for image correction.

FIG. 22 is a diagram showing posture data generated by the control unit 122 of the imaging apparatus 1 and various pieces of processing for image correction performed by the external information processing apparatus 150 that has received the posture data.

For image data as a moving image in which a plurality of frames is continuous, posture data is generated corresponding to each frame period.

FIG. 22 shows a period of two continuous frames, one frame taken as frame (0), and subsequent one frame taken as frame (1). In each frame, detection signals of three axes acquired from the gyro sensor 126 are sampled to acquire angular velocity data $\omega x0$, $\omega y0$, and $\omega z0$ at that time.

Note that, although not shown, detection signals of the three axes of the acceleration sensor 127 are similarly sampled to acquire acceleration data $ax0$, $ay0$, and $az0$ at that time.

The control unit 122 generates the angular velocity data $\omega x0$, $\omega y0$, and $\omega z0$ and the acceleration data $ax0$, $ay0$, and $az0$ as posture data at one sample time point.

The control unit 122 generates such posture data at a predetermined sample timing.

The generated posture data is supplied to the storage unit 117 and stored together with the image data. Then, the posture data is associated with the image data and output to the external information processing apparatus 150 by the communication unit 118 or a storage medium.

The information processing apparatus 150 performs blur correction, gravity direction correction, and the like of image data using posture data acquired from the imaging apparatus 1. For the difference, various types of processing are performed on posture data as shown in FIG. 22 to acquire necessary posture information. The processing for image correction includes, for example, differential value calculation processing, update processing of sampling intervals of the gyro sensor 126, norm normalization processing of quaternions, and the like.

Note that the control unit 122 may calculate such differential values and norm normalized values, include these in the posture data, and transfer them to the information processing apparatus 150.

Here, the control unit 122 generates posture data at one or a plurality of sample timings, for example, for one frame period of image data being captured.

For example, it can be considered that posture data generation is performed at a rate of once per frame period. Furthermore, in order to acquire information indicating more precise posture change, it can be also considered that posture data generation is performed at a plurality of rates in one frame period as shown in FIG. 22.

Note that the exposure period and the non-exposure period in FIG. 22 indicate the exposure period and the non-exposure period of the imaging element determined by the electronic shutter speed of the imaging pixel of the imaging element unit 112.

The period of each frame determined by a predetermined frame frequency can be divided into an exposure period and a non-exposure period, and the exposure period is a time for exposing the light passing through the optical system 3 to the imaging element unit 112, and fluctuates according to the electronic shutter speed. Since the frame period is constant, the longer the exposure period is, the shorter the non-exposure period is, and the shorter the exposure period is, the longer the non-exposure period is.

In the example of FIG. 22, the sampling rate for the detection signal of the gyro sensor 126 is set to a rate of higher frequency than the frame rate, and a plurality of times of posture data generation is performed in one frame period.

Note that posture data generation is performed at a constant period regardless of the exposure period and the non-exposure period.

As described above, the control unit 122 (posture data generation unit 101) generates posture data a plurality of times in one frame period of the image data generated by the image data generation unit 100. By sampling sensor detection data related to the posture at a sampling rate of higher frequency than that of the frame synchronization signal (vertical synchronization signal) and generating posture data, the posture data is information that also indicates posture change during one frame period.

For example, posture change within a frame period also can be detected so that it possible to use posture data that can also be used for so-called rolling distortion correction.

Note that the posture data generation is performed at each sample timing even in the non-exposure period because information regarding the amount of displacement from the initial posture can be acquired by accumulating posture differences at predetermined time intervals.

The image data acquired by the imaging apparatus 1 is a fisheye image. In a fisheye image, blur correction is performed by changing the cut-out position on the virtual spherical surface, but for this purpose, the cut-out position is displaced in the opposite direction to the direction and amount of blur.

In this case, absolute posture information of the imaging apparatus 1 based on a certain posture (for example, the imaging direction based on the posture at the start of imaging) is required. For that purpose, it is necessary to accumulate posture data (information of angle change) acquired at each timing.

In consideration of this, when posture data generation corresponding to a sampling rate higher than the frame rate is considered, if posture data generation is suspended in the non-exposure period, timing at which posture displacement cannot be generated occurs. This makes the posture information as an absolute position inaccurate. Therefore, even if posture data generation is synchronized with a moving image frame, posture data generation is performed according to a predetermined sampling rate without being influenced by frame operation including electronic shutter speed, which enables positional information for blur correction to be always calculated correctly.

As another example, generation of posture data in a case of performing time lapse moving image capturing for generating an intermittent frame moving image will be described with reference to FIG. 23.

When capturing a time lapse moving image, image data is generated with an interval sufficiently long with respect to the frame rate. In other words, it is moving image data generated by intermittent frames.

Figure 23:
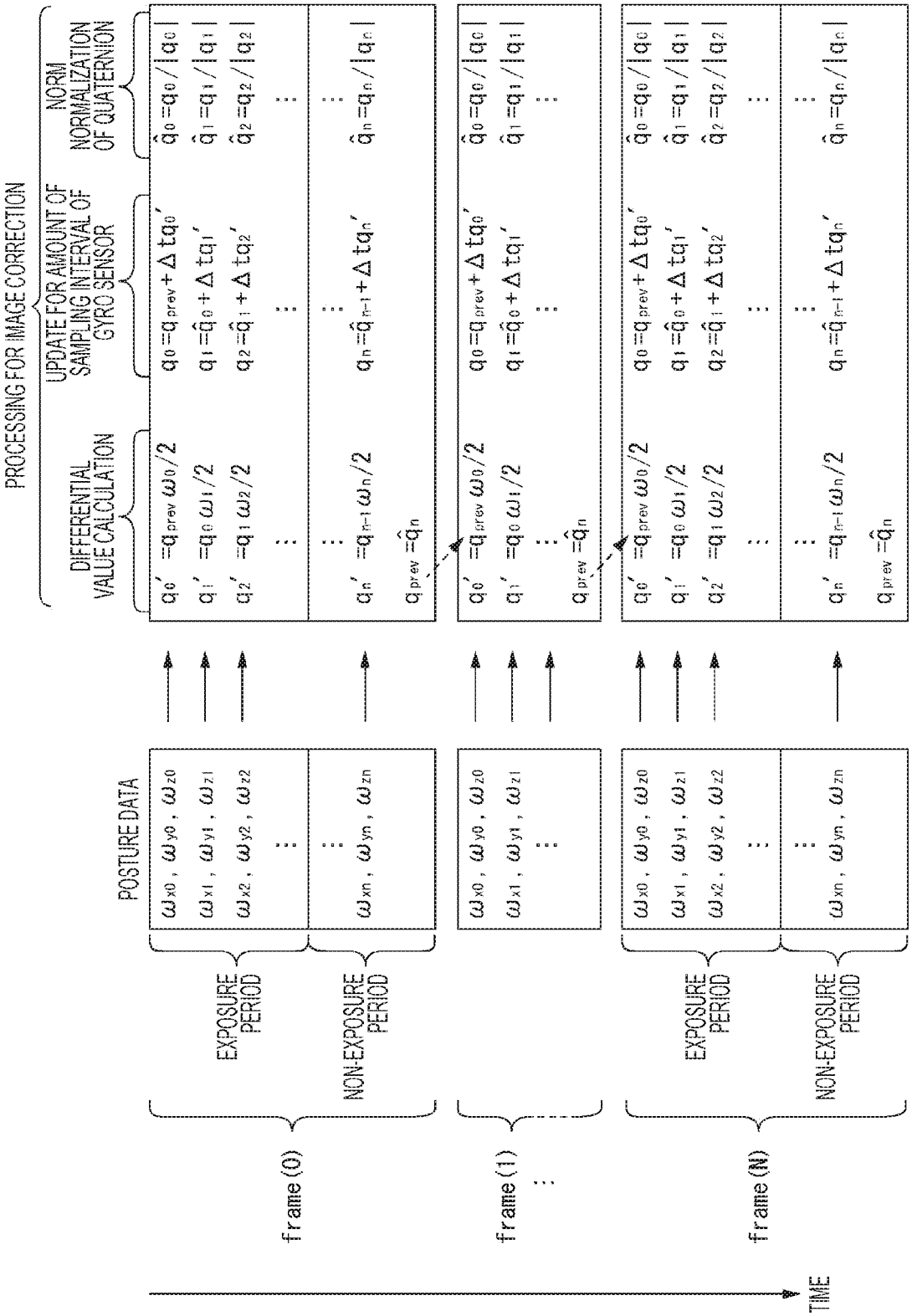
FIG. 23 is an explanatory diagram of posture data and processing for image correction.

In the example of FIG. 23, frames (0) to frame (N) which are frames to be imaged are shown. For example, frame (0) and frame (N) represent effective frames (frames recorded as image data), and frame (1) to frame (N−1) represent ineffective frames not included in the image data.

For example, in time lapse moving image shooting in which an interval of about 3 seconds is inserted with respect to a frame rate of 30 frames per second (fps), imaging is performed from the initial imaging of frame (0) that is determined as an effective frame, via frame (1) to frame (89) that are determined as ineffective frames, to frame (90) that is the next effective frame. The next effective frame of frame (90) is frame (180).

Frames included and recorded in image data as time lapse moving images are only effective frames, in this case, frame (0), frame (90), frame (180), . . . .

As shown in FIG. 23, acquisition of angular velocity data by sampling of detection signals of the gyro sensor 126 is continued during each effective frame period and ineffective frame period. Furthermore, although illustration is omitted, acquisition of acceleration data by sampling of a detection signal of the acceleration sensor 127 is also continued. Moreover, at each point in time, posture data generation is performed.

In other words, in a case where the image data generation unit 100 generates image data by time lapse imaging as an intermittent frame moving image, the posture data generation unit 101 generates posture data in any of the effective frame period and the ineffective frame period.

By performing posture data generation also in the ineffective frame period, posture differences are accumulated not only in the effective frame period/the ineffective frame period but also at each time point, and information with which the amount of displacement from the initial posture can be determined accurately is acquired.

Note that the sampling rate of the gyro sensor 126 can be considered to be the same for the effective frame and the ineffective frame, but this is not essential. For example, the period of an ineffective frame may be a low sampling rate.

In other words, in a case where the signal processing unit 121 (image data generation unit 100) performs image data generation as an intermittent frame moving image, the control unit 122 (posture data generation unit 100) may set the number of times of generation of posture data in one frame period smaller in the ineffective frame period than the number of times in the effective frame period.

The purpose of generating posture data by sampling detection information of a gyro sensor or an acceleration sensor at a rate higher than the frame rate is intended to cope with rolling distortion. If there is posture data with as few line intervals as possible (as many as possible in one frame period), rolling distortion can be corrected with high accuracy.

On the other hand, camera posture detection for each frame is sufficient for posture data equivalent to once or several times per frame unless rolling distortion correction is considered. In a case of the time lapse moving image, posture data of an unused frame period is naturally not used for rolling distortion. Therefore, by reducing the sampling rate during the ineffective frame period, it is possible to reduce the power consumption on the camera side and reduce the amount of posture data.

Note that, in a case where the condition that at least one piece of posture data corresponding to one frame is to be generated is satisfied, the sampling rate of the ineffective frame period is at least equal to that of the frame synchronization signal (vertical synchronization signal).

The imaging apparatus 1 according to the present embodiment performs moving image capturing of a half celestial sphere image, a full celestial sphere image, and the like by the optical system 3 using a fisheye lens as the optical system 3 of the non-central projection method. In this case, as described above, posture data of the casing 2 corresponding to each frame of the moving image or posture data of the casing 2 corresponding to each sample timing of the gyro sensor 126 is output. As described above, by acquiring posture data of a timing corresponding to each frame, processing using posture data can be performed on image data as a moving image.

Furthermore, the imaging apparatus 1 includes a storage unit 117 and a communication unit 118 as data output units.

The storage unit 117 stores image data and posture data in a storage medium. For example, posture data can be stored together with image data using a built-in card medium or the like. Furthermore, the communication unit 118 is also capable of transmitting image data and posture data to an external device (the information processing apparatus 150).

In other words, the image data generated by the image data generation unit 100 and the posture data generated by the posture data generation unit 101 are output to an external device by wired or wireless communication processing. Alternatively, the image data and the posture data can be delivered by a storage medium such as the memory card 162 or the like.

As a result, the external device (the information processing apparatus 150) can acquire the posture data together with the image data, and the external device can process the image data as a moving image using the posture data later.

In the present embodiment, the posture data generation unit 101 acquires angular velocity change at each time point from the detection information of the three-axis gyro sensor 126, and generates posture data based thereon.

Furthermore, the posture data generation unit 101 acquires the posture change with respect to the gravity direction at each time point according to the detection information of the three-axis acceleration sensor 127, and the magnitude of acceleration applied to the main body (the casing 2 or each unit arranged inside or outside thereof) of the imaging apparatus 1 according to the movement, and generates posture data based thereon.

As a result, the fine posture state of the imaging apparatus 1 can be set as information indicating each frame.

Note that the value of acceleration applied to the main body of the imaging apparatus 1 may be information regarding the intense movement of the main body of the imaging apparatus 1, may be information for achieving reliability of estimation of the gravity direction, and may be a determination material of the executability of correction of the gravity direction as described later.

Furthermore, in the present embodiment, the posture data may include one of the angular velocity data and the acceleration data instead of both. Furthermore, the posture data may be angular velocity data or acceleration data of one or two axes.

Furthermore, in FIGS. 22 and 23, although the angular velocity data and the acceleration data acquired as detection signals of the gyro sensor 126 and the acceleration sensor 127 themselves are treated as posture data, data acquired by subjecting velocity data and acceleration data to each processing for image correction may be used as posture data.

6. Exposure Adjustment

In the imaging apparatus 1 of the present embodiment, the above described posture data is used for exposure control. Here, an example in which adjustment of the electronic shutter speed and gain adjustment of the AGC processing are performed as the exposure control will be described.

This will be specifically described with reference to FIGS. 24A and 24B.

Figure 24A:
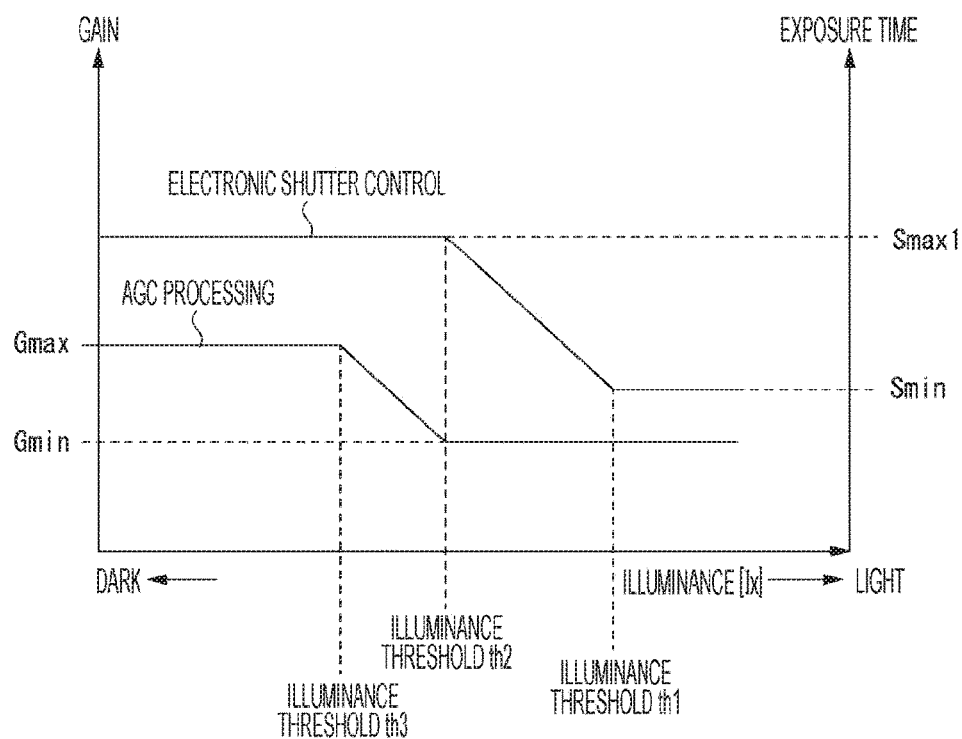
FIGS. 24A and 24B are graphs for explaining exposure adjustment and gain adjustment with respect to illuminance.
Figure 24B:
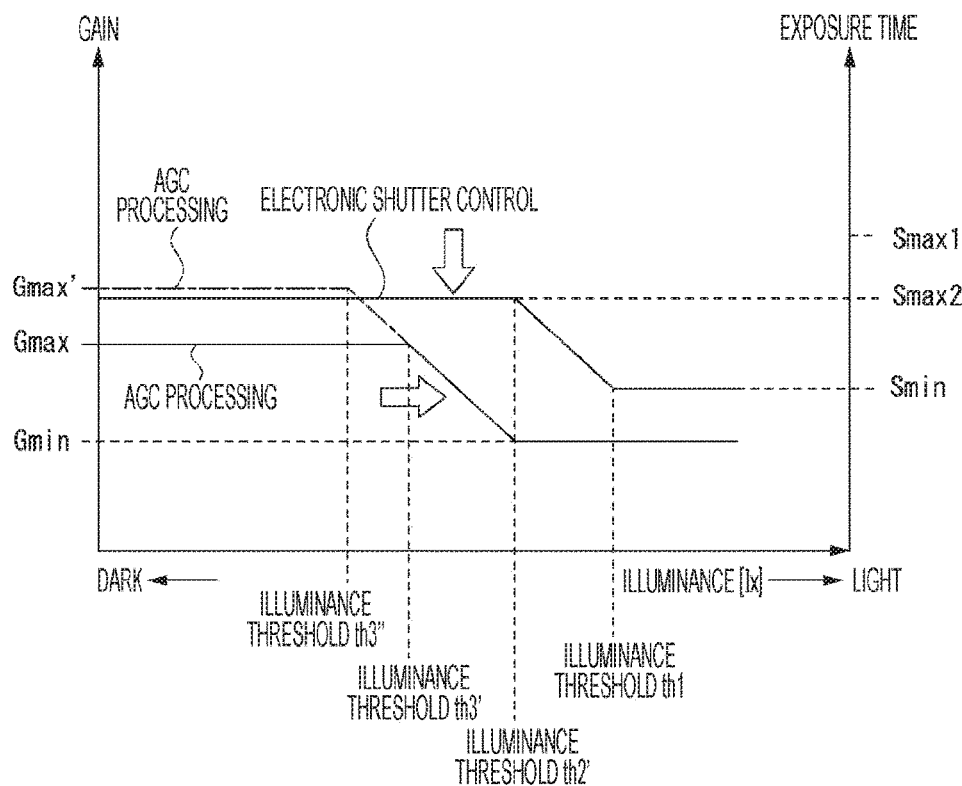

FIGS. 24A and 24B show exposure control characteristics. The horizontal axis of each drawing is the illuminance, and the vertical axis is the exposure time of the electronic shutter and the AGC gain.

In a case where the illuminance is sufficiently large, in other words, in a case where the illuminance lx is larger than an illuminance threshold th1, the exposure time is set to the shortest minimum value Smin within the adjustment range, and the gain of AGC processing is set to the minimum value Gmin within the adjustment range.

On the other hand, in a case where the light amount is insufficient, the exposure adjustment is performed by increasing the exposure time of the electronic shutter or increasing the gain of the AGC processing. However, since the exposure adjustment to increase the gain for the output signal from the imaging element is disadvantageous in terms of noise and the like, electronic shutter control is prioritized.

In the case of the present embodiment, first, in a case where the change in posture data is small, exposure adjustment is performed with the characteristics of FIG. 24A.

In a case where the illuminance Ix is larger than an illuminance threshold th2 and is equal to or smaller than the illuminance threshold th1, the exposure time is increased according to the illuminance Ix. At this time, the gain of the AGC processing remains at the minimum value Gmin.

The maximum value of exposure time for exposure adjustment is "Smax1". It is assumed that the exposure time reaches the maximum value Smax1 when the illuminance Ix is the illuminance threshold th2.

In this case, correspondence to further decrease in the illuminance is not performed with the shutter speed control, but with the AGC gain.

In a case where the illuminance Ix is larger than an illuminance threshold th3 and is equal or smaller than the illuminance threshold th2, the gain of the AGC processing is changed while keeping the exposure time at the maximum value Smax1. In other words, it is raised according to the illuminance Ix.

The maximum value of AGC gain for exposure adjustment is set to "Gmax". It is assumed that the AGC gain reaches the maximum value Gmax when the illuminance Ix is the illuminance threshold th3.

When the illuminance Ix is equal to or smaller than the illuminance threshold th3, the exposure time is set to the maximum value Smax1 and the AGC gain is set to the maximum value Gmax.

On the other hand, FIG. 24B is an example in a case where the change in posture data is large. Specifically, for example, in a case where the amount of change in posture data per unit time is equal to or larger than a threshold, it is determined that the change in posture data is large. In this case, exposure adjustment is performed with the characteristics of FIG. 24B.

As compared to FIG. 24A, the maximum value Smax1 of the exposure time is changed to the maximum value Smax2. Furthermore, illuminance thresholds th2 and th3 for determining a period for performing gain control are changed to illuminance thresholds th2' and th3'.

In a case where the illuminance Ix is larger than the illuminance threshold th1, the exposure time is set to the maximum value Smin, and the gain of AGC processing is set to the minimum value Gmin.

In a case where the illuminance Ix is larger than the illuminance threshold th2' (> illuminance threshold th2) and is equal or smaller than the illuminance threshold th1, the exposure time is adjusted according to the illuminance Ix while keeping the gain of AGC processing at Gmin.

In a case where the illuminance Ix is larger than the illuminance threshold th3' (> illuminance threshold th3) and is equal or smaller than the illuminance threshold th2', the gain of AGC processing is adjusted according to the illuminance Ix while keeping the exposure time at Smax2 (<Smax1).

In a case where the illuminance Ix is equal to or smaller than the illuminance threshold th3', the exposure time is set to the maximum value Smax2 and the AGC gain is set to the maximum value Gmax.

Note that, although the maximum value Gmax is at the same level as that of FIG. 24A in the solid line indicating the AGC processing of the example of FIG. 24B, the gain maximum value may be increased as the maximum value Gmax' as indicated by the one-dot chain line. Furthermore, accordingly, the illuminance threshold th3' is set to an illuminance threshold th3". In a case of FIG. 24B, unless the gain maximum value is increased for that the maximum value Smax1 of the exposure time is changed to the maximum value Smax2, the total gain in a dark scene decreases, resulting in a dark image.

Note that the maximum value Smax1 of the exposure time as the adjustment range is reduced to the maximum value Smax2, and for that, correspondence is performed with gain adjustment by increasing the illuminance threshold th2' to larger than the illuminance threshold th2, and this means that the increase in exposure time to raise brightness of the captured image is more conservative than that in a case where the change in posture data is small.

The maximum value Smax2 of the exposure time and the illuminance thresholds th3' and th2' are set in consideration of the noise disadvantage due to the increase of the AGC gain and the influence of blurring due to the long exposure time.

Figure 25:
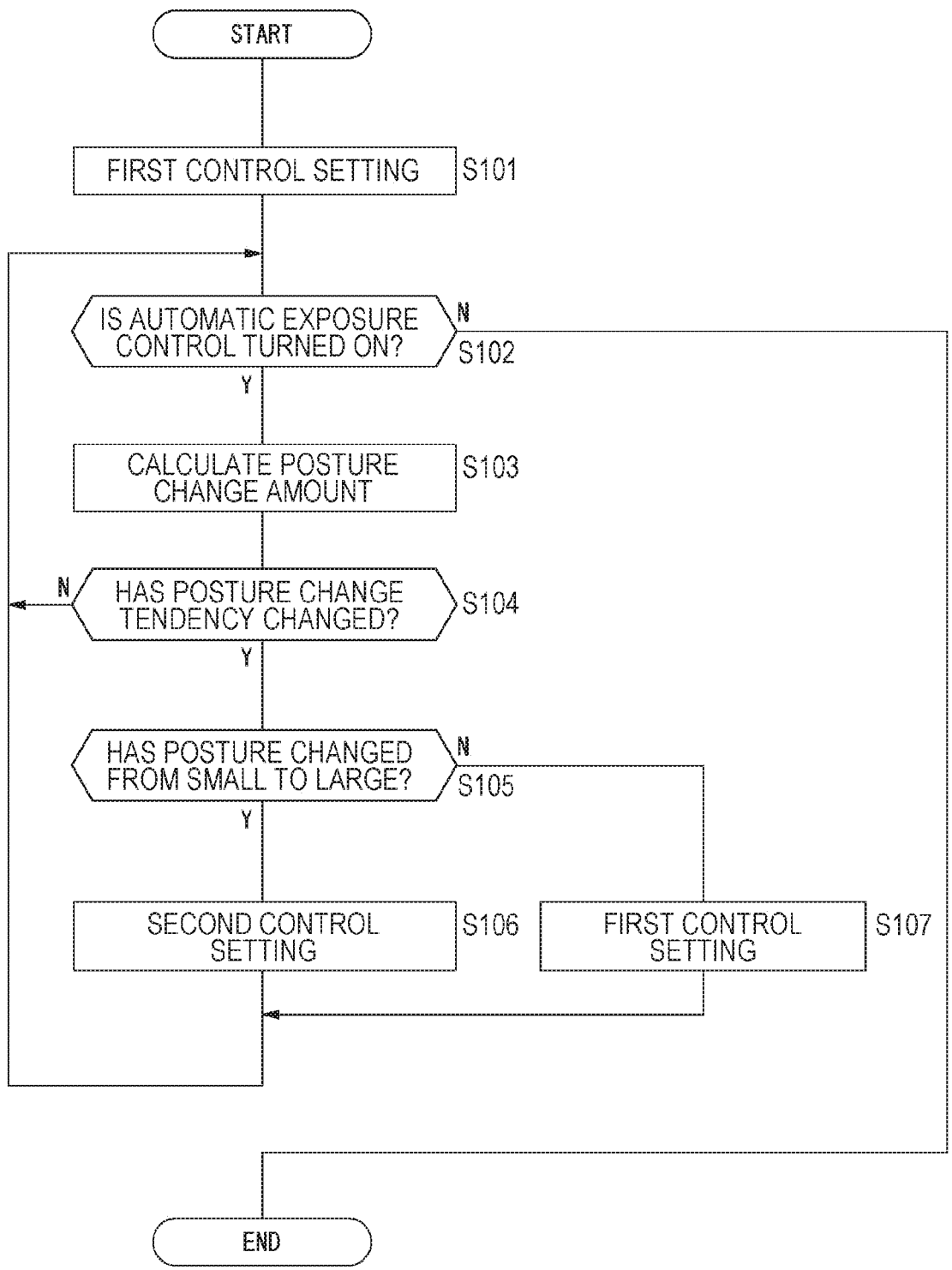
FIG. 25 is a flowchart of automatic exposure control.

Specific processing for adjusting the electronic shutter speed and the gain as shown in FIGS. 24A and 24B is shown in FIG. 25.

In the automatic exposure control, the control unit 122 first performs first control setting processing in step S101. In the first control setting processing, the illuminance threshold th1, the illuminance threshold th2, and the illuminance threshold th3 are used as the determination threshold of the illuminance Ix. Furthermore, in the first control setting processing, the maximum value of the electronic shutter control is set to "Smax1". As a result, automatic exposure adjustment is performed with control characteristics as shown in FIG. 24A corresponding to the case where the change of posture data (posture change) is small.

Subsequently, in step S102, the control unit 122 determines whether or not the automatic exposure control is ON. In a case where the automatic exposure control is OFF, the series of processing shown in FIG. 25 is ended.

On the other hand, in a case where the automatic exposure control is ON, the control unit 122 performs the posture change amount calculation processing of subsequent step S103. The amount of posture change can be calculated from, for example, posture data measured by the detection unit 125 such as the gyro sensor 126 or the acceleration sensor 127.

Next, in step S104, the control unit 122 determines whether or not the posture change tendency has changed. The posture change tendency may be large or small, and it is determined that "the posture change is large" in a case where the amount of change in the posture data is larger than the threshold, and "the posture change is small" in a case where the amount of change in the posture data is equal to or smaller than the threshold. Then, in a case where the tendency of the previous posture change is "the posture change is large", and the tendency of the posture change of this time is "the posture change is small" from the posture change amount acquired in the previous step S103, it is determined that the tendency of the posture change has changed. Similarly, it is determined that the tendency of the posture change has been changed also in a case where the tendency of the posture change has changed from "the posture change is small" to "the posture change is large".

In a case where the tendency of the posture change has not changed, the control unit 122 returns to the processing of step S102.

On the other hand, in a case where the tendency of the posture change has changed, the control unit 122 determines whether or not the posture change has changed from small to large in the subsequent step S105.

In a case where the posture change has changed from small to large, the control unit 122 performs second control setting processing in step S106.

In the second control setting processing, the illuminance threshold th1, the illuminance threshold th2', and the illuminance threshold th3' are used as the determination threshold of the illuminance Ix. Moreover, in the second control setting processing, the maximum value of the exposure time of the electronic shutter control is set to "Smax2". As a result, automatic exposure adjustment is performed with control characteristics as shown in FIG. 24B corresponding to the case where the posture change is large.

On the other hand, in a case where the tendency of the posture change has changed from large to small, the control unit 122 performs the first control setting processing in step S107. The processing content of step S107 is similar to the processing content of step S101.

The control unit 122 that has performed step S106 or step S107 returns to the processing of step S102.

As described with reference to FIGS. 24A, 24B, and 25, in the imaging apparatus 1 of the present embodiment, electronic shutter speed control for controlling the exposure time in the imaging element unit 112 is performed as the exposure adjustment, and the adjustment range of the exposure time of the electronic shutter speed control is switched between the first range (Smin to Smax1) and the second range (Smin to Smax2) in which the longest exposure time is set to shorter than that in the first range, on the basis of the detection information of the gyro sensor 126 or the acceleration sensor 127.

In the case of the present embodiment, posture data is generated at a sampling rate equal to or higher than the frame rate, and the magnitude of movement of the posture can be known by always checking detection information of the gyro sensor 126 or the acceleration sensor 127 during imaging.

In a case where the movement of the posture is large, the longer the exposure time is, the greater the possibility of blurring of the image is. Therefore, in a case where the movement of the posture is large, the occurrence of blurring is suppressed by performing the exposure adjustment in the second range.

7. Microphone

In the imaging apparatus 1, a microphone 35 is arranged inside the casing 2, and a hole for taking in audio at a position corresponding to the microphone 35 is formed on the outer circumferential surface of the casing 2.

Figure 26A:
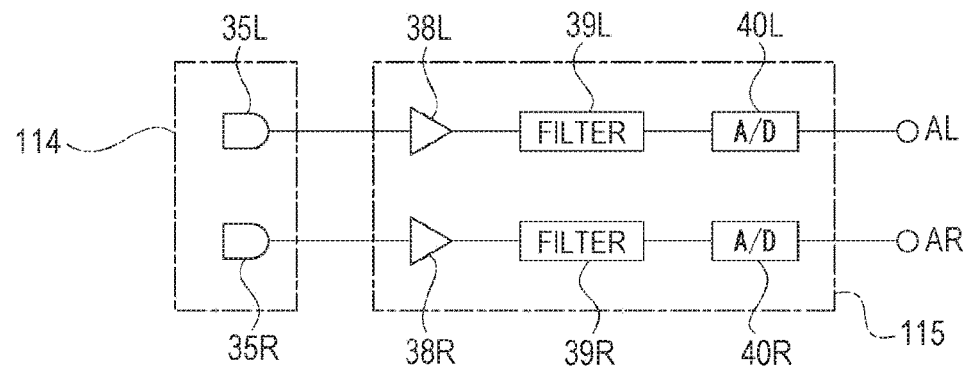
FIGS. 26A and 26B are block diagrams of a microphone.
Figure 26B:
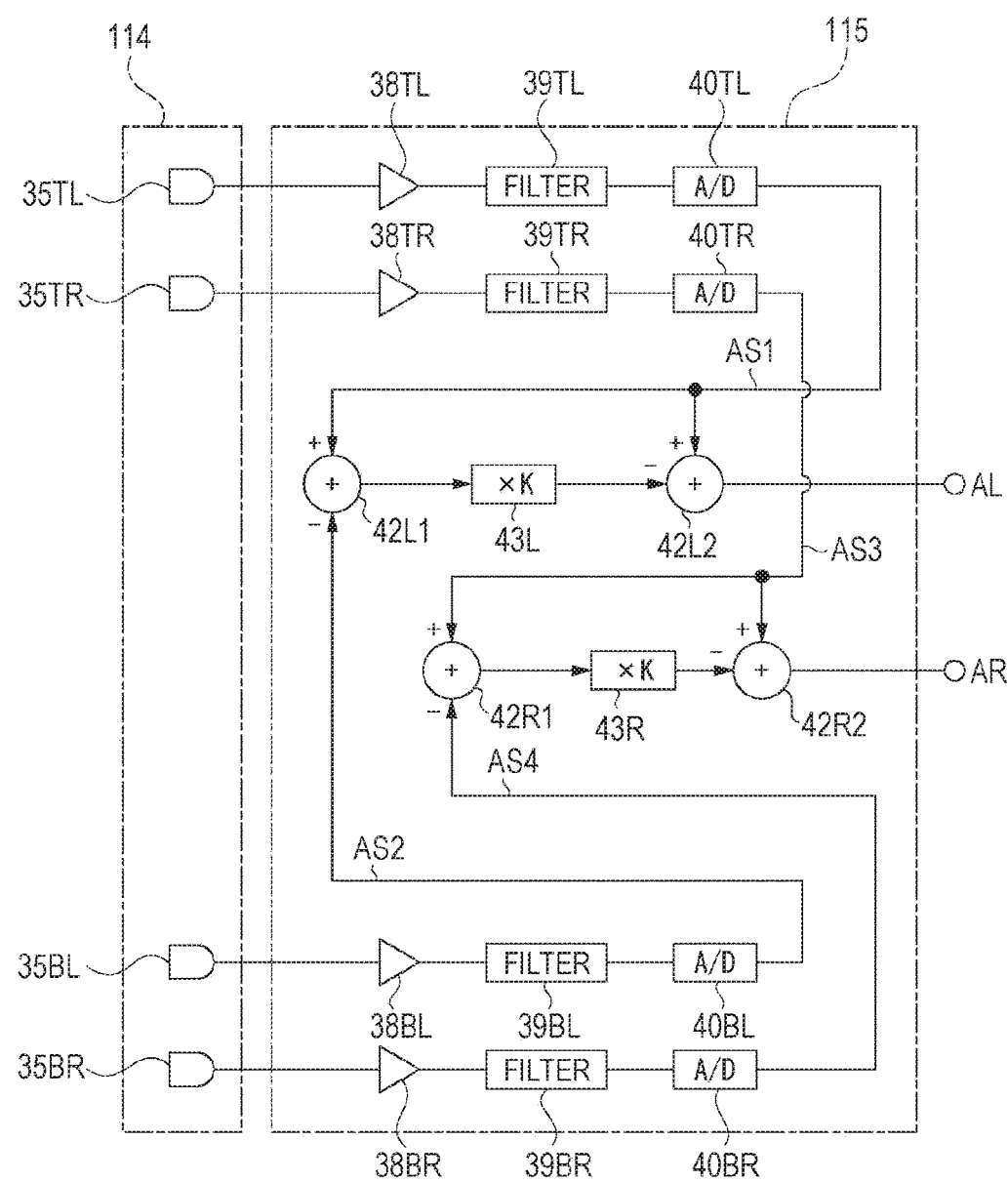
Figure 27:
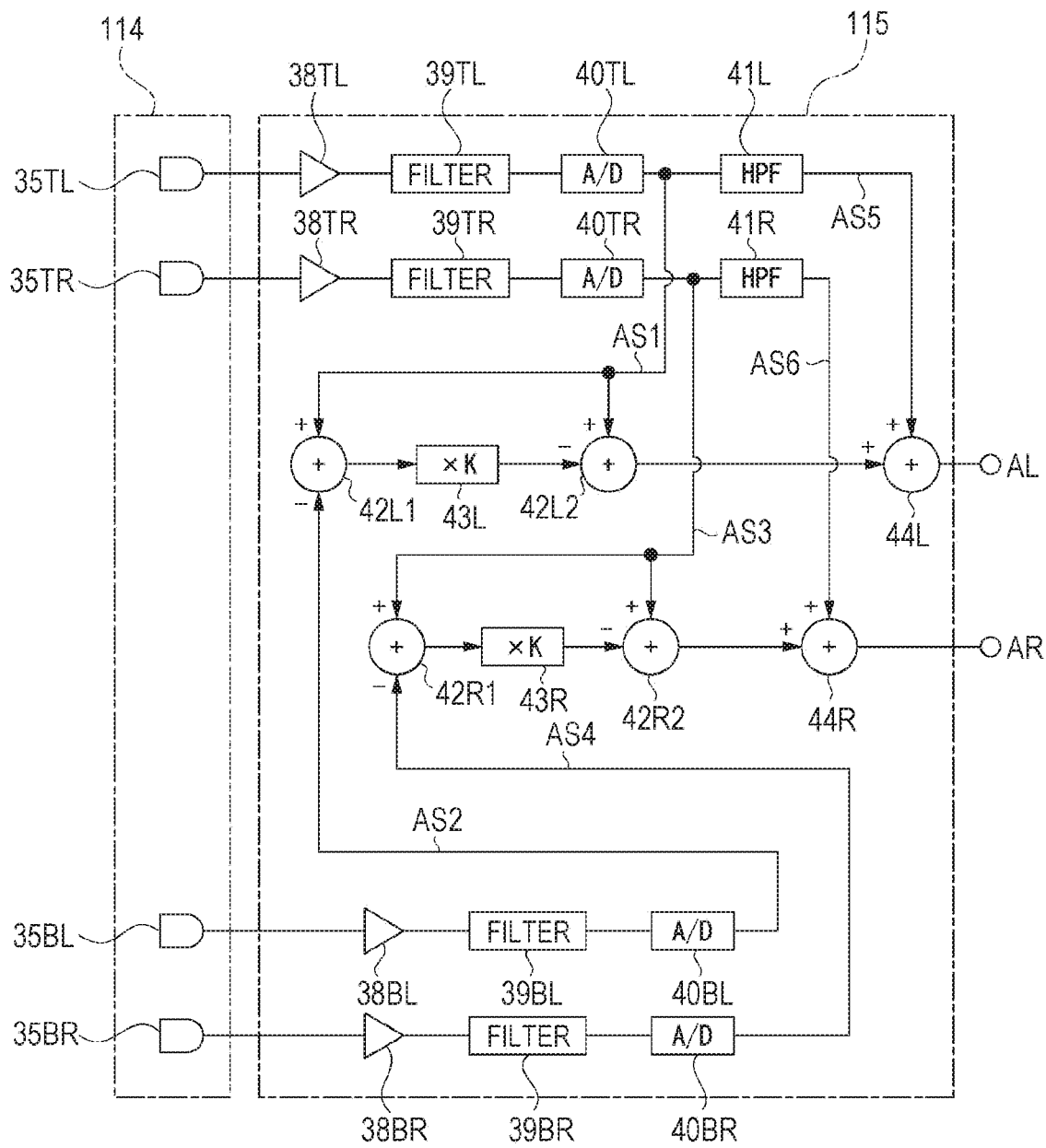
FIG. 27 is another block diagram of the microphone.

An example of a block diagram of the audio input unit 114 and the audio processing unit 115 is shown in FIG. 26A, FIG. 26B, and FIG. 27.

FIG. 26A shows a configuration example in a case where two microphones 35 and 35 are provided separately on the upper portion of the casing 2 to the right and left as shown in FIG. 14.

A microphone provided at the upper left is referred to as a microphone 35L, and a microphone provided at the upper right is referred to as a microphone 35R. The audio input unit 114 is provided with a pair of microphones 35R and 35L.

The analog audio signal input from the microphone 35L provided on the upper left of the casing 2 is amplified by a microphone amplifier 38L, band-limited by a filter 39L, then digitized by an A/D converter 40L, and input as audio data AL of a left channel to the signal processing unit 121 in the subsequent stage.

Similarly, the analog audio signal input from the microphone 35R provided on the upper right of the casing 2 is input to the signal processing unit 121 as audio data AR of a right channel via a microphone amplifier 38R, a filter 39R, and an A/D converter 40R.

By providing the microphones 35 and 35 configured as shown in FIG. 26A in the imaging apparatus 1, image data such as a moving image having stereo audio data is generated.

By arranging the microphones 35 and 35 in the above of the casing 2, it is easy to pick up the audio and the like of the imaging person input from above the casing 2. As a result, for example, the imaging apparatus 1 with high convenience for the imaging person who captures an explanatory moving image or the like can be provided.

FIG. 26B is an example that can be configured in a case where, as shown in FIG. 1, two microphones 35 and 35 are provided separately on the upper portion of the casing 2 to the right and left, and two microphones 35 and 35 are provided separately on the lower portion of the casing 2 to the right and left.

The microphone provided on the upper left of the casing 2 is referred to as a microphone 35TL, the microphone provided on the upper right is referred to as a microphone 35TR, the microphone provided on the lower left of the casing 2 is referred to as a microphone 35BL, and the microphone provided on the lower right is referred to as a microphone 35BR.

The analog audio signal input from the microphone 35TL provided on the upper left of the casing 2 is input to a subtractor 42L1 via a microphone amplifier 38TL, a filter 39TL, and an A/D converter 40TL.

On the other hand, the analog audio signal input from the microphone 35BL provided on the lower left of the casing 2 is input to a subtractor 42L1 via a microphone amplifier 38BL, a filter 39BL, and an A/D converter 40BL.

The subtractor 42L1 subtracts the audio signal input from the microphone 35BL from the audio signal input from the microphone 35TL. For example, part of the audio of the imaging person or the like input from the upper portion of the casing 2 is extracted. On the other hand, since audio emitted from a distance is output as substantially the identical audio signal through each of the upper microphone 35TL and the lower microphone 35BL, so that the audio is canceled by the subtractor 42L1 and hardly leaves. In other words, in the subtractor 42L1, the difference between the audio signals input to the lower and upper microphones is extracted.

The difference signal extracted by the subtractor 42L1 is multiplied by a coefficient K by a multiplier 43L. Note that the coefficient K is a value between 0 and 1, and is 0.5, for example.

A subtractor 42L2 in the subsequent stage subtracts the multiplied difference signal from the audio signal input from the upper microphone 35TL. As a result, the signal output from the subtractor 42L2 is such that the difference between the upper microphone 35TL and the lower microphone 35BL is reduced. This signal is input to the signal processing unit 121 in the subsequent stage as audio data AL of the left channel.

Also for the analog audio signal input from the microphone 35TR provided on the upper right of the casing 2 and the analog audio signal input from the microphone 35BR provided on the lower right of the casing 2, the difference between the extracted input signals of the upper and lower microphones is reduced similarly, and the result signal is input to the signal processing unit 121 in the subsequent stage as the audio data AR of the right channel.

In other words, in the configuration of FIG. 26B, for example, assuming that the output of the A/D converter 40TL is AS1 and the output of the A/D converter 40BL is AS2, the audio data AL of the left channel can be expressed as $$AL = AS1 - (AS1 - AS2) \times K.$$

Similarly, assuming that the output of the A/D converter 40TR is AS3 and the output of the A/D converter 40BR is AS4, the audio data AR of the right channel can be expressed as $$AR = AS3 - (AS3 - AS4) \times K.$$

By employing the configuration shown in FIG. 26B, an audio input signal with a large difference between the upper and lower microphones such as the audio of the imaging person, for example, is attenuated.

Accordingly, for example, it is possible to eliminate the possibility that only the voice of the imaging person is recorded at a large volume, making it difficult to hear surrounding audio.

Another example which can be configured in a case where the microphones 35 are provided on both the upper and lower portions of the casing 2 as shown in FIG. 1 is shown in FIG. 27.

Since the signal output from the subtractor 42L2 using the audio signal of the microphone 35TL provided on the upper left and the microphone 356BL provided on the lower left is similar to that of FIG. 26B, redundant explanation is omitted.

In the example shown in FIG. 27, processing is further performed to add only the high frequency component of the microphone 35TL provided on the upper left to the signal acquired by reducing the difference between the input signals of the upper and lower microphones (in other words, the output signal of the subtractor 42L2). Specifically, the signal of the microphone 35TL passed through the microphone amplifier 38TL, the filter 39TL, and the A/D converter 40TL is further passed through a high-pass filter (HPF) 41L to extract the high frequency component, the adder 44L adds the high frequency component and the output signal of the previous subtractor 42L2 and input the result to the signal processing unit 121 in the subsequent stage.

In other words, in the configuration of FIG. 27, for example, assuming that the output of the A/D converter 40TL is AS1, the output of the A/D converter 40BL is AS2, and the output of the HPF 41L is AS5, the audio data AL of the left channel can be expressed as $$AL = AS1 - (AS1 - AS2) \times K + AS5.$$

Similarly, assuming that the output of the A/D converter 40TR is AS3, the output of the A/D converter 40BR is AS4, and the output of the HPF 41R is AS6, the audio data AR of the right channel can be expressed as $$AR = AS3 - (AS3 - AS4) \times K + AS6.$$

For example, consider the usage pattern as shown in FIG. 5A. In this case, although the voice of the imaging person (wearer) is directly input to the microphones 35TL and 35TR provided in the upper portion of the casing 2, the voice of the imaging person is likely to be input to the microphones 35BL and 35BR provided in the lower portion via surrounding reflectors or the like.

The surrounding reflective material may include clothes or the like worn by the imaging person that is likely to absorb high frequency components.

In a case where the high frequency component of the audio signal input from the lower microphone is attenuated, according to the configuration shown in FIG. 26B, the difference of the high frequency component between the upper and lower microphones becomes large, and the high frequency component is cut by the subtractors 42L2 and 42R2.

According to the configuration shown in FIG. 27, since high frequency components are added again by the adders 44L and 44R, it is possible to input an audio signal that is easy to hear to the signal processing unit 121 in the subsequent stage.

Note that, for the microphone 35TR provided on the upper right and the microphone 35BR provided on the lower right, similar processing is performed using the microphone amplifiers 38TR and 38BR, the filters 39TR and 39BR, the A/D converters 40TR and 40BR, the subtractors 42R1 and 42R2, the multiplier 43R, the adder 44R, and the HPF 41R, but the detailed description is omitted.

Note that, although each configuration shown in FIGS. 26A, 26B, and 27 corresponds to the stereo audio input of the imaging apparatus 1, a configuration of monaural audio input may be applied.

8. Internal Configuration Example II of Imaging Apparatus

As described above, the imaging apparatus 1 of the present embodiment generates posture data corresponding to image data. In the case of the configuration of FIG. 19, since the control unit 122 can manage image data generation and posture data generation, association of the frame of the image data with the posture data can be made by internal processing of the control unit 122 (for example, association of the frame time code with the posture data or the like). However, a configuration can be also considered in which a control unit that controls image data generation and a control unit that generates posture data are executed by separate microcomputers or the like. Then, in that case, it is also assumed that correspondence information to a frame is not added to the posture data output from the imaging apparatus 1.

In such a case, in the information processing apparatus 150 that has received the image data and the posture data from the imaging apparatus 1, an example configuration for enabling the posture data to be associated with the frame is hereinafter described as an internal configuration example II of the imaging apparatus. This is a configuration example for enabling association of image data as a moving image with posture data from the pieces of data themselves when the information processing apparatus 150 acquires the image data and the posture data.

Figure 28:
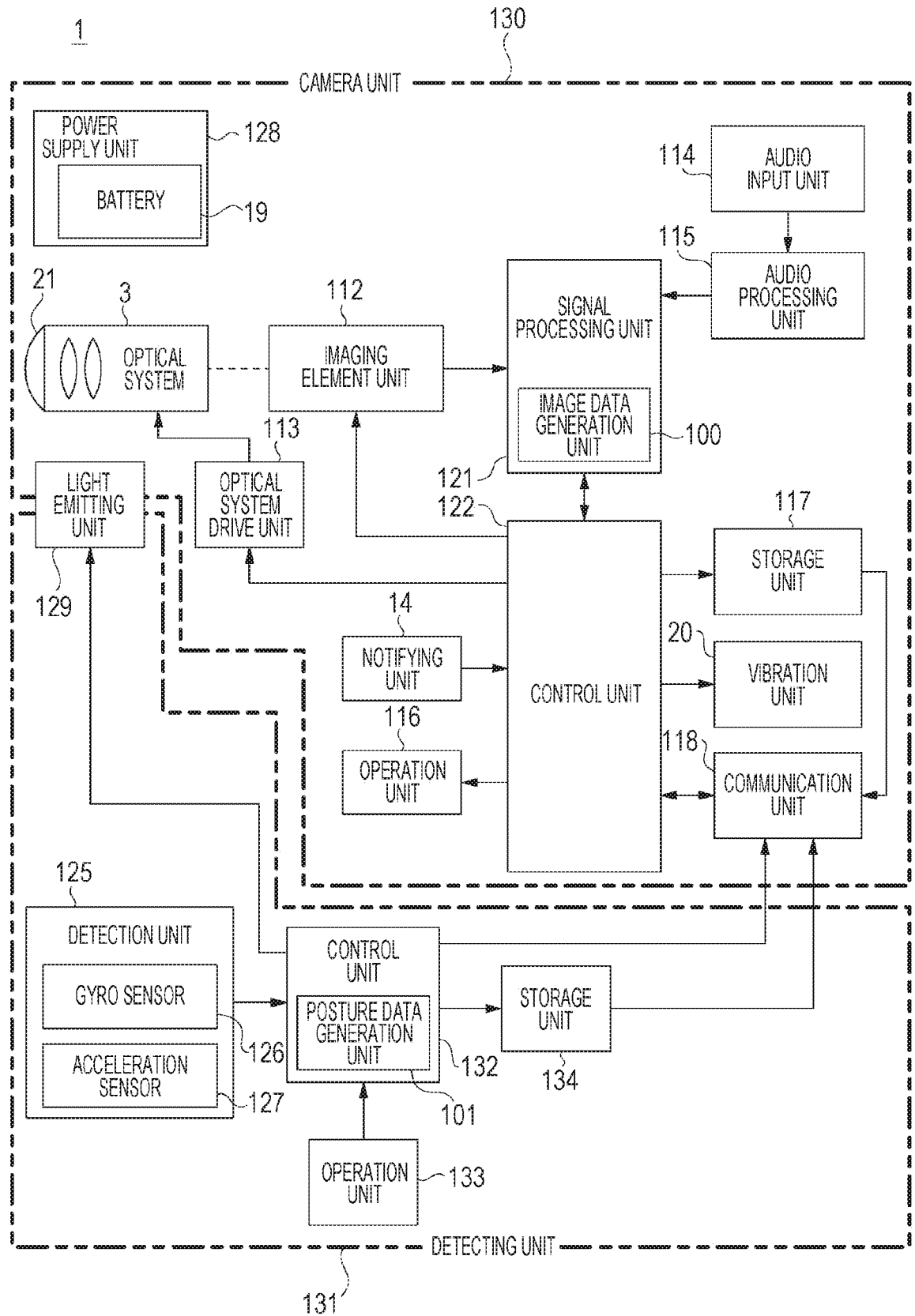
FIG. 28 is a functional block diagram of another form of the imaging apparatus.

FIG. 28 shows a block diagram of an internal configuration example II of the imaging apparatus 1.

The imaging apparatus 1 shown in FIG. 28 includes a camera unit 130 and a detecting unit 131. The camera unit 130 does not include the detection unit 125 among the components shown in FIG. 19. Furthermore, the control unit 122 does not have a function as the posture data generation unit 101.

On the other hand, the detecting unit 131 includes the detection unit 125 having the gyro sensor 126 and the acceleration sensor 127. Furthermore, the detecting unit 131 further includes a control unit 132 having a function as the posture data generation unit 101, an operation unit 133, and a storage unit 134.

The control unit 132 performs processing for generating posture data indicating the posture of the imaging apparatus 1 on the basis of the detection information from the detection unit 125, by the function as the posture data generation unit 101.

Moreover, the detecting unit 131 includes a light emitting unit 129. The light emitting unit 129 has, for example, an LED and its light emission drive circuit, and performs light emitting operation for synchronizing image data and posture data according to an instruction of the control unit 132. The light emitting unit 129 functions as a notification unit that performs notification to correlate image data with posture data on the basis of a trigger.

For example, an LED is provided in a lens barrel of the camera unit 130, and the light emitting unit 129 is configured such that light emission of the LED affects a part of image data captured by the imaging element unit 112. Specifically, the light emission of the LED is configured to affect the imaging signal of the imaging element unit 112. Alternatively, the entire frame image is made to be in a high luminance state by the light emission of the LED.

In this case, the imaging element unit 112 functions as a detector that detects a notification from the light emitting unit.

Note that, light emission of the LED in the light emitting unit 129 is performed asynchronously with the imaging start timing of the camera unit 130, for example. Accordingly, for example, the imaging person performs operation to start imaging with respect to the camera unit 130, and then performs operation to start generation of posture data to the detecting unit 131. As a result, the light emitting unit 129 emits light, and the imaging element unit 112 generates frame data including pixels of luminance based on the light emission. As a result, it is possible to specify a frame imaged at the generation start timing of posture data by searching for a frame of image data.

The detecting unit 131 operates asynchronously with the camera unit 130, but the control unit 132 generates, for example, a timing signal for sampling at a rate of frequency equal to the frame rate of the image data, and samples the detected information of the gyro sensor 126 and the acceleration sensor 127 to generate posture data.

Accordingly, posture data is generated at a ratio in which one piece of posture data corresponds to one frame of image data captured by the camera unit 130.

Note that the operation unit 116 of the camera unit 130 includes a button (a moving image button 10 or the like) for the user to give an instruction for the imaging start or the like, and the operation unit 133 of the detecting unit 131 includes a button for the user to give an instruction for the posture data generation start or the like.

The posture data generated by the posture data generation unit 101 of the control unit 132 is transmitted to the storage unit 117, and is transmitted to the communication unit 118 of the camera unit 130 as necessary. The posture data is transmitted together with the image data to, for example, the information processing apparatus 150 as an external device. In other words, the communication unit 118 is one mode as a data output unit.

Specifically, the operations of the camera unit 130 and the detecting unit 131 will be described with reference to FIGS. 29A and 29B.

Figure 29A:
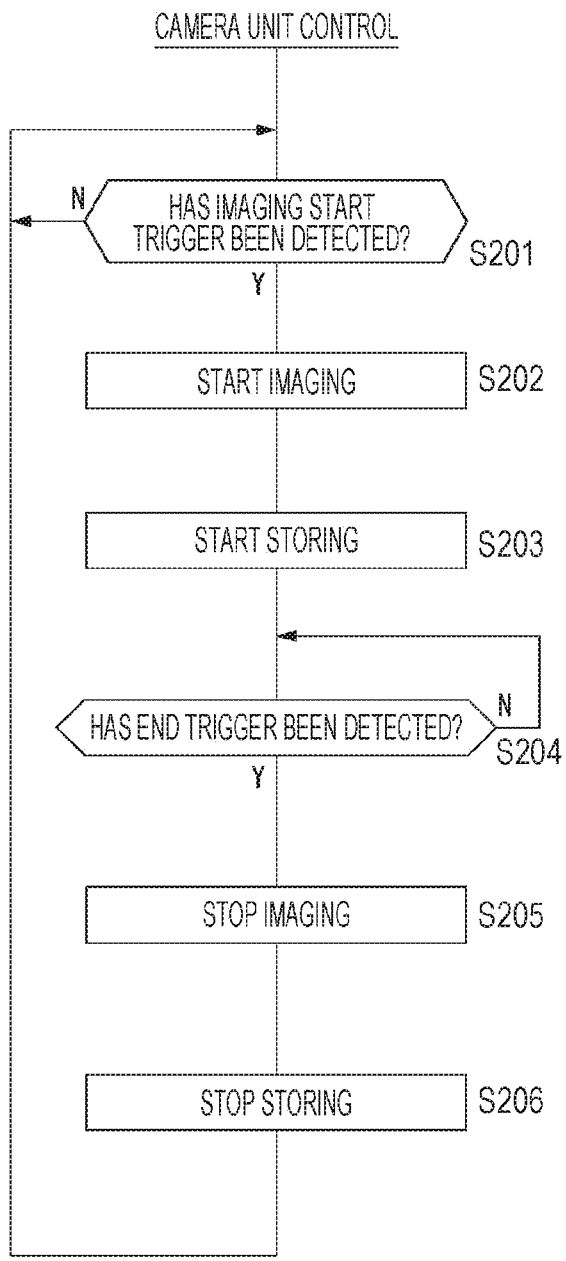
FIGS. 29A and 29B are flowcharts showing an example of control of a camera unit and a detecting unit.

An example of a flowchart regarding control of the camera unit 130 is FIG. 29A. The control unit 122 of the camera unit 130 determines in step S201 whether or not an imaging start trigger has been detected. The imaging start trigger is detected, for example, when the imaging person presses the moving image button 10, the time lapse button 11, or the like. In a case where the imaging start trigger is not detected, the control unit 122 executes step S201 again.

Note that the imaging start trigger may be generated by other than the user's operation of the moving image button 10 or the time lapse button 11, such as timer control, remote control, or automatic imaging start control by some detection.

In a case where the imaging start trigger is detected, the control unit 122 performs control of starting imaging in step S202, and performs control of starting storage of image data captured in subsequent step S203. As a result, image data as a moving image is stored in the storage unit 117.

In step S204, the control unit 122 determines whether or not an end trigger has been detected. The processing of step S204 is performed and the generation and storage of the image data started in the previous step are continued until the control unit 122 detects an end trigger.

In the example of the mode transition in FIG. 18, the operation of the moving image button 10 or the time lapse button 11 in the moving image storage becomes an end trigger. Of course, other examples of end trigger generation can be considered, such as predetermined time lapse, remote control, end control of automatic imaging and recording by some detection, and the like.

The control unit 122 that has detected the end trigger performs imaging stop control in step S205 and performs control of stopping storage of image data in step S206.

By the control unit 122 performing the series of pieces of processing shown in FIG. 29A, for example, imaging and storage of image data are performed by an operation of the imaging person.

Figure 29B:
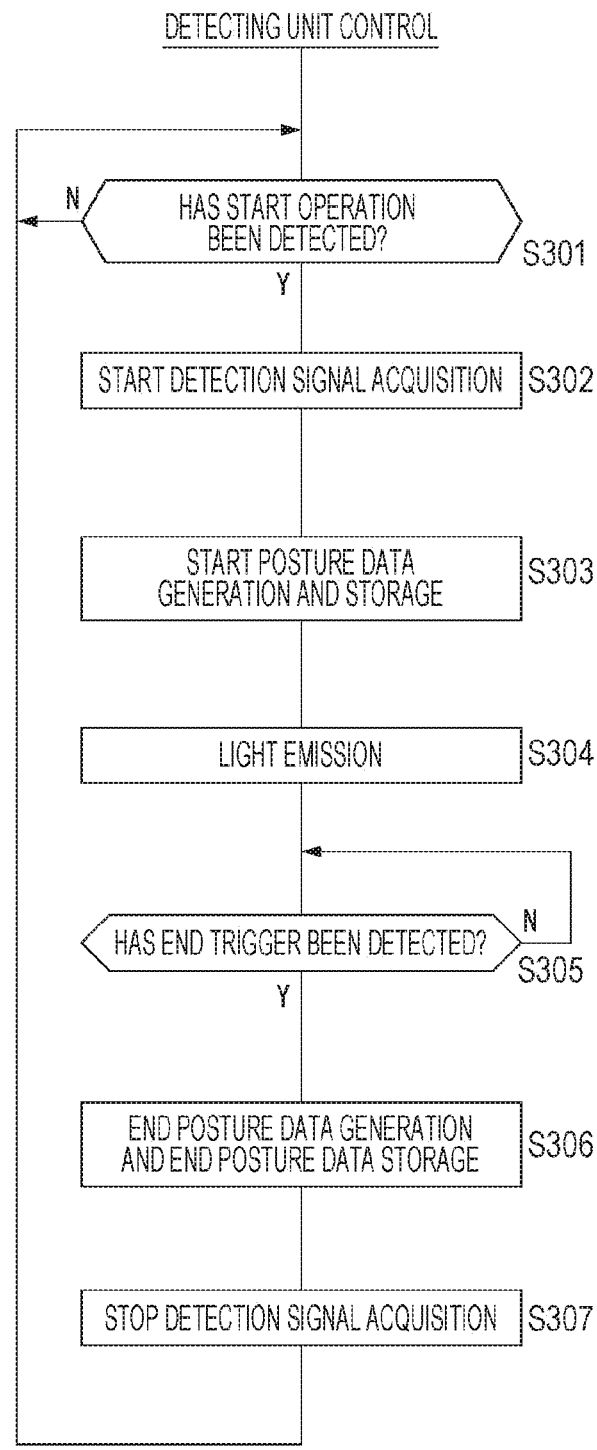

An example of the flowchart regarding control of detecting unit 131 is FIG. 29B. The control unit 132 of the detecting unit 131 determines in step S301 whether or not the start operation has been detected. The start operation in this case is a user operation on the button for starting posture data generation on the operation unit 133.

In a case where the start operation is not detected, the control unit 132 performs the processing of step S301 again.

In a case where the start operation is detected, the control unit 132 starts acquisition of a detection signal in step S302. The detection signal is a detection signal related to the posture output from the gyro sensor 126 as the detection unit 125 or the acceleration sensor 127.

Then, in step S303, the control unit 132 starts generation of posture data and storage of the posture data.

The acquisition (sampling) of the detection signal in step S302 and the posture data generation in step S303 are performed on the basis of the timing signal of the same frequency as the vertical synchronization signal used by the camera unit 130.

In other words, the control unit 132 generates a timing signal having the same frequency as that of the vertical synchronization signal and being asynchronous, and acquires a detection signal on the basis of the timing signal. Moreover, the control unit 132 generates posture data from the detection signal and stores the data in the storage unit 134. Accordingly, for example, one piece of posture data is stored corresponding to one frame of a moving image captured by the camera unit 130.

Furthermore, the control unit 132 causes the light emitting unit 129 to emit light in step S304 substantially simultaneously with the start of the processing of acquiring the detection signal and generating the posture data as described above. As a result, in the frame corresponding to the timing in the image data captured by the camera unit 130, a portion with high luminance based on the light emission is formed.

Note that, although shown as steps S302 to S304 for the convenience of description, the light emission control and the start of detection signal acquisition for posture data generation may be performed before or after the processing as long as they are performed substantially simultaneously. Furthermore, even if there is some time lag, it is sufficient if the time difference is fixed. It is only necessary that the frame in the image data affected by the LED light emission and the posture data indicating the posture of the imaging apparatus 1 at that time be associated later.

The control unit 132 determines in step S305 whether or not an end trigger is detected. The processing of step S305 is performed until an end trigger is detected.

In a case where a trigger for ending storage of posture data by operation of the imaging person or the like is detected, the control unit 132 ends generation and storage of posture data in step S306, and stops acquisition of detection signals in step S307.

By the control unit 132 performing a series of pieces of processing shown in FIG. 29B, storage of posture data corresponding to image data such as a moving image is performed.

Figure 30:
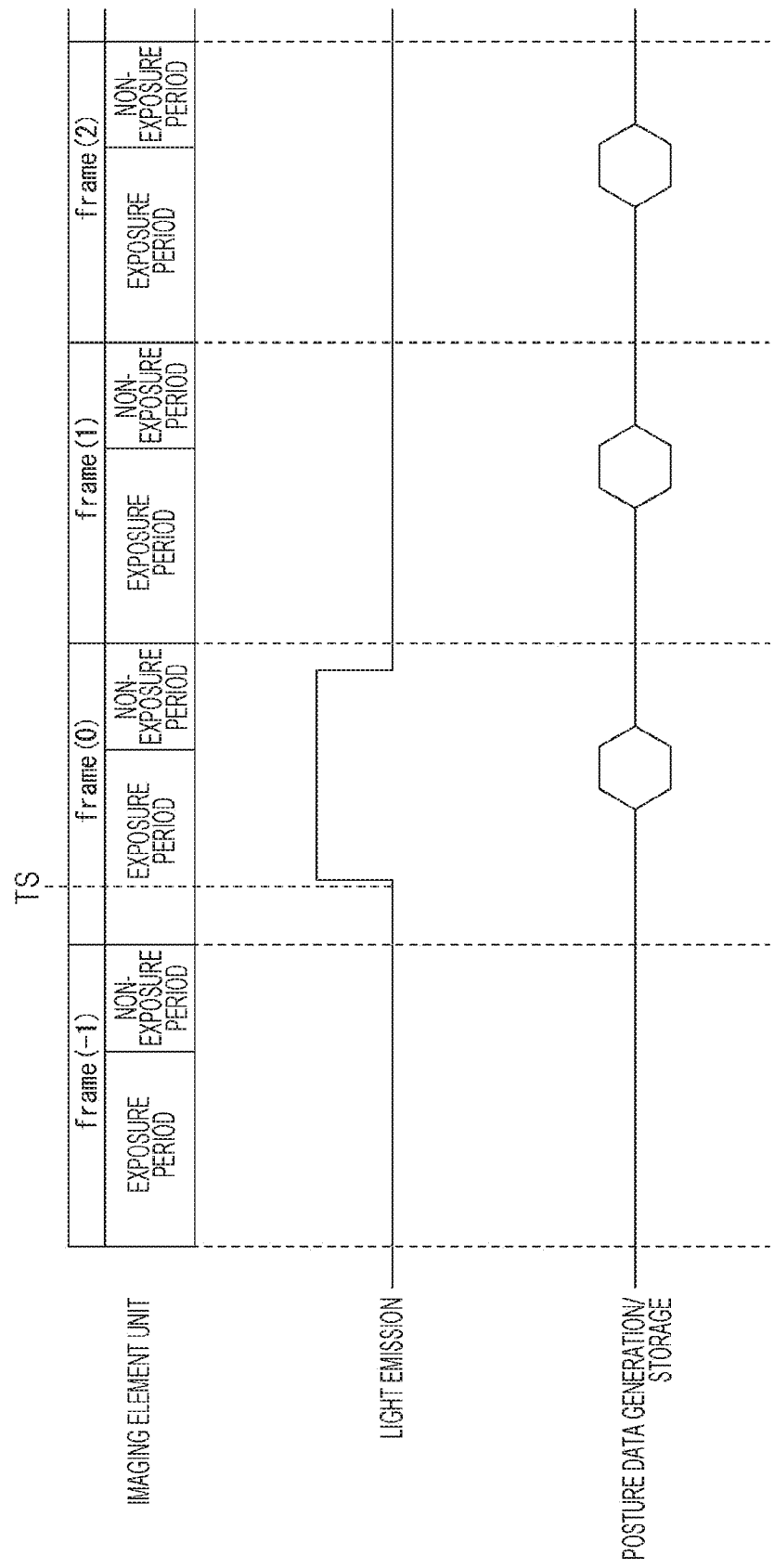
FIG. 30 is a timing chart related to detection and storage of posture data.

A specific timing chart of the imaging operation and the operation of the detecting unit 131 is shown in FIG. 30.

By the above processing, for example, as shown in FIG. 30, light emission of the light emitting unit 129 and posture data generation are performed. In other words, it is assumed that the start operation is performed at a certain timing TS when the imaging and recording of each frame are performed on the camera unit side. Steps S302, S303, and S304 are performed accordingly. That is, the LED light emission of the light emitting unit 129 is performed and the posture data generation/storage is started, and thereafter, the posture data generation/storage is continued in the same cycle as the frame cycle.

Specifically, when the imaging person presses the moving image button 10 of the imaging apparatus 1, the imaging apparatus 1 is in the "moving image capturing state", and generation/storage of each frame as image data is continuously performed by repeating the exposure period and the non-exposure period. In this state, when the imaging person performs operation for starting acquisition of posture data of the detecting unit 131 of the imaging apparatus 1, light emission by the light emitting unit 129 is performed once according to the operation timing, and detection and storage of posture data are started at the timing substantially the same as the light emission.

In the configuration shown in FIG. 28, since light emission of the light emitting unit 129 is performed asynchronously with the imaging operation of the camera unit 130, as shown in FIG. 30, at which timing including the exposure period and the non-exposure period of the image data frame the light is emitted is different each time. In the example shown in FIG. 30, light emission is performed during the exposure period. Furthermore, the light emission period is set to be longer than the non-exposure period. This is to ensure that light emission is performed in at least a part of the exposure period by emitting light for a time longer than the non-exposure period since the exposure period of each frame and the light emission timing are asynchronous. Furthermore, even in a case where the non-exposure period is the longest, in other words, a case where the electronic shutter speed is the shortest, in order to ensure that the light emitting unit 129 emits light during the exposure period, light may be emitted for a longer time than the maximum time length of the non-exposure period.

However, it is desirable that the light emission period of the light emitting unit 129 be a time within one frame period. This is because, If light is emitted for a long time, the number of frames affected by the light emission increases.

The posture data generation unit 101 of the detecting unit 131 detects and stores posture data in accordance with the light emission of the light emitting unit 129. The timing of detection and storage of posture data is also performed asynchronously with the exposure period and non-exposure period of each frame, so that detection and storage of posture data are performed in the non-exposure period in some cases, or detection and storage of one time is performed across two frames in some cases.

Also in a case of the configuration example of FIG. 28 in which the above operation is performed, the imaging apparatus 1 performs moving image capturing of a half celestial sphere image, a full celestial sphere image, and the like by the optical system 3 using a fisheye lens as the optical system 3 of the non-central projection method. In this case, the camera unit 130 and the detecting unit 131 perform the processing of FIGS. 29A and 29B described above so that the posture data of the casing 2 corresponding to each frame of the moving image is output.

By acquiring posture data of a timing corresponding to each frame, processing using posture data can be performed later on image data as a moving image.

In particular, the posture data generation unit 101 performs processing for forming information for leading frame identification in the frames of the image data at the generation start timing of the posture data, so that it can be known from the image data which time point frame has been used as basis for starting the posture data generation in the image data as a moving image. As a result, in a device which has acquired image data and posture data, it is possible to specify a moving image frame corresponding to the leading posture data.

Then, as an example of information formation for leading frame identification, a light emitting unit 129 that emits light to be exposed to the imaging element unit 112 is provided, and the posture data generation unit 101 causes the light emitting unit 129 to emit light to cause pixel data of luminance by the light emission to be formed as information for leading frame identification in the frame captured at the light emission timing in the image data.

In other words, by causing the light emitting unit 129 to emit light, a frame of an image of high luminance different from the subject light is formed in the image data.

As a result, as described later with reference to FIG. 31, in the information processing apparatus 150 which has acquired the image data and the posture data, the frame of the moving image data corresponding to the leading posture data can be specified by searching for the frame of the high luminance image.

Note that, according to the configuration shown in FIG. 28, the imaging apparatus 1 of the present embodiment can be easily manufactured by attaching the detecting unit 131 to the existing camera unit.

Furthermore, as another mode, the camera unit 130 and the detecting unit 131 can be separately provided to the imaging person, so that the imaging person can attach or detach the detecting unit 131 as needed.

Furthermore, the posture data generation unit 101 generates posture data one time per frame on the basis of a timing signal asynchronous with the image data generation unit 100.

In other words, the imaging apparatus 1 is formed with an imaging system including the image data generation unit 100 as a moving image and a posture data generation system including the posture data generation unit 101 as an asynchronous system.

As a result, the imaging apparatus 1 having the posture data generation system can be easily achieved. In this case, since the frame of the moving image data corresponding to the leading posture data can be specified by marking, and the posture data is generated once per frame, the correspondence between the frame and the posture data is not disturbed even if it is asynchronous.

Note that, although the frame synchronization signal of the image data generation unit 100 and the timing signal used by the posture data generation unit are asynchronous, they have substantially the same frequency, and the sample timing does not shift to one frame even if moving image capturing is continued for a certain period of time.

Furthermore, as described in FIG. 30, the light emitting period of the light emitting unit 129 is set to a time within one frame period.

By causing the light emitting unit 129 to emit light, a frame of a high luminance image is formed, but the image becomes an image different from the subject light, in other words, an image which is originally unnecessary, so the light emission period is shortened.

Specifically, by setting the light emission period to one frame period or less, one frame or two frames become high luminance images, and it is possible to prevent many unnecessary frames from being generated.

Furthermore, in the case of the configuration example of FIG. 28, in the imaging apparatus 1, generation of image data stored as a moving image by the image data generation unit 100 and generation of posture data corresponding to image data stored as a moving image by the posture data generation unit 101 are started by different start triggers.

For example, the recording start operation and the posture recording start operation are provided to the user as separate operations.

As a result, the user can arbitrarily select whether or not to perform posture recording at the time of recording.

Also in the configuration example of FIG. 28, the imaging apparatus 1 includes the data output unit (the communication unit 118 and the storage unit 117), and can deliver image data and posture data to an external device (the information processing apparatus 150).

As a result, the external device (the information processing apparatus 150) can acquire posture data together with the image data, and can perform processing using the posture data.

In the information processing apparatus 150 that has received both the image data and the posture data, processing for associating the image data with the posture data is performed. This will be specifically described with reference to FIG. 31.

The information processing apparatus 150 performs processing of specifying moving image data in step S401. This processing is performed, for example, by selecting image data such as a moving image that the user who views a moving image or the like captured using the imaging apparatus 1 desires to view.

Figure 31:
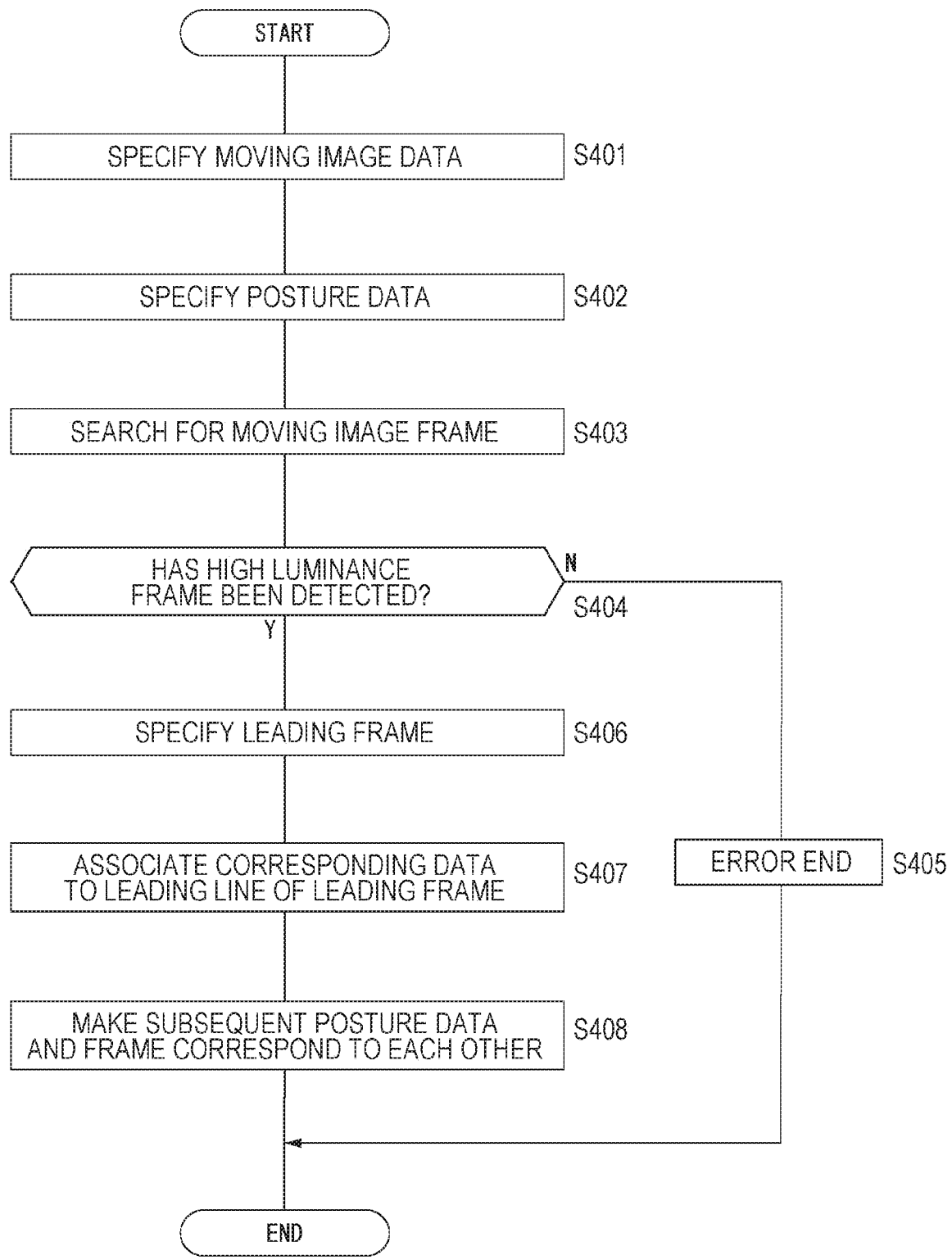
FIG. 31 is a flowchart for explaining the correspondence between image data and posture data.

Note that, when the information processing apparatus 150 takes in both the image data and the posture data, the processing of FIG. 31 may be automatically performed to associate the pieces of data.

After specifying the moving image data, the information processing apparatus 150 specifies posture data corresponding to the moving image data in step S402.

Subsequently, in step S403, the information processing apparatus 150 performs processing of searching for a specific frame from each moving image frame in chronological order. The frame to be searched for here is a frame having high luminance due to the light emission of the light emitting unit 129 described above. For example, a frame to be searched for is a frame in which the entire pixel has extremely high luminance by LED light emission, or a frame in which a specific pixel region has extremely high luminance by LED light emission.

In step S404, the information processing apparatus 150 determines whether or not a high luminance frame has been detected.

In a case where a high luminance frame cannot be detected, the information processing apparatus 150 performs error processing in step S405 and ends a series of processing. The error processing is, for example, processing for causing a display device of the information processing apparatus 150 to display a message such as "association of moving image data with posture data could not be made" or the like.

On the other hand, in a case where a high luminance frame can be detected, the information processing apparatus 150 performs processing for specifying the leading frame in step S406. In this processing, the high luminance frame may be set as the leading frame, or the frame next to the high luminance frame may be set as the leading frame. Furthermore, in a case where the high luminance frame is detected over two frames, either of them may be set as the leading frame, or the frame following the two frames may be set as the leading frame.

Next, in step S407, the information processing apparatus 150 performs processing of associating the first data of the posture data with the leading line of the leading frame, and in step S408, performs processing of associating the subsequent posture data with the moving image frame.

As a result, each posture data is associated with each frame of the moving image, and the information processing apparatus 150 can recognize what posture the imaging apparatus 1 has when capturing each frame.

Then, various types of correction processing described later can be performed by appropriately associating the image data and the posture data.

9. Internal Configuration Example III of Imaging Apparatus

Figure 32:
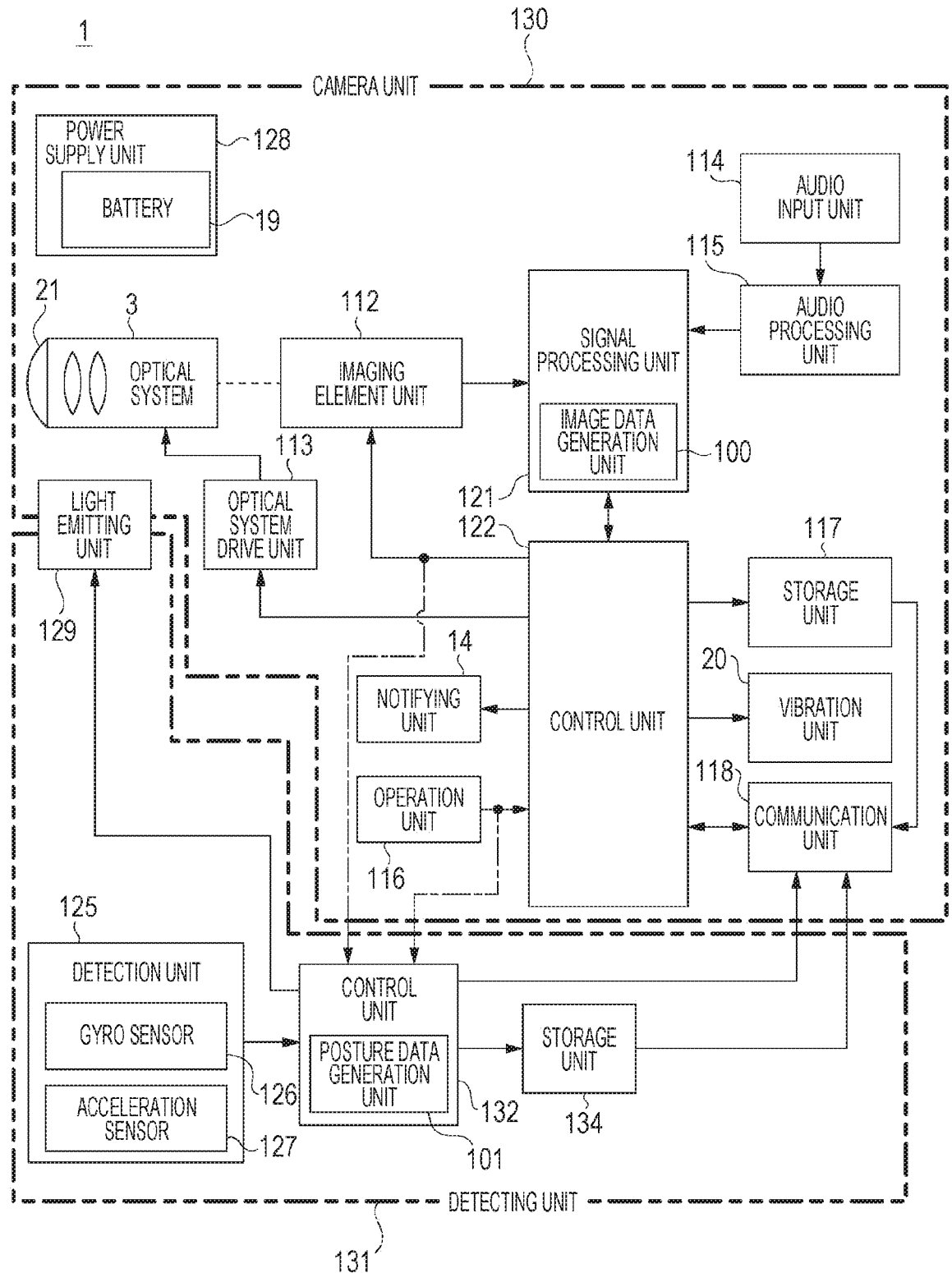
FIG. 32 is a functional block diagram of still another form of the imaging apparatus.

FIG. 32 shows a block diagram as an internal configuration example III of the imaging apparatus 1. This is another example in a case where the light emitting unit 129 is provided as similar to the configuration example of FIG. 28.

The imaging apparatus 1 shown in FIG. 32 also receives by the detecting unit 131 the imaging start trigger detected by the camera unit 130 by the imaging person operating the operation unit 116 such as the moving image button 10, and generation and storage of posture data are performed according to the imaging start trigger. Accordingly, the detecting unit 131 is not provided with an operation unit for starting generation and storage of posture data.

Furthermore, the control unit 132 of the detecting unit 131 acquires a vertical synchronization signal transmitted from the control unit 122 to the imaging element unit 112, and posture data is generated on the basis of the vertical synchronization signal.

Specific processing will be described with reference to FIGS. 33A and 33B.

Figure 33A:
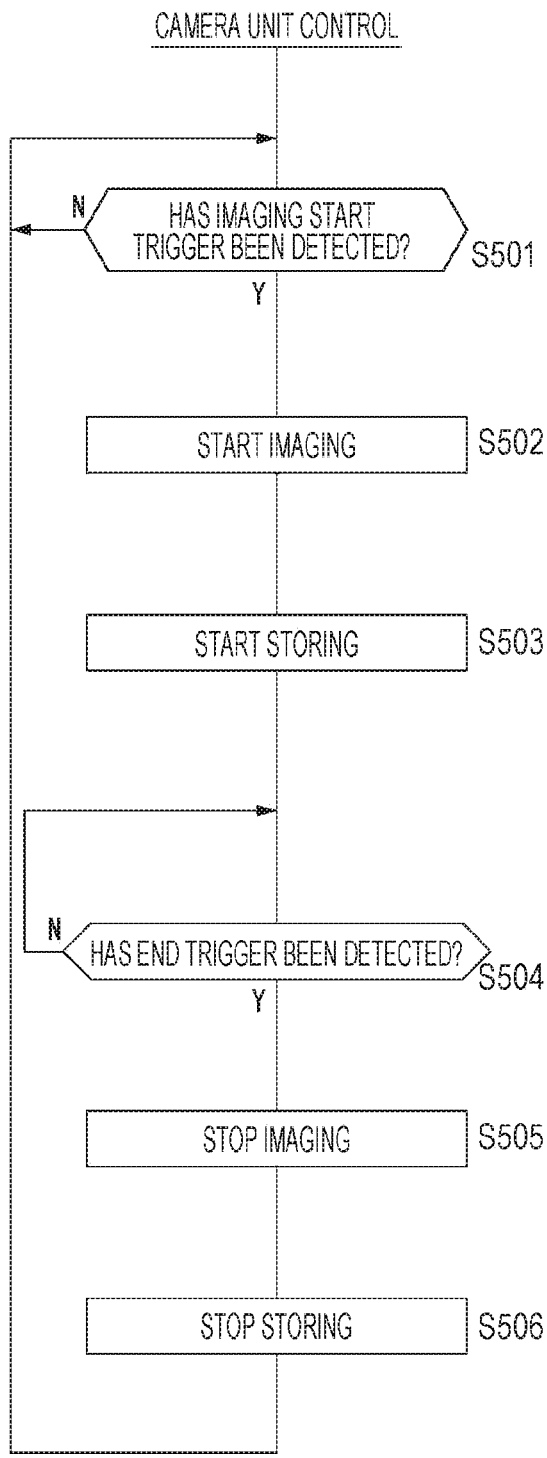
FIGS. 33A and 33B are flowcharts showing an example of control of the camera unit and the detecting unit.

FIG. 33A is a flowchart of each processing performed by the control unit 122 of the camera unit 130. FIG. 33B is a flowchart of each processing performed by the control unit 132 of the detecting unit 131.

The control unit 122 of the camera unit 130 determines whether or not an imaging start trigger has been detected in step S501. Furthermore, the control unit 132 of the detecting unit 131 determines in step S601 whether or not an imaging start trigger has been detected. In this case, the control unit 132 detects an imaging start trigger by a notification from the control unit 122 of the camera unit 130.

The control unit 122 of the camera unit 130 repeats the processing of step S501 until the imaging start trigger is detected. Similarly, the control unit 132 of the detecting unit 131 also repeats the processing of step S601 until an imaging start trigger is detected.

When the imaging start trigger is input by the imaging person pressing the moving image button 10 or the like, the control unit 122 of the camera unit 130 starts performing of the processing of step S502, and the control unit 132 of the detecting unit 131 starts performing of the processing of step S602.

The control unit 122 of the camera unit control unit 130 starts imaging in step S502, and starts storing image data captured in subsequent step S503.

On the other hand, the control unit 132 of the detecting unit 131 starts vertical synchronization signal acquisition in step S602. This signal is acquired from the control unit 122 of the camera unit 130.

Subsequently, the control unit 132 starts acquisition of the detection signal in step S603, and starts generation and storage of posture data in step S604.

Furthermore, the control unit 132 performs processing of causing the LED of the light emitting unit 129 to emit light in step S605. Since light emission of the light emitting unit 129 can be performed in synchronization with the vertical synchronization signal used by the camera unit 130, for example, light emission can be performed in accordance with the start timing of the exposure period of one frame constituting the captured moving image.

Note that, since the control unit 132 of the detecting unit 131 grasps the start timing of the exposure period of each frame, generation and storage of posture data may be performed a plurality of times during one frame period (including the exposure period and the non-exposure period). In a case where the generation and storage are performed a plurality of times, it is possible to grasp at which timing of one frame period each posture data has been acquired. This makes it possible to appropriately perform blur correction and the like as described later.

The control unit 122 of the camera unit 130 determines in step S504 whether or not an end trigger has been detected. Similarly, the control unit 132 of the detecting unit 131 determines in step S606 whether or not the end trigger has been detected.

When the control unit 122 of the camera unit 130 detects an end trigger, for example, in a case where the imaging person presses the moving image button 10 again, for example, and the end instruction of imaging is detected, the end trigger is also given in notification to the control unit 132 of the detection unit. As a result, both the camera unit 130 and the detecting unit 131 detect the end trigger substantially simultaneously.

The control unit 122 of the camera unit 130 that has detected the end trigger stops the imaging in step S505, and stops storing the image data in step S506.

Furthermore, the control unit 132 of the detecting unit 131 that has detected the end trigger ends generation and storage of posture data in step S607, and stops acquisition of detection signals in step S608.

Figure 33B:
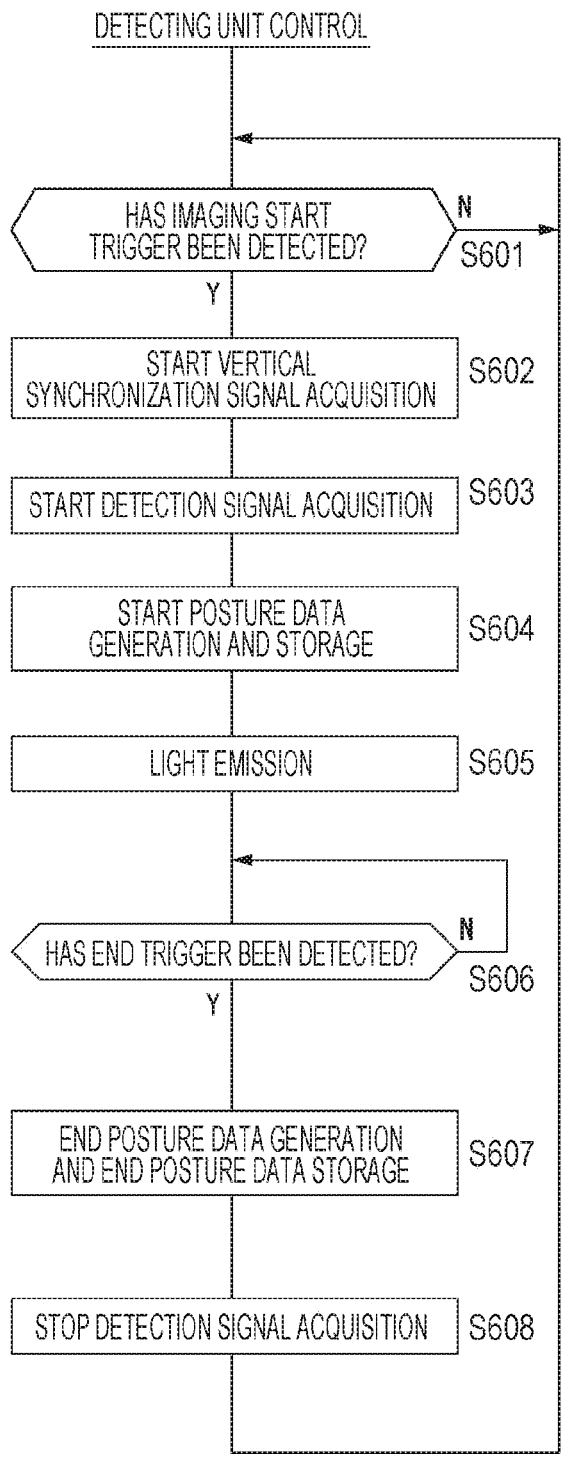

As the control unit 122 of the camera unit 130 and the control unit 132 of the detecting unit 131 perform each processing shown in FIGS. 33A and 33B, synchronized image data and posture data can be stored.

Figure 34:
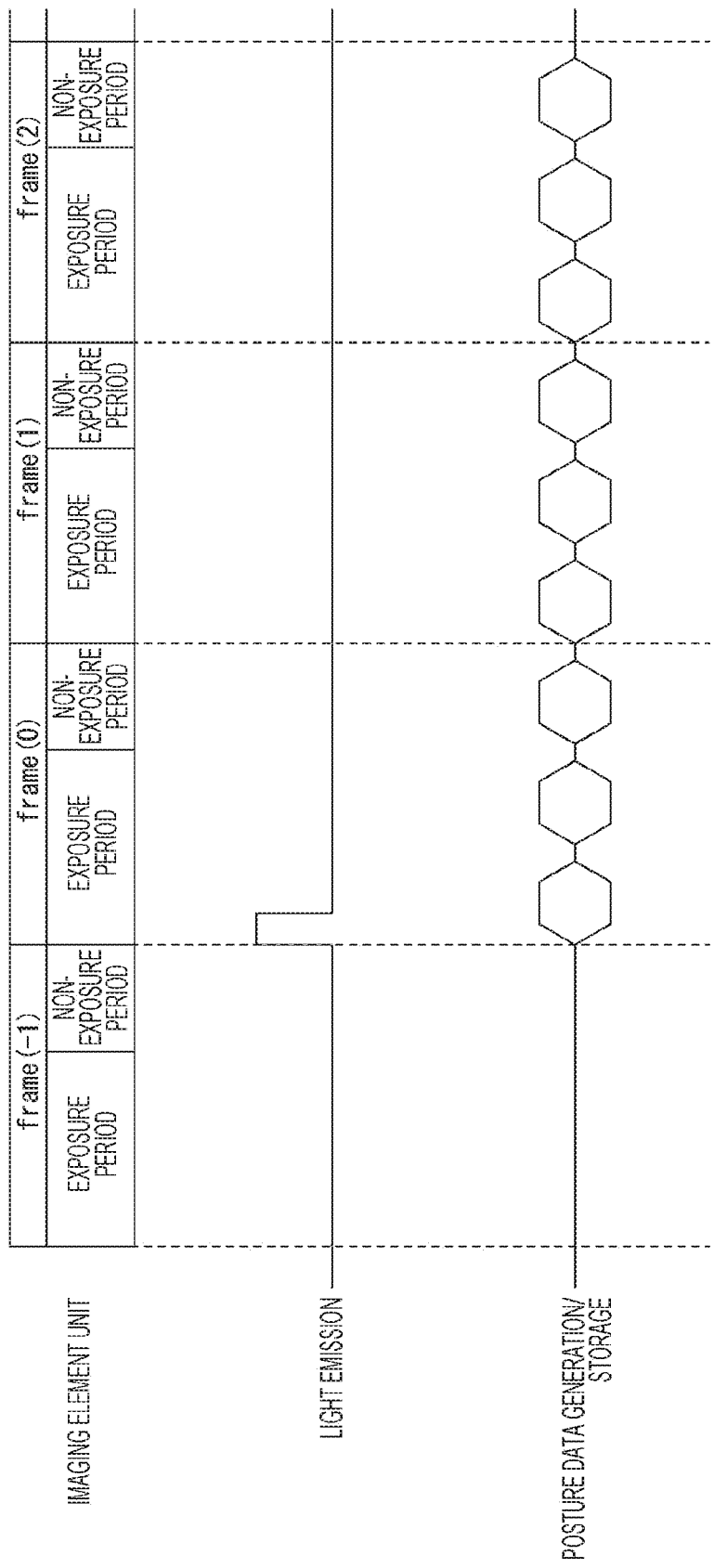
FIG. 34 is a timing chart related to detection and storage of posture data.

A specific timing chart of the imaging operation and the operation of the detecting unit is shown in FIG. 34.

In the imaging apparatus 1 having the configuration shown in FIG. 32, since the camera unit 130 and the detecting unit 131 are synchronized, the light emission of the light emitting unit 129 can be set to a predetermined timing such as the beginning of the exposure period. As a result, even if the light emission period is shortened, light can be emitted reliably within the exposure period, and therefore, the power consumption associated with the light emission of the light emitting unit 129 can be reduced.

The light emission period of the light emitting unit 129 may be short in accordance with the exposure period, but it is desirable that the light emission period be within one frame period even in a case where the light emission period is made long for the light amount and the like. This is to avoid that the number of frames affected by light emission increases.

Furthermore, since synchronization is established, even if a plurality of pieces of posture data is generated/stored in one frame period, it can be grasped at which timing of each frame period the posture data has been generated.

As described above, the posture data generation unit 101 generates posture data one or a plurality of times for one frame on the basis of a frame synchronization signal common to the image data generation unit 100. In other words, the vertical synchronization signal common to the imaging system including the image data generation unit 100 as a moving image and the posture data generation system including the posture data generation unit 101 is used.

Accordingly, since the frame of moving image data corresponding to the leading posture data can be specified by marking and frame synchronization is established, each piece of posture data can be reliably linked to each frame even if generation of posture data is performed a plurality of times for one frame of a moving image.

Furthermore, the generation of image data stored as a moving image by the image data generation unit 100 and the generation of posture data corresponding to the image data stored as a moving image by the posture data generation unit 101 are started by a common start trigger (imaging start trigger).

For example, image data generation and posture data generation are started according to operation as recording start operation.

As a result, it is possible to achieve an apparatus in which posture data is stored together with a moving image with the user's operation load minimized.

Since the process performed by the information processing apparatus 150 that has received both the image data and the posture data for associating the image data with the posture data is substantially the same as the processing shown in FIG. 31, detailed description is omitted.

Note that, in the processing of associating the first data of the posture data with the leading line of the leading frame in step S407 in FIG. 31, since the image data and the posture data are synchronized, it is possible to link the stored posture data to the leading line actually during the exposure of the leading line, so that correction as described later can be performed more accurately.

Note that, in each imaging apparatus 1 described with reference to FIG. 19, 28, 32, or the like, a plurality of pieces of posture data may be generated/stored for one frame of image data. In this case, it is considered that information based on a frame synchronization signal (vertical synchronization signal) is added to one piece of posture data corresponding to each frame. For example, a vertical synchronization flag is added to posture data acquired at the timing of the vertical synchronization signal (close to the timing).

For example, by adding vertical synchronization information to the first posture data after the timing of the vertical synchronization signal, it is possible to determine the posture data at the leading of the frame. As a result, the apparatus for processing image data and posture data can correctly recognize posture data corresponding to each frame.

The light emission of the light emitting unit 129 forms a high luminance frame in which a part of the region is high luminance, but the high luminance frame may not be used as the first frame of the moving image data. In other words, image data as a moving image may be generated from the frame next to the high luminance frame. Note that, in a case where there are two high luminance frames, image data as a moving image may be generated from a frame after the two frames.

Furthermore, it is also possible to use a high luminance frame as the first frame of image data as a moving image. This will be specifically described with reference to FIG. 35.

Figure 35:
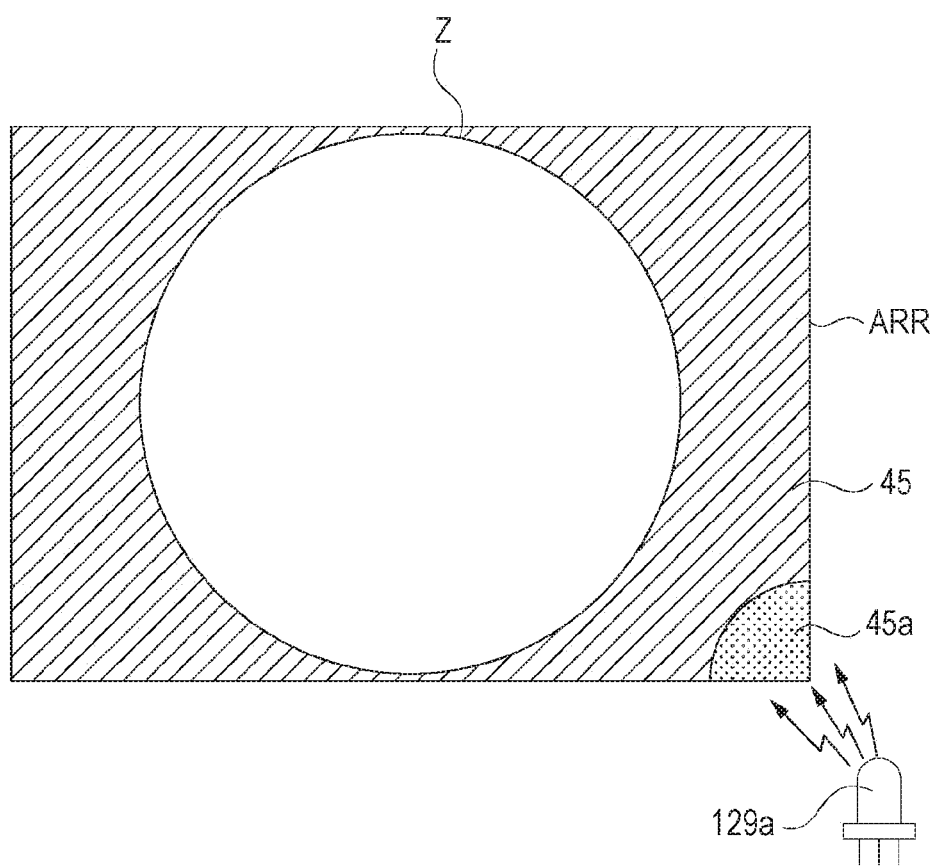
FIG. 35 is a view showing a state in which light from a light emitting unit is emitted to an out-of-range region.

FIG. 35 shows an imaging region ARR of an imaging element, and shows an image Z of a subject to be imaged. The imaging apparatus 1 in the present embodiment uses the fisheye lens 21 as the lens closest to the subject. Accordingly, for example, in a case where a circumferential fisheye lens is adopted as the fisheye lens 21, the image Z formed by the light passing through the optical system 3 on the imaging element unit 112 is substantially circular. Accordingly, an out-of-range region 45 (hatched region in the drawing) which does not affect the image data exists in the outer circumferential portion of the image sensor provided in the imaging element unit 112.

Furthermore, the LED 129a of the light emitting unit 129 is provided inside the camera unit 130 of the imaging apparatus 1 according to the present embodiment, so that it is possible to emit light from the light emitting unit 129 to the out-of-range region 45 that cannot be exposed with the light passing through the fisheye lens 21 (a textured region 45a in FIG. 35).

With such a configuration, it is possible to use a high luminance frame as part of image data as a moving image.

In other words, by providing the light emitting unit 129 so as to expose only the imaging element which is out of the incident range of the subject light by the optical system 3 in the imaging element unit 112, the high luminance image by the light emission of the light emitting unit 129 is only in the out-of range effective as the subject image.

As a result, only pixels that are not used as a subject image in a certain frame become high luminance by light emission. Accordingly, the frame can also be used as a frame to be reproduced normally. That is, it is possible to prevent unnecessary frames from being generated by the light emission of the light emitting unit.

Note that the imaging apparatus 1 according to the embodiment is an example, and various modifications can be considered.

In FIG. 22, although the angular velocity data acquired by the gyro sensor 126 itself is treated as posture data, data acquired by subjecting angular velocity data to each processing for image correction may be used as posture data.

Also in the configurations of the internal configuration examples II (FIG. 28) and III (FIG. 32) of the imaging apparatus, various configurations described for the internal configuration example I, such as exposure control configuration, audio processing unit configuration, posture data generation configuration, or the like can be adopted as appropriate.

In the internal configuration examples II (FIG. 28) and III (FIG. 32), the light emitting unit 129 is mentioned as an example of the notification unit. However, as a notification unit that issues a notification for correlating image data with posture data on the basis of a trigger, various examples such as, for example, a configuration that performs notification by sound, a configuration that performs notification by electromagnetic waves, and a configuration that performs notification by electrical signals can be considered. According to this, various examples such as an audio detector, an electromagnetic wave detector, and an electrical signal detector can be considered as the configuration of the detector.

10. Reproduction/Edit Screen in Information Processing Apparatus

As described above, the imaging apparatus 1 records moving image data and posture data. The moving image data and the posture data can be transferred to the information processing apparatus 150 such as a portable terminal or a desktop computer apparatus, and in the information processing apparatus 150, reproduction and edit of the moving image is enabled as processing based on the application program.

In particular, the image data is a moving image captured using the fisheye lens 21. Corresponding to this, in the application program, fisheye distortion correction, blur correction, and gravity direction correction of the display image are enabled.

Figure 36:
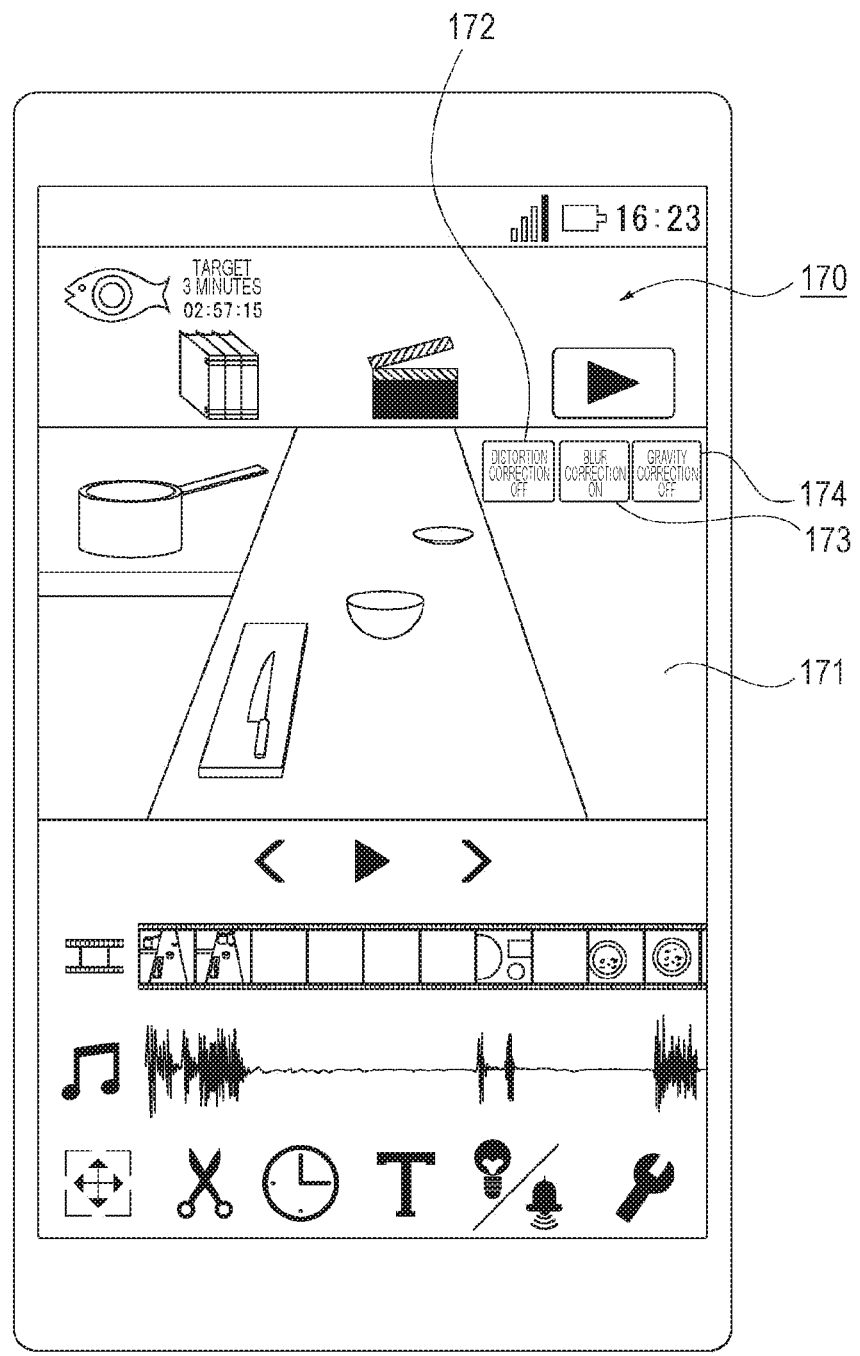
FIG. 36 is an explanatory view of an application screen of the information processing device of an embodiment.

FIG. 36 shows a state in which the application screen 170 is displayed on the information processing apparatus 150 as a portable terminal such as a smartphone.

Figure 37:
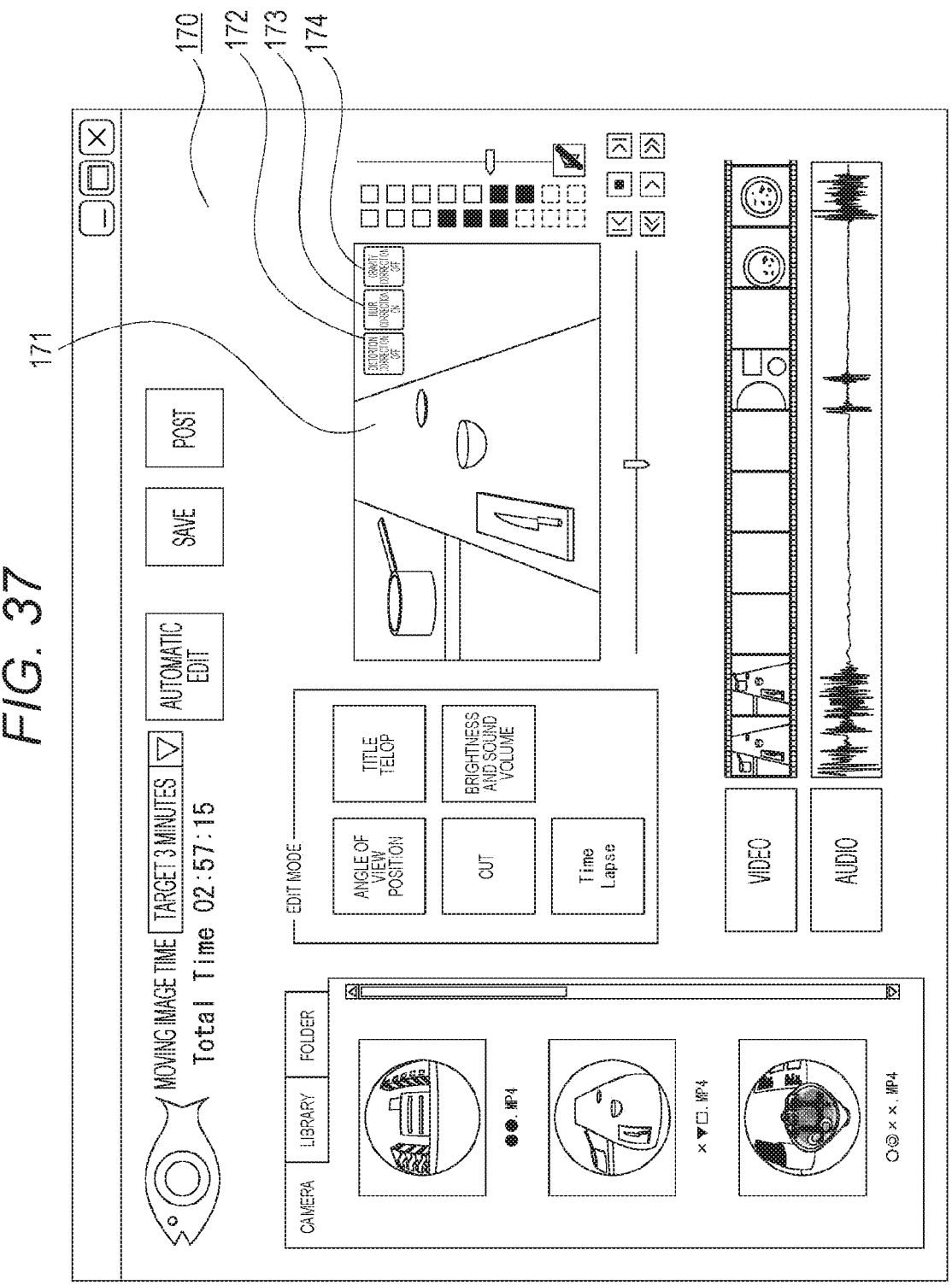
FIG. 37 is an explanatory view of an application screen of the information processing device of an embodiment.

Furthermore, FIG. 37 shows a state in which the application screen 170 is displayed on the information processing apparatus 150 having a relatively large screen, such as a personal computer or a tablet terminal.

In any case, an image region 171 is prepared on the application screen 170 so that a reproduced moving image can be displayed.

Moreover, the application screen 170 is provided with an operator for image reproduction, an editing operator, a mode operator, an indicator, and the like, and the user can check the reproduction state of a normal moving image, a time lapse moving image, or a still image, and perform desired editing work.

As a specific editing function by the application program, automatic editing and manual editing are possible.

As manual editing,
Frame deletion or restoration
Setting of initial angle of view
Designation of time lapse on/off section
Insert or delete titles and telops
Undo operation
Save edit result
Multi view mode instruction and the like are possible.

Furthermore, in the present embodiment, fisheye distortion correction and gravity direction correction can be performed at the time of reproduction of a normal moving image, a time lapse moving image, and a still image. Furthermore, blur correction can be performed at the time of reproduction of a normal moving image and a time lapse moving image.

For this purpose, in the example of FIGS. 36 and 37, a fisheye distortion correction button 172, a blur correction button 173, and a gravity direction correction button 174 are displayed in the image region 171, and can be operated arbitrarily by the user.

Note that the fisheye distortion correction button 172, the blur correction button 173, and the gravity direction correction button 174 are displayed in the image region 171 as an example, and may be outside the image region 171.

Furthermore, in this example, these three buttons are displayed during image reproduction, but an example in which two of the fisheye distortion correction button 172 and the blur correction button 173 are displayed, an example in which two of the fisheye distortion correction button 172 and the gravity direction correction button 174 are displayed, and an example in which one of them is displayed are considered.

The fisheye distortion correction button 172 allows the user to give an instruction for on/off of the fisheye distortion correction of the reproduced image.

The blur correction button 173 allows the user to give an instruction for on/off of the blur correction of the reproduced image.

The gravity direction correction button 174 allows the user to give an instruction for on/off of gravity direction correction to maintain the gravity direction to the lower portion of the screen when operation to move the viewpoint of the reproduced image is performed.

11. Image Correction Processing in Reproduction

The correction in the case of performing image reproduction in the image region 171 of the application screen 170 will be described.

Although the method of fisheye distortion correction will be described in detail later, this is processing of transforming a fisheye image into a central projection image by perspective projection onto an output coordinate system using a celestial sphere model.

For example, the image data reproduced as shown in FIG. 38A, in other words, the input image 200 as the correction processing target is rectangular and has a circular fisheye image 201. This fisheye image 201 is projected on a virtual spherical surface 202 as a celestial sphere model in FIG. 38C.

Then, a region 211 projected onto the virtual spherical surface 202 is cut out, and the fisheye distortion is corrected to acquire an image as shown in FIG. 38E.

The blur correction is to reduce the blur at the time of moving image capturing in the reproduced image, and to reduce the influence of camera shake and vibration applied to the imaging apparatus 1 at the time of capturing. In the case of the present embodiment, since the image data to be captured is a fisheye image, blur correction is reflected in fisheye distortion correction.

Here, in the fisheye image, as indicated by an arrow in FIG. 38B, the blur direction differs depending on the position. With regard to such blurring, by adjusting the region 211 cut out as shown in FIGS. 38C and 38D in accordance with the amount of blurring, images can be acquired in which blurring is canceled as shown in FIGS. 38E and 38F in successive frames. For such processing, the cut-out position of the virtual spherical surface 202 is corrected on the basis of the blur amount (correction angle) obtained using posture data as a detected value of the gyro sensor 126.

Gravity direction correction is correction to prevent shift in the gravity direction even when viewpoint movement in the range displayed during reproduction is performed. Also in this case, since the image data is a fisheye image, gravity direction correction is reflected in fisheye distortion correction.

As described above, if the region 211 cut out from the virtual spherical surface 202 is shifted up, down, left, and right according to the user's operation, the user can arbitrarily change the field of view direction to be reproduced. For example, the view direction can be changed by slide operation, swipe operation, or the like on the image region 171 of the application screen 170. At this time, the gravity direction is maintained at the lower portion of the screen.

FIG. 39A shows a state in which the gravity direction does not point directly below. By displaying this along the horizontal line as shown in FIG. 39B, it is possible to provide an easy-to-see display environment in a case where the user performs the field of view changing operation.

FIGS. 40 and 41 show examples of the image region 171 in a case where these corrections are performed.

FIGS. 40A, 40B, 41A, and 41B show examples of the image region 171 in a case where these corrections are performed.

Figure 40A:
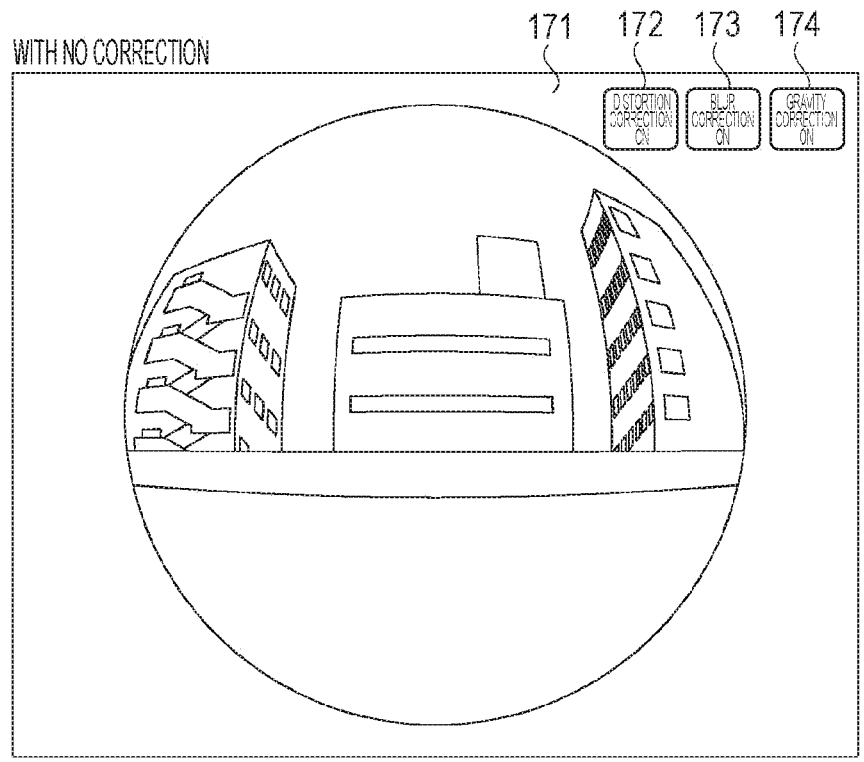
FIGS. 40A and 40B are explanatory diagrams of a display example at the time of image data reproduction of an embodiment.

FIG. 40A shows a state in which any correction is not performed. The original image data including the fisheye image is displayed as it is.

At the time of FIG. 40A, the fisheye distortion correction button 172, the blur correction button 173, and the gravity direction correction button 174 function as ON operators.

Figure 40B:
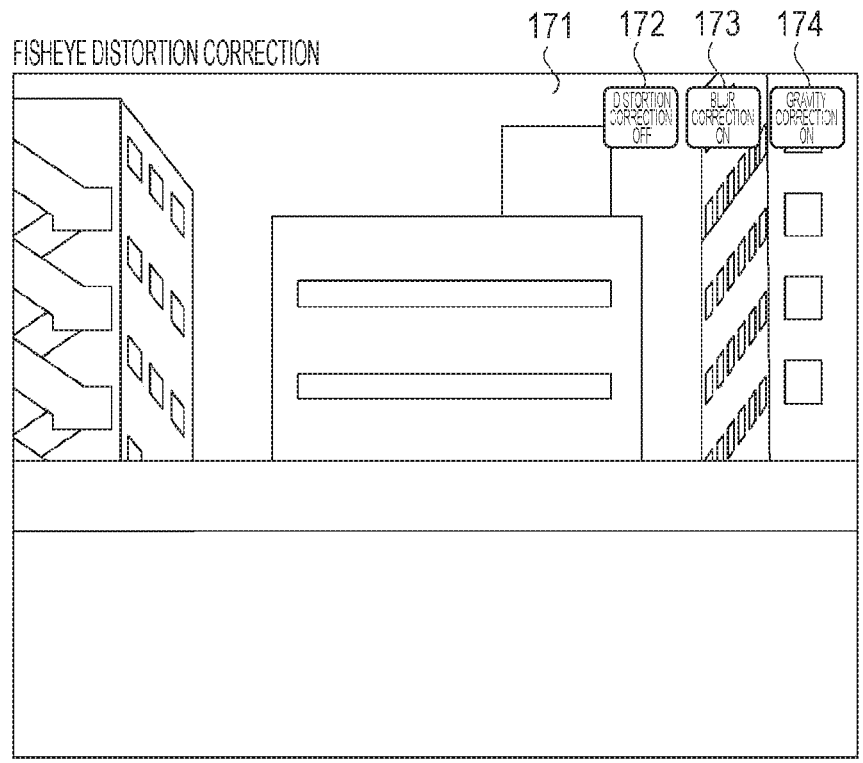

When the user performs operation such as a touch or click on the fisheye distortion correction button 172 during reproduction (in this case, the ON operation), the fisheye distortion correction functions, and thereafter, the reproduced image subjected to the fisheye distortion correction is displayed as shown in FIG. 40B.

Note that, in the present embodiment, the fisheye distortion correction, the blur correction, and the gravity direction correction can be turned on/off independently of each other, but the blur correction and the gravity direction correction function when the fisheye distortion correction is on. Accordingly, since the operations of the blur correction button 173 and the gravity direction correction button 174 become invalid during a period in which the fisheye distortion correction is not performed as shown in FIG. 40A, it can be considered that these are not displayed.

Alternatively, in a case where the blur correction button 173 is operated at the time shown in FIG. 40A, the blur correction may be performed after the fisheye distortion correction is also turned on. Similarly, in a case where the gravity direction correction button 174 is operated, the fisheye distortion correction may be turned on, and then the gravity direction correction may be performed.

At the time of FIG. 40B, the fisheye distortion correction button 172 functions as an off operator, and the blur correction button 173 and the gravity direction correction button 174 function as on operators.

In a case where the user operates the fisheye distortion correction button 172 (in this case, the off operation), the process returns to the reproduction of the fisheye image of FIG. 40A.

Figure 41A:
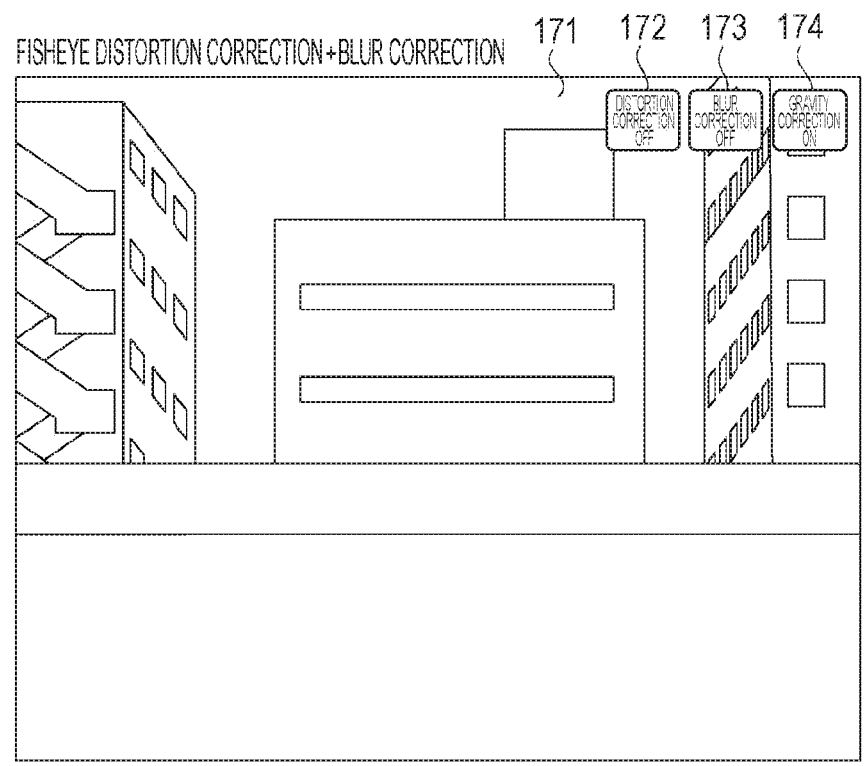
FIGS. 41A and 41B are explanatory diagrams of a display example at the time of image data reproduction of an embodiment.

When the user operates the blur correction button 173 (on operation) in the state of FIG. 40B, the blur correction function is started, and as shown in FIG. 41A, the state shifts to a state where the blur correction functions in the fisheye distortion correction image. The blur correction button 173 is an off operator.

When the user operates the blur correction button 173 (off operation) from the state of FIG. 41A, the blur correction function is ended, and the state returns to the state of FIG. 40B.

Figure 41B:
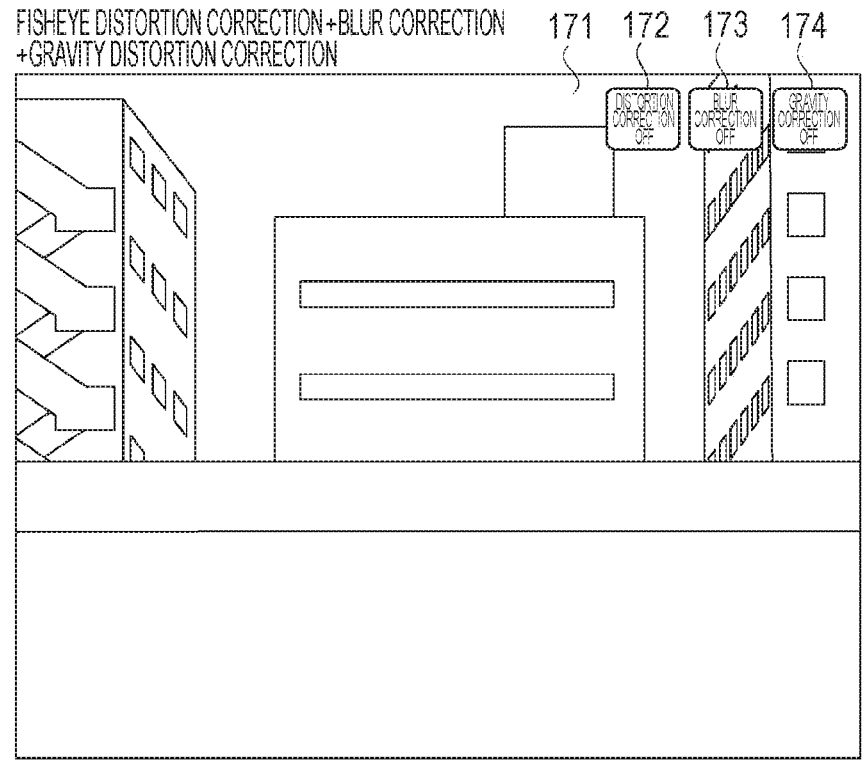

When the user operates the gravity direction correction button 174 (on operation) from the state of FIG. 41A, the gravity direction correction function is started, and as shown in FIG. 41B, the state shifts to a state where the fisheye distortion correction, the blur correction, and the gravity direction correction all function. The gravity direction correction button 174 is an off operator.

When the user operates the gravity direction correction button 174 (off operation) from the state of FIG. 41B, the gravity direction correction function is ended, and the state returns to the state of FIG. 41A.

When the user operates the blur correction button 173 (off operation) from the state of FIG. 41B, the blur correction function is ended. Although not shown in the drawings, the gravity direction correction is in a functioning state without the blur correction being performed.

Also in a case where the user operates the gravity direction correction button 174 (on operation) from the state of FIG. 40B, similarly, the gravity direction correction functions without the blur correction being performed.

As described above, in the information processing apparatus 150, the user can arbitrarily turn on/off the fisheye distortion correction, the blur correction, and the gravity direction correction during reproduction of the image data based on the application program. In this way, it is possible to compare the state of the correction presence or absence while viewing a moving image or a time lapse moving image.

Note that, although the present embodiment will be described focusing on the above three corrections, an example can be considered in which an application program has functions of fisheye distortion correction and blur correction as correction functions, and does not have a gravity direction correction function.

Furthermore, as a correction function, an example can also be considered in which an application program has functions of fisheye distortion correction and gravity direction correction, and does not have a blur correction function.

Moreover, an example can also be considered in which an application program does not have a fisheye distortion correction function, and has both or one of a blur correction function and a gravity direction correction function.

Note that, in a case of storing a reproduced image, various examples in which the above three corrections are considered can be considered.

For example, each time the various correction buttons are operated during reproduction of image data as a moving image, the on/off state of each correction changes, but the image data including the change in the time series of the on/off state of each correction may be made possible. Specifically, a configuration may be applied in which, in a case where the operation to turn on the blur correction is performed in scene 1 and the operation to turn off the blur correction is performed in the next scene 2, the reproduction image of the state in which the on/off state of the blur correction in each scene is switched according to the operation is be stored.

Furthermore, a configuration may be applied in which, in a case where an operation to save a reproduced image is performed, the on/off state of each correction is presented so as to be selectable, each correction is performed on the entire reproduced image according to the selection result of the selection, and the result is stored.

Regarding the storage of the reproduction image, the storage processing may be performed while reproducing the reproduction image. In this case, since the storage processing is performed while checking the reproduction moving image to be stored, it is possible to prevent the reproduction image in an unintended state from being stored.

Furthermore, the storage processing may be performed without the reproduction of the reproduction image. In this case, since the reproduction processing of the reproduction image is not performed, the processing load of the apparatus (such as the information processing apparatus 150) that performs the processing can be reduced, and efficiency improvement of various correction processing and the storage processing of the reproduction image can be achieved.

12. Functional Configuration of Information Processing Apparatus

The functional configuration realized by the application program for moving image reproduction and editing in the information processing apparatus 150 will be described with reference to FIGS. 42 and 43.

Figure 42:
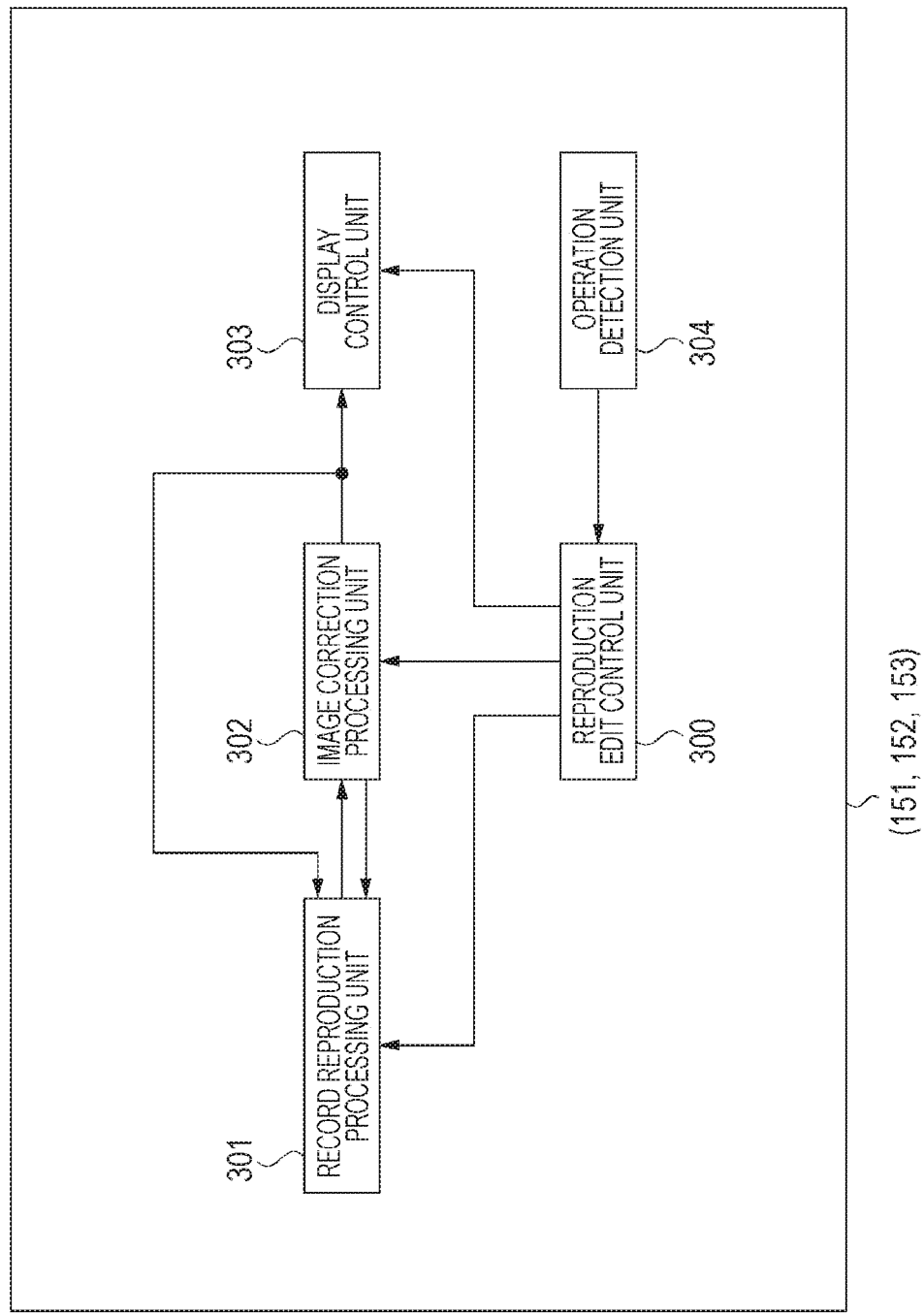
FIG. 42 is a block diagram of a functional configuration of the information processing apparatus of an embodiment.
Figure 43:
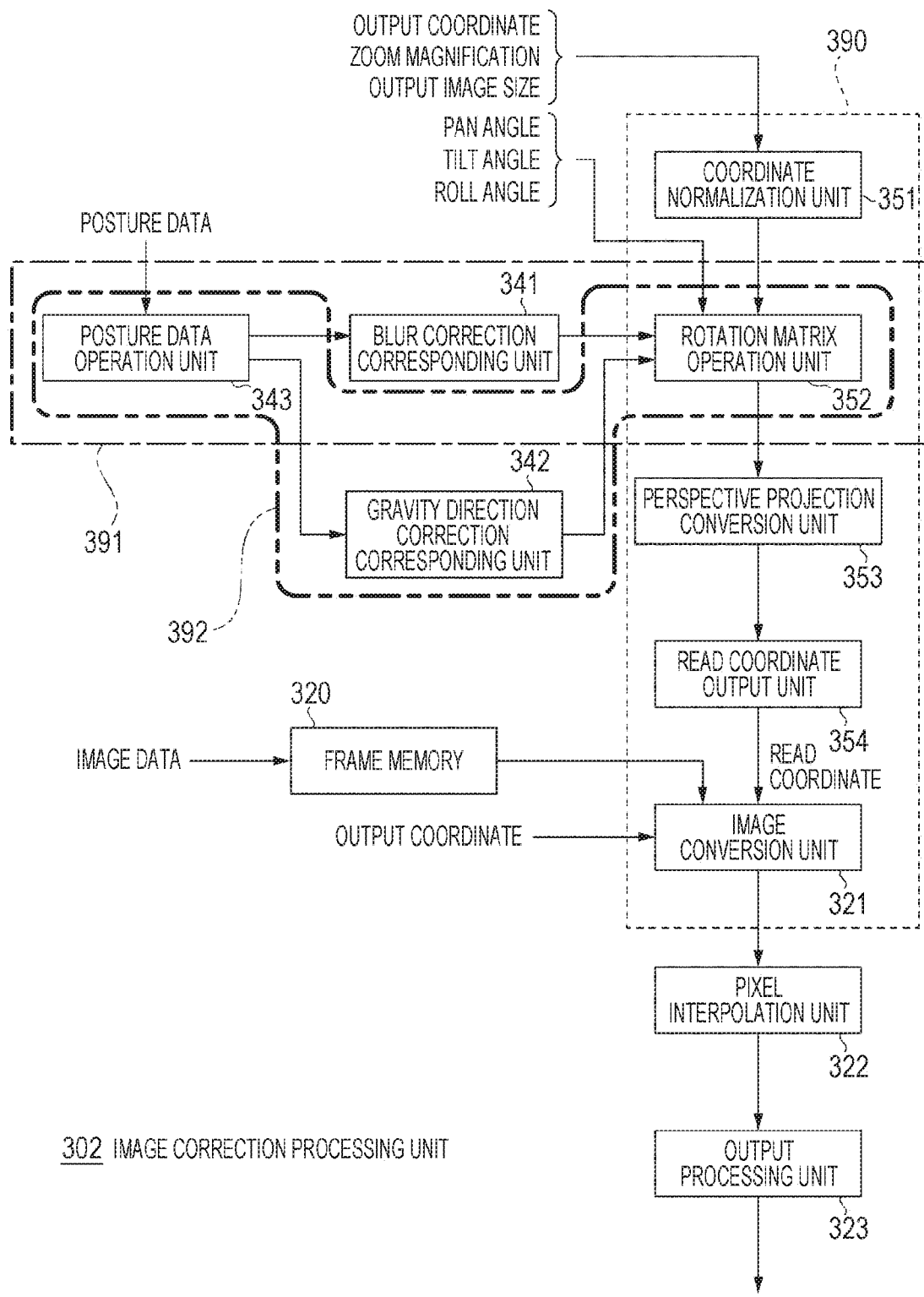
FIG. 43 is a block diagram of a functional configuration of an image correction processing unit of an embodiment.

Note that each block shown in FIGS. 42 and 43 is a function implemented by software using the hardware resources of the information processing apparatus 150 as the CPU 151, the ROM 152, and the RAM 153 shown in FIG. 21 (processing function executed by the CPU 151).

As shown in FIG. 42, the information processing apparatus 150 includes a reproduction edit control unit 300, a record reproduction processing unit 301, an image correction processing unit 302, a display control unit 303, and an operation detector 304 as functions for moving image reproduction and editing.

The reproduction edit control unit 300 has a function of controlling each unit in order to advance the operation of the application program in accordance with the user operation.

Regarding the correction function, the reproduction edit control unit 300 instructs the image correction processing unit 302 to turn on/off each of the fisheye distortion correction, the blur correction, and the gravity direction correction. Furthermore, regarding these correction functions, the reproduction edit control unit 300 supplies the image correction processing unit 302 with information such as output coordinates, zoom magnification, output image size, pan angle, tilt angle, roll angle, and the like.

Here, the output coordinates are coordinates in the central projection image generated from the fisheye image. This central projection image includes a plurality of pixels arranged on a two-dimensional grid. Furthermore, in the central projection image, an array of pixels aligned along a predetermined direction (for example, the horizontal direction) is called a row. In the supply of output coordinates, each row is selected in turn, and each of the coordinates of pixels in the selected row is supplied sequentially as output coordinates.

Furthermore, the output image size is the size of the central projection image. The zoom magnification indicates the ratio of the output image size to the output coordinate plane. The output coordinate plane is a rectangular projection plane on which at least a part of the fisheye image is projected by perspective projection, and an image obtained by enlarging the output coordinate plane by a zoom factor is generated as a central projection image. The pan angle, the tilt angle, and the roll angle will be described later.

The record reproduction processing unit 301 is a function of performing recording and reproduction access processing on the storage unit 159 of FIG. 21 and performing recording and reproduction access processing on the drive 161. Specifically, the record reproduction processing unit 301 performs recording and reproduction access for reading image data and posture data transferred from the imaging apparatus 1 and stored in the storage unit 159, and writing image data after editing, editing information or the like in the storage unit 159. Furthermore, the record reproduction processing unit 301 also can perform recording and reproduction access for reading the image data and posture data stored in the memory card 162 via the drive 161, and writing image data after editing, editing information or the like in the memory card 162.

The image correction processing unit 302 can perform fisheye distortion correction, blur correction, gravity direction maintenance control, and the like on the image data read from the storage medium by the record reproduction processing unit 301. Details will be described later with reference to FIG. 43.

The display control unit 303 is a function of supplying control and display data necessary as processing for executing display on the display 156 of FIG. 21. Specifically, it is a function to execute the display of the application screen 170 as shown in FIGS. 36 and 37.

The operation detector 304 performs processing for detecting operation from the input unit 156 of FIG. 21 including a keyboard, a mouse, a touch panel, or the like. Specifically, the function is to detect the reproduction operation and the editing operation of the user.

A configuration example of the image correction processing unit 302 is shown in FIG. 43.

The image correction processing unit 302 has a frame memory 320. Each frame of image data (input image) reproduced by the function of the record reproduction processing unit 301 is sequentially processed by an image conversion unit 321 while being temporarily stored in the frame memory 320.

The image conversion unit 321 converts the fisheye image into a central projection image. Each time the image conversion unit 321 receives output coordinates from the reproduction edit control unit 300, the image conversion unit 321 reads out from the frame memory 320 the pixel value of the read coordinates corresponding to the output coordinates. The read coordinates indicate the coordinates in the fisheye image.

Then, the image conversion unit 321 supplies the read pixel value to the pixel interpolation unit 322 as a pixel value of output coordinates in the central projection image. As a result, the fisheye image is converted to a central projection image.

The pixel interpolation unit 322 interpolates pixels in the central projection image as necessary. For example, when enlarging a part or all of a fisheye image, the pixel interpolation unit 322 determines and interpolates necessary pixels with sub-pixel accuracy. In this interpolation, an algorithm such as a bilinear interpolation algorithm, a bicubic interpolation algorithm, or a Lanzos interpolation algorithm is used. The pixel interpolation unit 322 supplies the central projection image obtained by interpolating the pixels to the output processing unit 323.

The output processing unit 323 performs on screen display (OSD) processing, mask processing, image format conversion processing, and the like on the central projection image as necessary. The output processing unit 323 supplies the processed central projection image to the display control unit 303 and the record reproduction processing unit 301 in FIG. 42.

The display control unit 303 performs control to display the image data from the output processing unit 323 in the image region 171 of the application screen 170 as a display image.

Furthermore, in a case where the user performs operation to request recording, the record reproduction processing unit 301 supplies the image data from the output processing unit 323 as an image to be recorded to the storage unit 159 or the drive 161 in FIG. 21 and performs control for recording.

Note that, when it is instructed by the reproduction edit control unit 300 that the fisheye distortion correction is off, the image conversion unit 321 transfers the image data (input image) temporarily stored in the frame memory 320 to the pixel interpolation unit 322 as it is. In this case, a fisheye image is displayed or recorded.

A coordinate normalization unit 351, a rotation matrix operation unit 352, a perspective projection conversion unit 353, and a read coordinate output unit 354 are provided to obtain read coordinates corresponding to output coordinates for fisheye distortion correction.

With these configurations, each time output coordinates are supplied, the output coordinates are converted into corresponding read coordinates and supplied to the image conversion unit 321.

Here, the association between the virtual spherical surface 202 and the fisheye image 201 will be described.

As shown in FIG. 44, a predetermined axis parallel to the input image 200 including the fisheye image 201 is an x-axis, and an axis parallel to the fisheye image 201 and orthogonal to the x-axis is a y-axis. Furthermore, an axis orthogonal to these x-axis and y-axis is a z-axis. The origin of the x-axis, y-axis, and z-axis is, for example, the center of the fisheye image 201. Then, the surface of a hemisphere centered on the origin is assumed to be a virtual spherical surface 202. The virtual spherical surface 202 represents the field of view range imaged by the imaging apparatus 1 using the fisheye lens 21.

A virtual spherical surface 202 whose origin is the center of the fisheye image 201 is divided into meshes. In the division, for example, the latitude and longitude of the virtual spherical surface 202 are divided at equal intervals. The coordinates of the points obtained by projecting the divided division points (mesh intersections) 203 and 204 in parallel to the z-axis on the fisheye image are coordinates 205 and 206 on the fisheye image. In other words, the coordinates are read coordinates.

Furthermore, the association between the output image and the virtual spherical surface 202 is as follows.

Figure 45A:
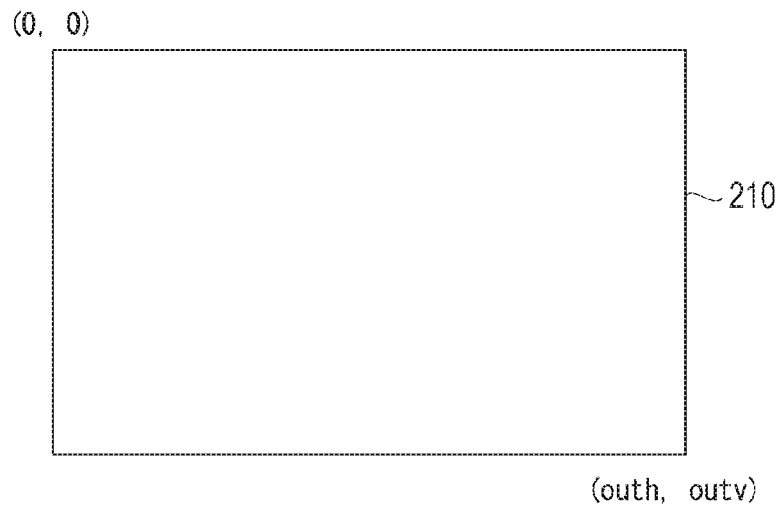
FIGS. 45A and 45B are explanatory diagrams of correspondence between an output image and a virtual spherical surface of an embodiment.

FIG. 45A shows an example of the output coordinate plane 210.

Such a rectangular output coordinate plane 210 is set in the fisheye image 201.

Figure 45B:
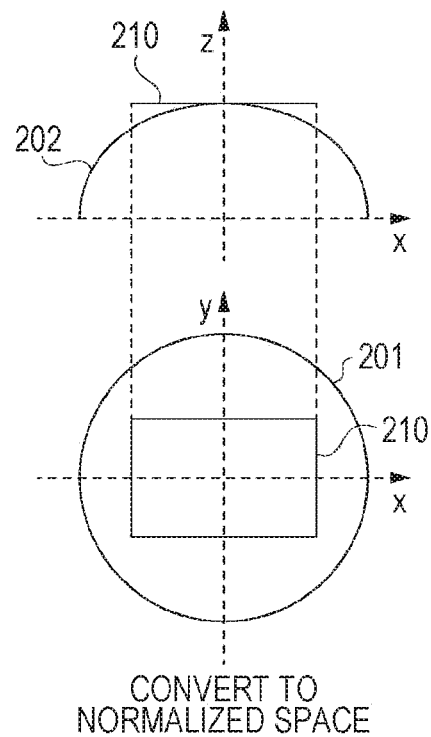

As shown in FIG. 45B, in the initial state, the output coordinate plane 210 is arranged, for example, at a position where the center thereof coincides with the center of the fisheye image and is in contact with the virtual spherical surface 202.

As shown in FIG. 45B, the coordinate normalization unit 351 arranges (normalizes) the output coordinate plane 210 in a three-dimensional space so that the output coordinate plane 210 contacts the center of the virtual spherical surface 202 in the middle.

In this case, the coordinate normalization unit 351 normalizes the output coordinates on the basis of the zoom magnification and the output image size supplied from the reproduction edit control unit 300. For example, as shown in FIG. 45A, in a case where the horizontal coordinate of the central projection image is 0 to outh and the vertical coordinate is 0 to outv, outh and outv are supplied as output image sizes.

The coordinate normalization unit 351 normalizes the output coordinates by, for example, the following equation.

$$x_{norm} = \frac{1}{zoom} \cdot \frac{(x - outh/2)}{r}$$

$$y_{norm} = \frac{1}{zoom} \cdot \frac{(y - outv/2)}{r}$$

[Equation 1]

-continued $z_{norm} = 1$ where $r = \min(outh, outv)/2$

In the above (Equation 1), min (A, B) is a function that returns the smaller one of A and B. Furthermore, "zoom" is the zoom magnification in which the magnification when the diameter of the fisheye image 201 matches the short side of the output coordinate plane 210, and the output coordinate plane 210 (in other words, the projection plane) is arranged in contact with the virtual spherical surface is "1".

Furthermore, xnorm, ynorm, and znorm are normalized x, y, and z coordinates.

The coordinate normalization unit 351 supplies the normalized output coordinates (xnorm, ynorm, znorm) to the rotation matrix operation unit 352.

The output coordinates are normalized to the coordinates on the spherical surface of a hemisphere with a radius of 1.0 according to each equation (Equation 1).

Note that, although the imaging apparatus 1 magnifies at least a part of a fisheye image by zoom magnification, at least a part of a fisheye image may be reduced. When reducing, the control unit 150 supplies a reduction ratio instead of the zoom magnification "zoom". In this case, "zoom" is replaced with the reduction ratio in the above (Equation 1).

Figure 46A:
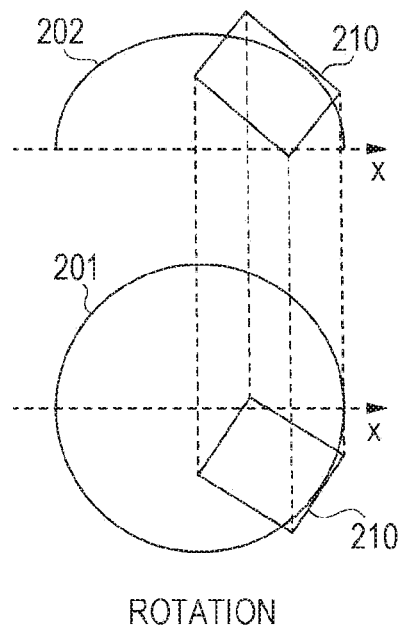
FIGS. 46A and 46B are explanatory diagrams of rotation of an output image plane and perspective projection of an embodiment.

The rotation matrix operation unit 352 rotates the output coordinate plane 210 by rotation matrix operation as shown in FIG. 46A. The rotation matrix operation unit 352 receives the pan angle, the tilt angle, and the roll angle from the reproduction edit control unit 300. Here, the pan angle is a rotation angle for rotating the output coordinates about the x-axis. Furthermore, the tilt angle is a rotation angle for rotating the output coordinates around the y-axis, and the roll angle is a rotation angle for rotating around the z axis.

Then, the rotation matrix operation unit 352 performs, for example, rotation matrix operation according to the following equation.

$$\begin{pmatrix} x_{rot} \\ y_{rot} \\ z_{rot} \end{pmatrix} = \begin{pmatrix} 1 & 0 & 0 \\ 0 & \cos R_t & -\sin R_t \\ 0 & \sin R_t & \cos R_t \end{pmatrix} \quad \text{[Equation 2]}$$

$$\begin{pmatrix} \cos R_r & 0 & -\sin R_r \\ 0 & 1 & 0 \\ \sin R_r & 0 & \cos R_r \end{pmatrix} \begin{pmatrix} \cos R_p & -\sin R_p & 0 \\ \sin R_p & \cos R_p & 0 \\ 0 & 0 & 1 \end{pmatrix} \begin{pmatrix} x_{norm} \\ y_{norm} \\ z_{norm} \end{pmatrix}$$

In the above (Equation 2), "Rt" is a tilt angle, "Rr" is a roll angle, and "Rp" is a pan angle. Furthermore, (xrot, yrot, zrot) are output coordinates after rotation.

The rotation matrix operation unit 352 supplies the output coordinates (xrot, yrot, zrot) to the perspective projection conversion unit 353.

Figure 46B:
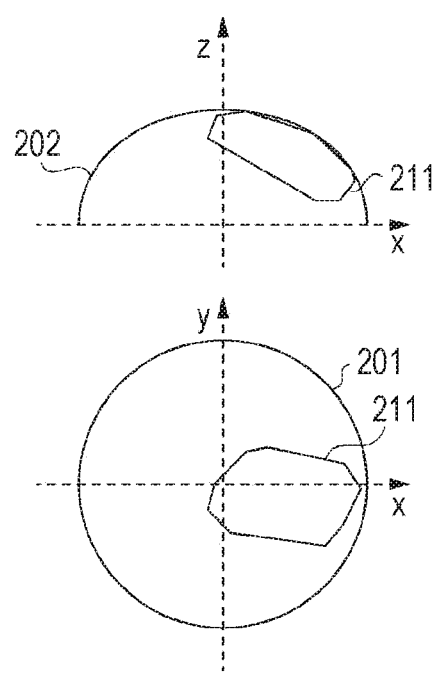

The perspective projection conversion unit 353 performs perspective projection conversion on the output coordinates. As shown in FIG. 46B, the output coordinate plane 210 is perspectively projected onto the celestial surface (region 211). In other words, a point intersecting the spherical surface when a straight line is drawn from the output coordinates toward the center of the celestial sphere is determined. Each coordinate is calculated as follows.

$x_{sph} x_{rot}/\sqrt{x_{rot}^2+y_{rot}^2+z_{rot}^2}$ $y_{sph} y_{rot}/\sqrt{x_{rot}^2+y_{rot}^2+z_{rot}^2}$ $z_{sph} z_{rot}/\sqrt{x_{rot}^2+y_{rot}^2+z_{rot}^2}$ $R_x = \arctan 2(y_{sph}, x_{sph})$ $R_z = \arctan(z_{sph})$ [Equation 3]

In (Equation 3), xsph, ysph, and zsph are coordinates obtained by projecting the output coordinates to the coordinates on the surface of the virtual celestial spherical surface. Furthermore, arctan 2(y, x) is a function that returns an angle between a straight line connecting (y, x) and the origin and the x-axis. Furthermore, arccos represents an inverse function of a sine function. Furthermore, Rx and Rz indicate angles with respect to the x-axis and the z-axis among the output coordinates of the projection projection conversion of the polar coordinate notation.

The perspective projection conversion unit 353 supplies (Rx, Rz) of the output coordinates (r, Rx, Rz) subjected to the projection projection conversion to the read coordinate output unit 300. r represents the radius in the polar coordinate system. The reason why r is not supplied is that r is a fixed value (for example, "1").

The read coordinate output unit 354 converts the output coordinates into read coordinates and outputs the read coordinates to the image conversion unit 321. For example, it is considered that the read coordinate output unit 354 has a fisheye image distortion correction table storing reading coordinates corresponding to the output coordinates, acquires the read coordinates from the fisheye image distortion correction table, and outputs the read coordinates.

The fisheye image distortion correction table stores the coordinates of all or part of the read coordinates in the fisheye image in association with the output coordinates in the central projection image. In a case where a part of the coordinates is stored, in a case where the read coordinates corresponding to the output coordinates are not stored, the read coordinate output unit 354 calculates and outputs the read coordinates by the interpolation operation.

Figure 47A:
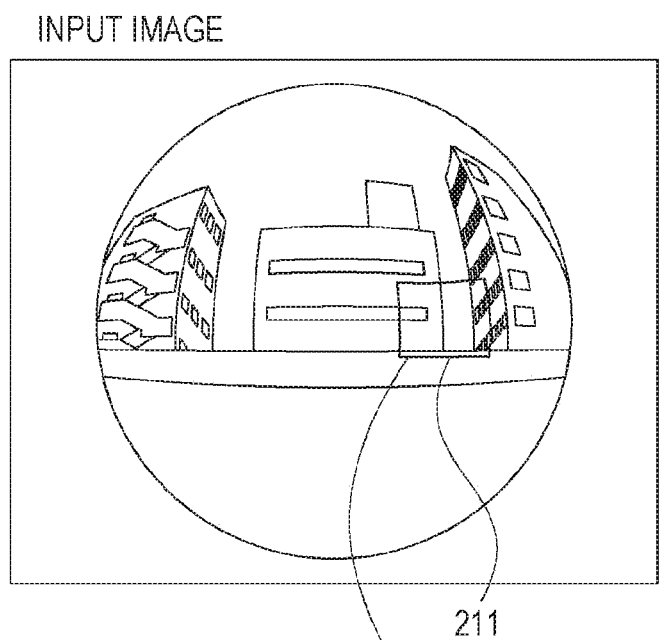
FIGS. 47A and 47B are explanatory diagrams of an input image and an output image of an embodiment.
Figure 47B:
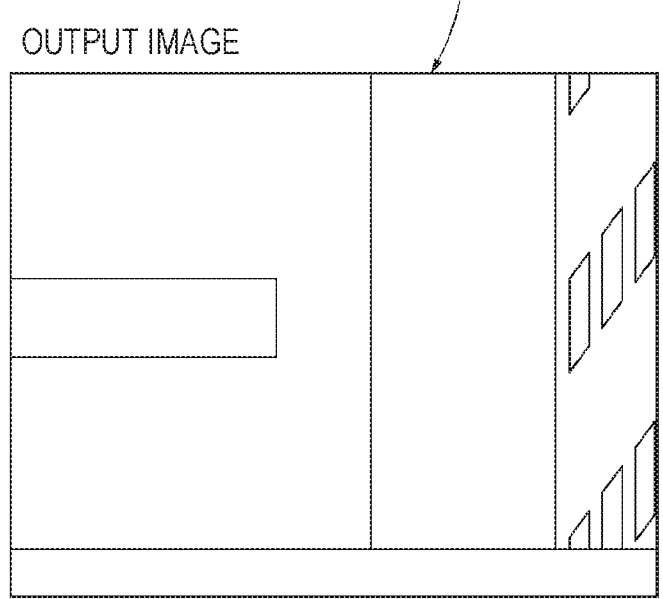

The image conversion unit 321 reads pixels from the frame memory 320 using the read coordinates obtained by the above-described processing of each unit, whereby an output image subjected to fisheye distortion correction can be obtained. For example, from the input image as shown in FIG. 47A, a region 211 can be cut out to obtain an output image in the central projection method as shown in FIG. 47B.

That is, in the above processing, the association relationship between each coordinate of the input image and the output image is obtained by calculating where the coordinates of each pixel of the output image (two-dimensional) correspond to on the virtual spherical surface 202, and pasting the input image (fisheye image 201) on the virtual spherical surface 202. Then, a pixel corresponding to the region 211 corresponding to the output image is read (cut out) from the input image in the frame memory 320 to acquire an output image subjected to fisheye distortion correction.

Next, blur correction performed in the process of fisheye distortion correction as described above will be described.

The blur correction is achieved by applying a blur correction component calculated from posture data (gyro data) when rotating the output coordinate plane 210 by the rotation matrix operation unit 352.

Even if the region 211 on the virtual spherical surface 202 is fixed, the subject scene captured in the region cut out in each frame (the region on the fisheye image 201) is shifted due to the blur at the time of imaging. Accordingly, in order to cancel the blur from the reproduced image, it is sufficient to shift the region cut out opposite to the shift of the imaging field of view direction due to the blur.

That is, in each frame, it is sufficient that the region 211 may be shifted so as to cancel the change in the posture of the imaging apparatus 1.

A posture data operation unit 343 in FIG. 43 performs, for example, calculation of differential values as shown in FIG. 22, calculation of updating for the sampling interval of the gyro data, calculation of norm normalization of quaternion, and the like.

The blur correction corresponding unit 341 obtains a coefficient R for blur correction from the value obtained from the posture data corresponding to the target frame, and supplies the coefficient R to the rotation matrix operation unit 352.

It is assumed that the posture of the imaging apparatus 1 at the time of imaging of the current frame is rotated by θ from the initial posture with respect to the vector u.

The quaternion q which represents the rotation which cancels this is represented by the following.

$$q = \left[\cos\frac{\theta}{2} \quad -u_x\sin\frac{\theta}{2} \quad -u_y\sin\frac{\theta}{2} \quad -u_z\sin\frac{\theta}{2}\right]$$
$$= [q_0 \ q_1 \ q_2 \ q_3]$$

[Equation 4]

The rotation matrix R corresponding to this quaternion is as follows.

$$R = \begin{pmatrix} q_0^2 + q_1^2 - q_2^2 - q_3^2 & 2(q_1q_2 - q_0q_3) & 2(q_1q_3 + q_0q_2) \\ 2(q_1q_2 + q_0q_3) & q_0^2 - q_1^2 + q_2^2 - q_3^2 & 2(q_2q_3 - q_0q_1) \\ 2(q_1q_3 - q_0q_2) & 2(q_2q_3 + q_0q_1) & q_0^2 - q_1^2 - q_2^2 + q_3^2 \end{pmatrix}$$

[Equation 5]

It is possible to simultaneously perform the fisheye distortion correction and the blur correction by changing the equation of the above (Equation 2) performed by the rotation matrix operation unit 352 to the following (Equation 6) using this rotation matrix R.

$$\begin{pmatrix} x_{rot} \\ y_{rot} \\ z_{rot} \end{pmatrix} = R \begin{pmatrix} 1 & 0 & 0 \\ 0 & \cos R_t & -\sin R_t \\ 0 & \sin R_t & \cos R_t \end{pmatrix}$$
$$\begin{pmatrix} \cos R_r & 0 & -\sin R_r \\ 0 & 1 & 0 \\ \sin R_r & 0 & \cos R_r \end{pmatrix} \begin{pmatrix} \cos R_p & -\sin R_p & 0 \\ \sin R_p & \cos R_p & 0 \\ 0 & 0 & 1 \end{pmatrix} \begin{pmatrix} x_{norm} \\ y_{norm} \\ z_{norm} \end{pmatrix}$$

[Equation 6]

Note that, in the above-described blur correction, it is preferable to determine the magnitude of the change in the field of view and perform the correction. For example, it is determined whether the imaging apparatus 1 shakes due to vibration or the user changes the direction of the body, on the basis of the amount of blur. For example, in a case where the orientation of the body wearing the imaging apparatus 1 is changed, it is natural that there is a change in the scene being imaged according to that. Therefore, it is also considered that blur correction is not performed temporarily in a case of a blur amount equal to or more than a predetermined amount.

Next, gravity direction correction will be described.

Since the output image to be reproduced and displayed is a part of the fisheye image 201 cut out, the field of view direction of the image can be changed at the time of reproduction by changing the cutout position according to the user's operation.

Accordingly, the reproduction edit control unit 300 can change the cutout region from the fisheye image 201 by changing the pan angle, tilt angle, and roll to be supplied to the rotation matrix operation unit 352 in accordance with the user's operation (flick on the screen, slide operation, pan/tilt/roll icon operation, or the like). That is, the displayed scene can be transitioned to the scene of the right and left direction and the up and down direction, and the user can arbitrarily view the subject scene in the range captured in the fisheye image 201.

However, when the field of view direction is changed according to the user's operation simply, the lower portion of the reproduced image tends to be in a state of being inconsistent with the gravity direction at the time of imaging.

For example, FIG. 48B shows the situation where reproduced and displayed scene is tilted with respect to gravity. This is a state in which the gravity direction g is shifted from the y-axis direction as shown in FIG. 48A.

Therefore, gravity direction correction is to prevent the gravity direction from shifting in the reproduced image to be displayed even if the field of view is changed by user operation during reproduction.

Specifically, processing of
aligning the gravity direction with the y-axis
rotating only pan and tilt is performed. As a result, in the corrected image, the downward direction of the reproduced image can always be vertically downward.

FIG. 48C shows a state in which the gravity direction g and the y-axis direction are aligned. As a result, as shown in FIG. 48D, it is possible to acquire a reproduced image in which the gravity direction g is downward.

For this gravity direction correction, the gravity direction correction corresponding unit 342 in FIG. 43 calculates the gravity direction in the frame to be processed using the acceleration data in the posture data.

Note that, in order to stably obtain the direction of acceleration, an extended Kalman filter or the like may be used in combination with angular velocity information with preferable S/N.

Then, the gravity direction correction corresponding unit 342 supplies the information regarding the calculated gravity direction g to the rotation matrix operation unit 352.

The rotation matrix operation unit 352 imposes a constraint such that the y-axis coincides with the gravity direction g when the rotation process is performed according to the above (Equation 2) or the above (Equation 6).

In a case where the rotation process is performed according to the above (Equation 2), the fisheye distortion correction and the gravity direction correction are performed by making the y-axis coincide with the gravity direction g.

In a case where the rotation process is performed according to the above (Equation 6), the fisheye distortion correction, the blur correction, and the gravity direction correction are performed by making the y-axis coincide with the gravity direction g.

As understood from the above, the image correction processing unit 302 in FIG. 43 includes a distortion correction processing unit 390 that performs distortion correction processing for converting image data into a central projection type image. In other words, the coordinate normalization unit 351, the rotation matrix operation unit 352, the perspective projection conversion unit 353, the read coordinate output unit 354, and the image conversion unit 321 function as the distortion correction processing unit 390.

Furthermore, the image correction processing unit 302 includes a blur correction processing unit 391 that performs blur correction processing for reducing an image blur appearing in image data using posture data of the imaging apparatus corresponding to each frame of the image data. In other words, the posture data operation unit 391, the blur correction corresponding unit 341, and the rotation matrix operation unit 352 function as the blur correction processing unit 391.

Furthermore, the image correction processing unit 302 includes a gravity direction correction processing unit 392 that performs gravity direction correction to keep the gravity direction constant in the display image when the field of view is changed during reproduction display of image data using posture data of the imaging apparatus 1 corresponding to each frame of the image data. In other words, the posture data operation unit 391, the gravity direction correction corresponding unit 342, and the rotation matrix operation unit 352 function as the gravity direction correction processing unit 392.

13. Processing Example by Information Processing Apparatus

The processing example achieved by the application program in the information processing apparatus 150 will be described.

Figure 49:
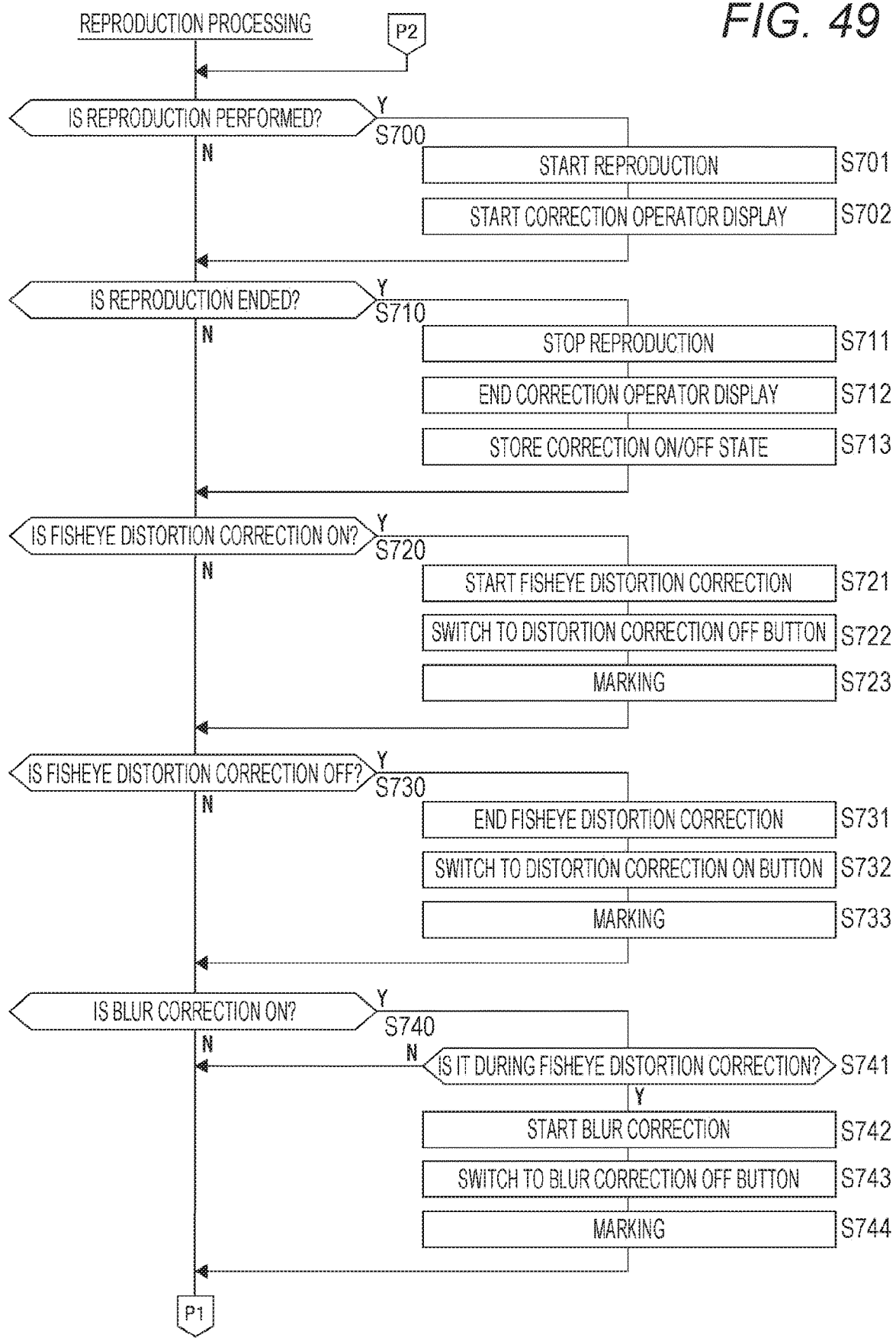
FIG. 49 is a flowchart of reproduction processing of an embodiment.
Figure 50:
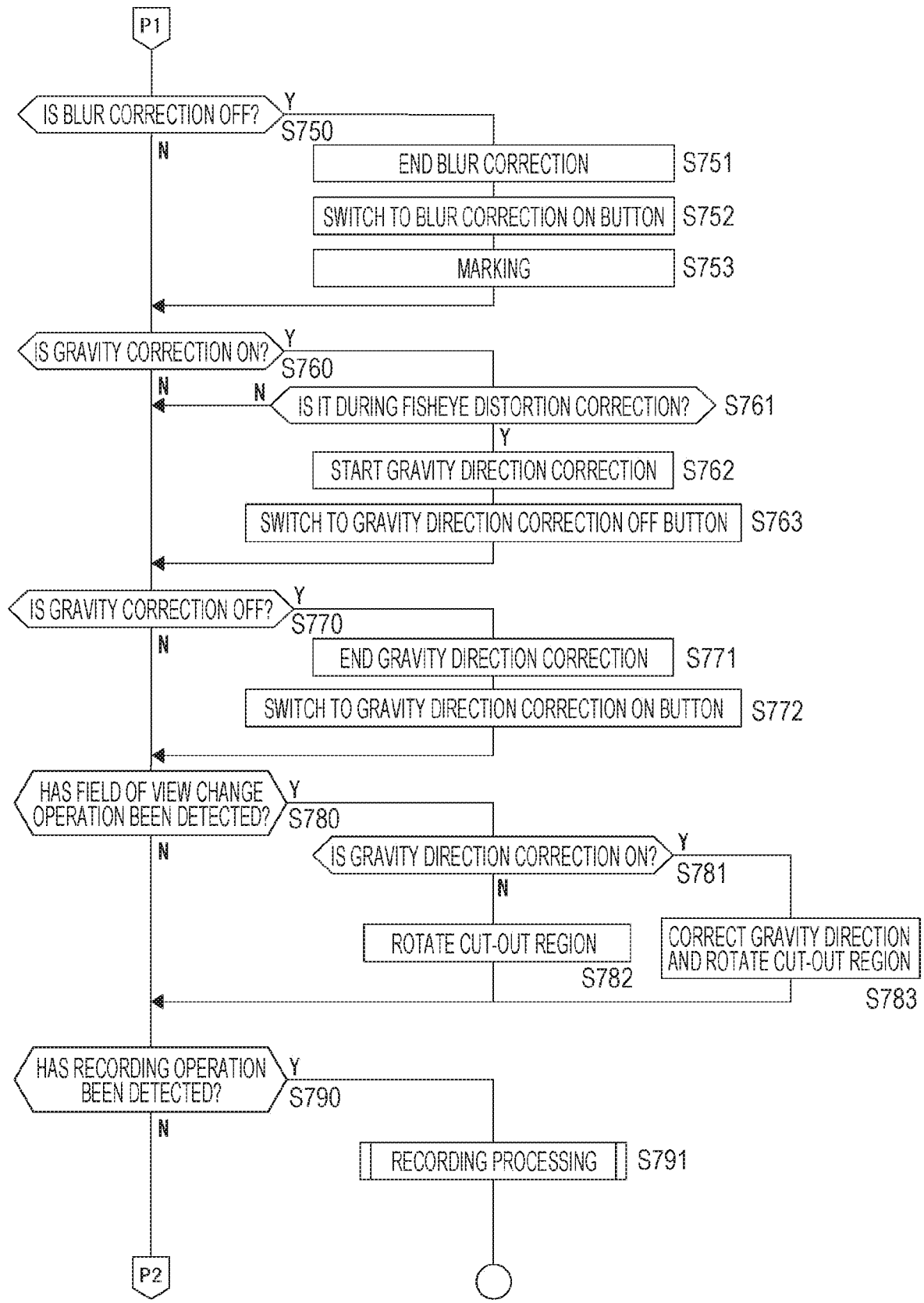
FIG. 50 is a flowchart of reproduction processing of an embodiment.

FIGS. 49 and 50 show an example of processing at the time of reproduction executed by the CPU 151 of FIG. 21 in the information processing apparatus 150 according to the functional configuration of FIG. 42. For example, it is processing in the case of performing image reproduction on the application screen 170 shown in FIG. 36 or 37.

Here, an example in which a moving image (normal moving image or time lapse moving image) is reproduced will be described.

The CPU 151 monitors various triggers in steps S700, S710, S720, S730, S740, S750, S760, S770, S780, and S790 in FIGS. 49 and 50.

Note that "P1" in FIG. 49 is connected to "P1" in FIG. 50. Furthermore, "P2" in FIG. 50 is connected to "P2" in FIG. 49.

For example, if it is detected that the user has performed reproduction operation, the CPU 151 proceeds from step S700 to S701 to perform control to start image reproduction.

Furthermore, in step S702, the CPU 151 causes the correction operator to be displayed superimposed on the reproduced moving image. The correction operator here is the fisheye distortion correction button 172, the blur correction button 173, and the gravity direction correction button 174 shown in FIGS. 40A, 40B, 41A, and 41B, and the like.

Under the control of steps S701 and S702, for example, moving image reproduction as shown in FIG. 40A is started. Note that, at the start of reproduction, a moving image to which fisheye distortion correction has already been applied may be reproduced, or blur correction or gravity direction correction may be made effective.

Furthermore, in a case where the same moving image has been reproduced in the past, the last correction on/off state at the time of the previous reproduction may be maintained and the reproduction may be started. The correction on/off state is a state in which each of the fisheye distortion correction, the blur correction, and the gravity direction correction is on or off.

In a case where a trigger for ending the reproduction is recognized, for example, in a case where the user performs reproduction stop operation or in a case where the moving image reproduction reaches the last frame, the CPU 151 proceeds from step S710 to S711 to perform reproduction stop control. This stops the moving image reproduction.

Furthermore, in step S712, the CPU 151 ends the display of the correction operator on the image.

Furthermore, in step S713, the CPU 151 stores the correction on/off state at the end of the reproduction in the storage unit 159, for example, in association with the moving image content. By this processing, when moving image reproduction is started in the previous step S701, the reproduction can be performed in the correction on/off state at the end of the previous reproduction.

In a case where it is detected that the fisheye distortion correction button 172 is turned on during moving image reproduction, the CPU 151 proceeds from step S720 to S721 to start fisheye distortion correction. Furthermore, in step S722, processing is performed to set the fisheye distortion correction button 172 being displayed as the off operator. As a result, the moving image being reproduced is displayed as shown in FIG. 40B, for example.

In step S723, the CPU 151 performs marking processing as a fisheye distortion correction start position.

The marking processing is, for example, processing of storing a frame number (hour/minute/second/frame) as marking information corresponding to moving image content being reproduced. For example, the fisheye distortion correction start position, the fisheye distortion correction end position, the blur correction start position, and the frame number of the blur correction end position are sequentially stored as marking information. The CPU 151 stores the marking information in the storage unit 159 as information corresponding to the moving image content, for example.

In a case where it is detected that the fisheye distortion correction button 172 is turned off during moving image reproduction, the CPU 151 proceeds from step S730 to S731 to end fisheye distortion correction. Furthermore, in step S732, processing is performed to set the fisheye distortion correction button 172 being displayed as the on operator. As a result, the moving image being reproduced is displayed as shown in FIG. 40A, for example.

In step S733, the CPU 151 performs marking processing as a fisheye distortion correction end position.

In a case where it is detected that the blur correction button 173 is turned on during moving image reproduction, the CPU 151 proceeds from step S740 to S741 to check whether or not the fisheye distortion correction is currently being performed. If the fisheye distortion correction is not being performed, the on operation of the blur correction button 173 is invalidated (S741→NO).

If fisheye distortion correction is currently being performed, the CPU 151 proceeds to step S742 to start blur correction. Furthermore, in step S743, processing is performed to set the blur correction button 173 being displayed as the off operator. As a result, the moving image being reproduced is displayed as shown in FIG. 41A, for example.

In step S744, the CPU 151 performs marking processing as a blur correction start position.

Note that, here, the on operation of the blur correction button 173 is invalidated unless the fisheye distortion correction is being performed, but if the on operation of the blur correction button 173 is performed when the fisheye distortion correction is not being performed, the fisheye distortion correction and the blur correction may be started together.

In a case where it is detected that the blur correction button 173 is turned off during moving image reproduction, the CPU 151 proceeds from step S750 to S751 in FIG. 50 to end blur correction. Furthermore, in step S752, processing is performed to set the blur correction button 173 being displayed as the on operator. As a result, the moving image being reproduced is displayed as shown in FIG. 40B, for example.

In step S753, the CPU 151 performs marking processing as a blur correction end position.

In a case where it is detected that the gravity direction correction button 174 is turned on during moving image reproduction, the CPU 151 proceeds from step S760 to S761 to check whether or not the fisheye distortion correction is currently being performed. If the fisheye distortion correction is not being performed, the on operation of the gravity direction correction button 174 is invalidated (S761→NO).

If fisheye distortion correction is currently being performed, the CPU 151 proceeds to step S762 to start gravity direction correction. Furthermore, in step S763, processing is performed to set the gravity direction correction button 174 being displayed as the off operator. As a result, the moving image being reproduced is displayed as shown in FIG. 41B, for example.

Note that, here, the on operation of the gravity direction correction button 174 is invalidated unless the fisheye distortion correction is being performed, but if the on operation of the gravity direction correction button 174 is performed when the fisheye distortion correction is not being performed, the fisheye distortion correction may be started and the gravity direction correction may be turned on.

In a case where it is detected that the gravity direction correction button 174 is turned off during moving image reproduction, the CPU 151 proceeds from step S770 to S771 to turn off the gravity direction correction. Furthermore, in step S772, processing is performed to set the gravity direction correction button 174 being displayed as the on operator. As a result, the moving image being reproduced is displayed as shown in FIGS. 40B and 41A, for example.

In a case where the user's field of view changing operation is detected during moving image reproduction, the CPU 151 proceeds from step S780 to S781 and branches the processing depending on whether or not gravity direction correction is currently on. If the gravity direction correction is off, the process proceeds to step S782, and a pan angle, a tilt angle, and a roll angle according to the operation are generated to rotate the output coordinate plane 210 to change the cutout region 211.

If the gravity direction correction is on, the process proceeds to step S783, and the pan angle, tilt angle, and roll angle according to the operation are restricted by the gravity direction correction, and then the output coordinate plane 210 is rotated to change the cutout region 211. As a result, even if the field of view is changed as described above, the gravity direction does not shift on the display.

In a case where the user's recording operation is detected during a moving image reproduction or reproduction stop, the CPU 151 proceeds from step S790 to the recording process of step S791.

This recording operation is for obtaining an operation of newly recording image data as a moving image of the fisheye image reproduced as described above as image data in a state in which the correction is reflected (moving image content after correction and reflection).

Figure 51:
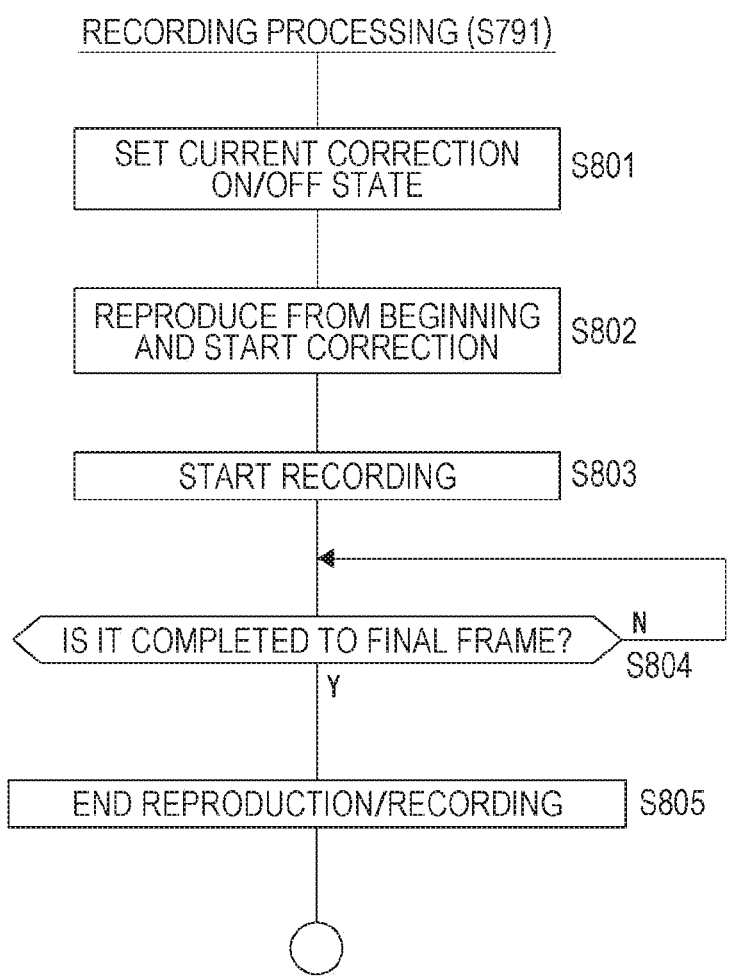
FIG. 51 is a flowchart of recording processing of an embodiment.

An example of the recording processing of step S791 is shown in FIG. 51.

In step S801 in FIG. 51, the CPU 151 sets the current correction on/off state as information for recording processing.

The current correction on/off states are the on/off states of fisheye distortion correction, blur correction, and gravity direction correction at the time of recording operation.

As described above, the user can arbitrarily turn on/off fisheye distortion correction, blur correction, and gravity direction correction while viewing the reproduced moving image. This makes it possible to check the display state to which each correction has been applied. That is, the user can check which correction is desired to be effective for the moving image being viewed.

Therefore, in the present embodiment, for example, in a case where a moving image content to which only fisheye distortion correction has been performed is desired, it is sufficient that the user performs recording operation in a state where only fisheye distortion correction is on at the time of reproduction. Similarly, for example, in a case where the moving image content subjected to fisheye distortion correction and blur correction is desired, it is sufficient that the user performs the recording operation in a state where only fisheye distortion correction and blur correction are on at the time of reproduction.

Note that the current correction on/off state may be selected by the user at the time of the recording operation. For example, a user who thinks that it is effective to perform both fisheye distortion correction and blur correction by reproduction up to that time selects to perform both fisheye distortion correction and blur correction at the time of recording operation. In this case, the CPU 151 sets the current correction on/off state as information for recording processing in step S801 on the basis of the user's operation.

Furthermore, it is also considered that the user selects image data (moving image content) regardless of the previous reproduction and performs a recording operation on the image data. In that case, the correction on/off state at the time of the last reproduction of the image data may be made the current correction on/off state in step S801, or the user can select the correction on/off state together with image data selection.

In step S802, the CPU 151 starts reproduction and correction from the leading frame for the image data to be reproduced up to that time or the image data specified separately during the recording operation. Moreover, in step S803, recording of the frame after correction is started.

That is, for the image data from the original fisheye image 201, moving image content as new image data to which the necessary correction has been performed is created.

Furthermore, since the storage processing is performed while checking the reproduction moving image to be stored, it is possible to prevent the reproduction image in an unintended correction state from being stored.

Note that, the moving image reproduction/correction/recording in steps S802 and S803 may be performed in a similar manner to the normal viewing state reproduction speed (reproduction and recording at 1×speed), but high speed reproduction/recording may be performed so as to be completed in a short time.

The CPU 151 checks in step S804 whether or not the reproduction/recording has reached the last frame, and when it is completed, ends the reproduction/recording in step S805.

Furthermore, only the correction processing and the storage processing may be performed without performing the moving image reproduction. In this case, since the reproduction processing of the moving image is not performed, the processing load of the CPU 151 can be reduced, and efficiency improvement of various correction processing and the storage processing of the reproduction image can be achieved.

As a result, the user can cause the information processing apparatus 150 to reproduce the image data captured by the imaging apparatus 1 as a moving image, and at that time, the use can check the state in which the fisheye distortion correction, the blur correction, and the gravity direction correction are performed, and generate image data in a corrected state by designating an arbitrary correction state.

For example, image data captured in a state of intense motion using the imaging apparatus 1 is a moving image of a fisheye image with a large blur. In a case where this is checked by the reproduced moving image and it is thought that the image subjected to the fisheye distortion correction and the blur correction is preferable, new image data as a moving image with the fisheye distortion correction subjected and the blurring reduced can be acquired by the recording operation.

Figure 52:
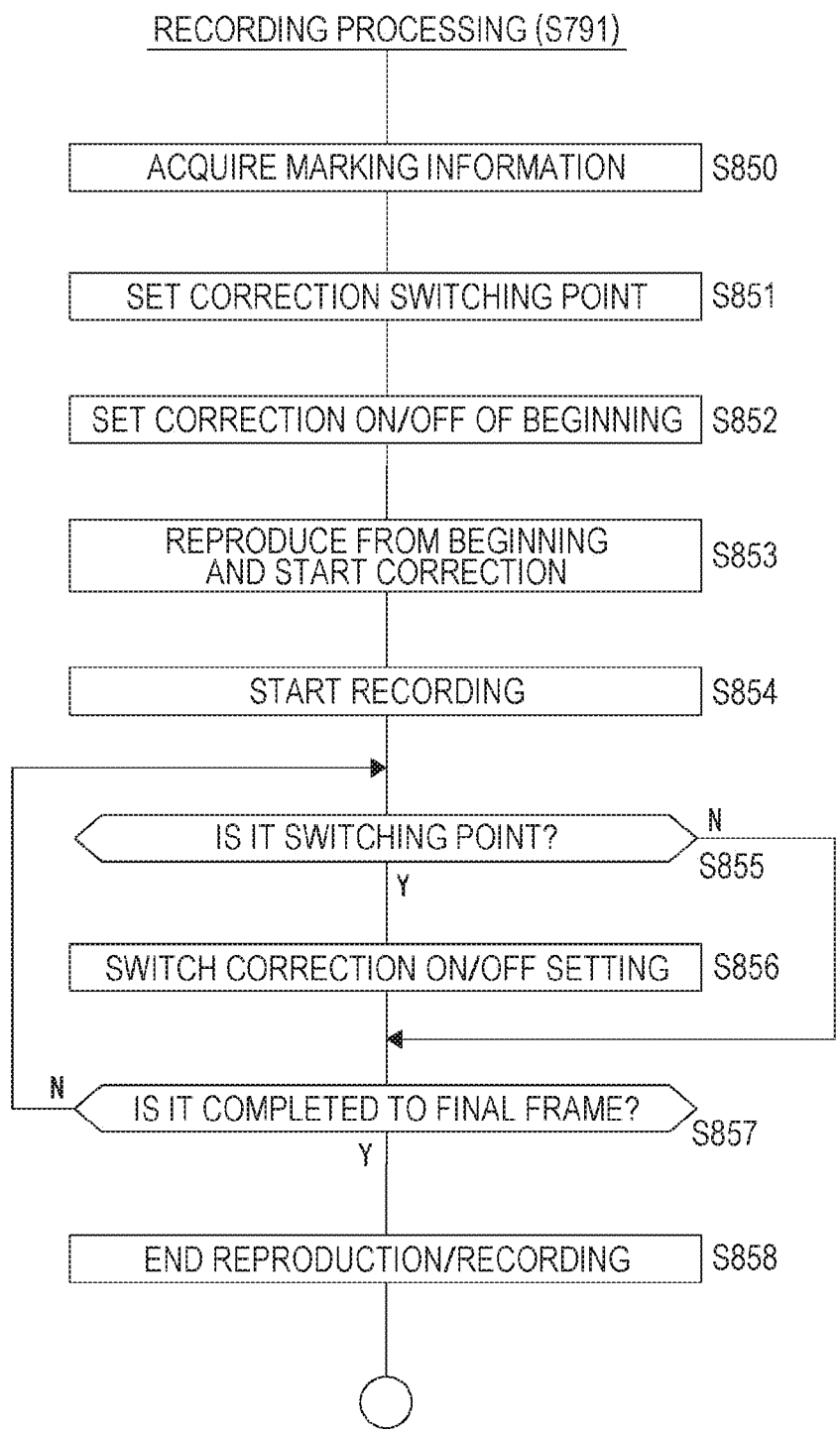
FIG. 52 is a flowchart of another example of the recording processing of an embodiment.

Next, FIG. 52 shows another example of the recording processing of step S791. This is an example of using marking information.

In step S850 in FIG. 52, the CPU 151 acquires marking information regarding the image data of the target. In other words, it is information regarding a frame position at which the user has performed on/off operation for fisheye distortion correction and blur correction during moving image reproduction of the image data.

In step S851, the CPU 151 sets a section for performing fisheye distortion correction and blur correction on target image data on the basis of on the marking information, and sets a frame position as an on/off switching point.

Specifically, the start frame/end frame as the on section of the fisheye distortion correction and the start frame/end frame as the on section of the blur correction are grasped on the basis of the marking information. Then, the frame position at which fisheye distortion correction is turned on and the frame position at which fisheye distortion correction is turned off are set. Furthermore, the frame position at which blur correction is turned on and the frame position at which blur correction is turned off are set. Of course, these switching points may be zero or one or more points in some cases.

In step S852, the CPU 151 performs on/off setting at the beginning of the moving image on the basis of the correction on/off information grasped on the basis of the marking information.

Then, in step S853, the CPU 151 starts reproduction and correction from the leading frame for the image data to be reproduced up to that time or the image data specified separately during the recording operation. Moreover, in step S854, recording of the frame after correction is started. That is, for the image data from the original fisheye image 201, moving image content as new image data to which the necessary correction has been performed is created.

In step S855, the CPU 151 monitors whether or not it is the previously set switching point. When the progress of the reproduction reaches the switching point, the CPU 151 proceeds to step S856 to turn on or off fisheye distortion correction or on or off blur correction according to the switching point.

As a result, the execution state of the fisheye distortion correction or the blur correction is changed before and after the switching point.

The CPU 151 checks in step S857 whether or not the reproduction/recording has reached the last frame, and when it is completed, ends the reproduction/recording in step S858.

Note that, the moving image reproduction/correction/recording in steps S853 and S854 may be performed in a similar manner to the normal viewing state reproduction speed (reproduction and recording at 1×speed), but high speed reproduction/recording may be performed so as to be completed in a short time.

According to the recording processing of FIG. 52, the user causes the information processing apparatus 150 to reproduce the image data captured by the imaging apparatus 1 as a moving image, and at that time, turns on/off fisheye distortion correction and blur correction arbitrarily so that the moving image content in a state in which the correction on/off at the time of reproduction is reflected is generated.

Accordingly, for example, in a case where fisheye distortion correction is turned off in a section of the moving image, even in a case of a moving image to be recorded, a moving image of a fisheye image can be acquired in which no fisheye distortion correction is applied in the section. Furthermore, in a case where fisheye distortion correction and blur correction are turned on only in a certain section, for that section, a moving image of the central projection method can be acquired in which the blur is reduced. As a result, the user can optionally set fisheye distortion correction on/off and blur correction on/off, and create moving image content in which the setting is reflected.

Note that, although marking processing is performed as shown in FIGS. 49 and 50, it is preferable that the marking information be changeable (frame position adjustable) by the operation of the user.

For example, if a section to be subjected to and a section not to be subjected to the fisheye distortion correction and the blur correction are enabled to be adjusted by roughly setting the correction on/off while viewing the reproduced moving image, and adjusting the marking information before recording, it is possible to generate a desired moving image easily.

Note that a section in which gravity direction correction is enabled may be set in the moving image.

For example, by adding section information of gravity direction correction to a moving image to be recorded, it is possible to generate a moving image which prevents the gravity direction from shifting even if the field of view changing operation is performed at the time of the reproduction.

In order to set such a section, for example, when the gravity direction correction is turned on in step S762 of FIG. 50 or when the gravity direction correction is turned off in step S771, the marking processing may be performed.

14. Summary of Information Processing Apparatus

As described above, the information processing apparatus 150 according to the embodiment includes: a distortion correction processing unit 390 that performs distortion correction processing for converting image data as a moving image acquired by capturing an image of a non-central projection method into an image of a central projection method; and a blur correction processing unit 391 that performs blur correction processing of reducing the image blur generated in the image data using posture data of the imaging apparatus 1 for image data that has been subjected to the distortion correction processing.

As a result, it is possible to provide a user with an environment in which a state in which distortion correction and blur correction have been performed can be easily checked when reproducing or editing image data that is a moving image obtained by capturing an image of a non-central projection method. In particular, by performing blur correction on distortion-corrected image data, it is possible to provide a moving image after blur correction in an easily viewable state.

Furthermore, the information processing apparatus 150 of the embodiment includes: the distortion correction processing unit 390, the blur correction processing unit 391, and the reproduction edit control unit 300 that controls performing/stop of the distortion correction processing by the distortion correction processing unit 390 and performing/stop of the blur correction processing by the blur correction processing unit 391.

The image data to be reproduced is an image that covers a scene of a wide field of view range as a moving image of a non-central projection image. In this case, it is possible to provide the user with various and high-quality displays by arbitrarily enabling the fisheye distortion correction and the blur correction.

Then, since it is possible to provide a user with an environment in which a state in which the fisheye distortion correction and the blur correction have been performed can be easily checked when reproducing or editing image data that is a moving image obtained by capturing an image of a non-central projection method, this is preferable for reproduction and editing.

The information processing apparatus 150 according to the embodiment is configured to control on/off of the distortion correction processing and on/off of the blur correction processing when reproducing and displaying image data.

While image data is being reproduced, that is, when moving image reproduction is being performed, distortion correction and blur correction are each performed, or correction processing is stopped.

As a result, the user can view the state in which the fisheye distortion correction is performed and the state in which the fisheye distortion correction is not performed on the reproduced moving image. Furthermore, the user can view the state in which the blur correction is performed and the state in which the blur correction is not performed on the reproduced moving image.

Furthermore, it is possible to check whether or not it is a moving image in which it is appropriate to perform the fisheye distortion correction, and whether or not it is a moving image in which it is appropriate to perform blur correction, at the time of reproduction or editing.

In the embodiment, when reproducing and displaying image data, the fisheye distortion correction button 172 is made operable, and the turning on and off of the fisheye distortion correction processing is controlled according to the operation information.

As a result, the user can optionally activate or stop the fisheye distortion correction in real time while viewing the reproduced image. In particular, the user can test what kind of image the fisheye distortion correction will be for each scene in the moving image.

In the embodiment, when reproducing and displaying image data, the blur correction button 173 is made operable, and the turning on and off of the blur correction processing is controlled according to the operation information.

As a result, the user can optionally activate or stop the blur correction in real time while viewing the reproduced image. In particular, the user can test what kind of image the blur correction will be for each scene in the moving image.

In the embodiment, when reproducing and displaying image data, the fisheye distortion correction button 172 and the blur correction button 173 can be operated independently of each other.

The user can arbitrary activate or stop the fisheye distortion correction and the blur correction in real time while viewing the reproduced image.

In the embodiment, the blur correction processing can be performed while the distortion correction processing is being performed. That is, in a case of outputting a fisheye image on which the fisheye distortion correction processing has not been performed, the blur correction is not functioned.

While blur correction is effective in an image in a fisheye distortion correction state, in a case of a fisheye image not subjected to fisheye distortion correction, the blur correction effect is not accurately recognized by the user. Therefore, the blur correction can be performed only in a case where the fisheye distortion correction has been performed.

Furthermore, as described above, the blur correction is performed by utilizing the rotation processing of the output coordinate plane 210 for fisheye distortion correction, thereby achieving an efficient functional configuration. In this case, it is preferable to perform the blur correction simultaneously with the fisheye distortion correction.

In the embodiment, the information processing apparatus includes a gravity direction correction processing unit 392 that performs gravity direction correction processing for keeping a gravity direction constant in a displayed image when the field of view is changed during the reproduction display of the image data using the posture data of the imaging apparatus corresponding to each frame of the image data, and the reproduction edit control unit 300 controls on/off of the gravity direction correction processing by the gravity direction correction processing unit 392.

In reproduction display of the image data, the field of view can be changed according to the user operation. In this case, if the field of view is changed with the user operation, the gravity direction in the display image may not be coincident with the lower side of the display image. Therefore, the gravity direction is kept constant in the display image. This makes it possible to maintain an easy-to-see state even when the field of view changing operation is performed, realize preferable reproduction display, and make the field of view changing operation also easy to operate.

In the embodiment, when reproducing and displaying image data, the gravity direction correction button 174 is made operable, and the turning on and off of the gravity direction correction processing is controlled according to the operation information.

As a result, the user can arbitrary activate or stop the gravity direction correction while viewing the reproduced image.

In the embodiment, when reproducing and displaying image data, the distortion correction operator, the blur correction operator, and the gravity direction correction operator can be operated independently of one another.

As a result, the user can arbitrary activate or stop the distortion correction, blur correction, and gravity direction correction in real time while viewing the reproduced image.

In the embodiment, the gravity direction correction processing can be performed while the fisheye distortion correction processing is being performed. In a case of outputting an image of the non-central projection method on which the distortion correction processing has not been performed, the gravity direction correction is not functioned.

In a case of a fisheye image that has not been subjected to the fisheye distortion correction, the effect of the gravity direction correction is not accurately recognized by the user. Therefore, the gravity direction correction can be performed only in a case where the fisheye distortion correction has been performed.

Furthermore, the gravity direction correction is performed by adjusting the rotation processing of the output coordinate plane 210 for fisheye distortion correction, thereby achieving an efficient functional configuration. In this case, it is preferable to perform the gravity direction correction simultaneously with the fisheye distortion correction.

In the embodiment, image data subjected to one or both of the distortion correction processing by the distortion correction processing unit 390 and the blur correction processing by the blur correction processing unit 391 is generated for original image data that is a moving image obtained by capturing an image of a non-central projection method, and performs control to record the image data on a recording medium (see FIGS. 51 and 52).

In other words, new image data as a moving image for which one or both of the distortion correction processing and the blur correction processing are performed is generated for the original image data that is a moving image of an image of the non-central projection type, and the image data is recorded. As a result, the user can easily create image data (moving image content) subjected to one or both of the fisheye distortion correction and the blur correction.

In the embodiment, on/off of the distortion correction processing and the blur correction processing at the time of recording is set according to information regarding whether or not the distortion correction processing and the blur correction processing are performed at the time of reproduction display of the original image data (see FIG. 51).

At the time of reproduction of the original image data, each correction is turned on/off by the instruction of the user. Whether or not correction at the time of recording is performed is set according to the user setting at the time of reproduction (whether or not each correction is performed).

As a result, the user can obtain desired image data (moving image content) by determining the correction processing to be employed in the reproduced image and performing the recording operation.

In the embodiment, on/off of the distortion correction processing and the blur correction processing at the time of recording is controlled on the basis of information indicating a section in which the distortion correction processing is performed and a section in which the blur correction processing is performed for the original image data (see FIG. 52).

For example, marking information is added so as to indicate a section in which distortion correction or blur correction is performed at the time of reproduction of the original image data. At the time of recording, on/off control of the correction is performed using this marking information.

Marking information is added when the user arbitrarily turns on/off the fisheye distortion correction and the blur correction during image reproduction. By using this, it is possible to know a section in which the fisheye distortion correction has been performed and a section in which the blur correction has been performed in the moving image. Therefore, as in the example of FIG. 52, on/off of the fisheye distortion correction and the blur correction is switched according to the presence or absence of correction for each section at the time of reproduction. As a result, it is possible to easily generate moving image content that reflects the presence or absence of correction set during reproduction.

The program according to the embodiment of the present invention is a program for causing the CPU 151 of the information processing apparatus 150 to perform a step (S702, S722, S732, S743, or S752) of enabling operation of the fisheye distortion correction operator (fisheye distortion correction button 172) and the blur correction operator (blur correction button 173) during the reproduction of image data that is a moving image acquired by capturing an image of a non-central projection method, a step (S721) of causing reproduction display subjected to the distortion correction processing to be performed in response to performing of operation of a correction performing instruction by the fisheye distortion correction operator during moving image reproduction, and a step (S742) of causing reproduction display subjected to the blur correction processing to be performed in response to performing of operation of a correction performing instruction by the blur correction operator during moving image reproduction.

Specifically, it is a program for causing the CPU 151 to execute the processing of FIG. 49, 50, 51, or 52.

Such a program facilitates the achievement of the information processing apparatus 150 of the present embodiment.

Such a program can be stored in advance in a recording medium incorporated in a device such as a computer device, a ROM in a microcomputer having a CPU, or the like. Alternatively, it can be accommodated (stored) temporarily or permanently in a removable recording medium such as a semiconductor memory, a memory card, an optical disc, a magneto-optical disk, or a magnetic disk. Furthermore, such a removable recording medium can be provided as so-called package software.

Furthermore, such a program can be installed from a removable recording medium to a personal computer or the like, or can also be downloaded from a download site via a network such as a LAN or the Internet.

15. Application Example

The technology according to the present disclosure can be applied to various products. For example, the technology according to the present disclosure may be applied to an operating room system.

Figure 53:
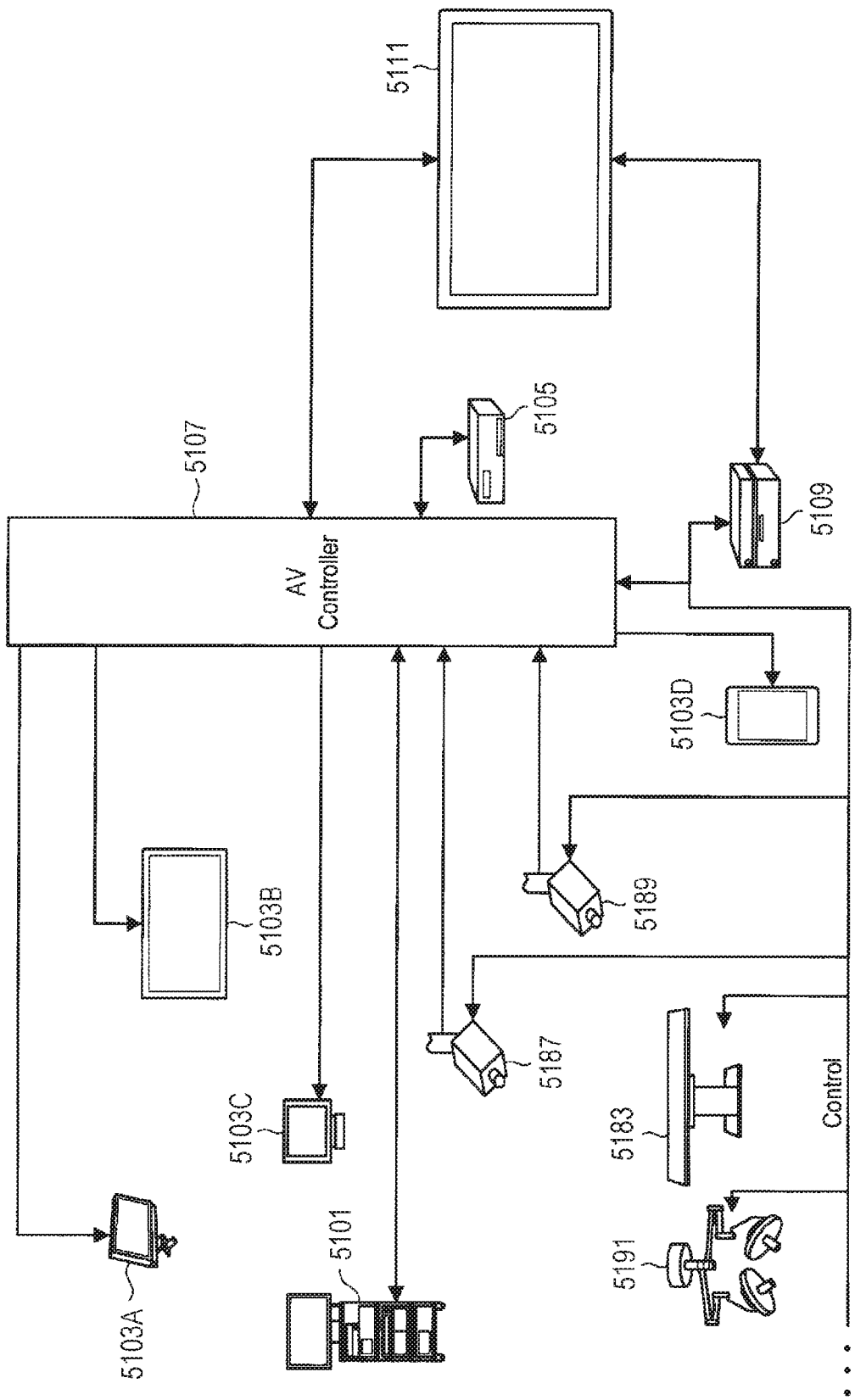
FIG. 53 is a diagram schematically showing an overall configuration of an operating room system.

FIG. 53 is a diagram schematically showing an overall configuration of an operating room system 5100 to which the technology according to the present disclosure can be applied. Referring to FIG. 53, the operating room system 5100 is configured such that devices installed in the operating room are connected to be able to cooperate with each other via an AV controller 5107 and an operating room control device 5109.

Various devices can be installed in the operating room. In FIG. 53, as an example, a device group 5101 of various devices for endoscopic surgery, a ceiling camera 5187 provided on the ceiling of the operating room for imaging the hand of the surgeon, an surgical field camera 5189 provided on the ceiling of the operating room for imaging the situation of the entire operating room, a plurality of display devices 5103A to 5103D, a recorder 5105, a patient bed 5183, and an illumination 5191 are shown.

Here, among these devices, the device group 5101 belongs to an endoscopic surgery system 5113 as described later, and includes an endoscope, a display device that displays an image captured by the endoscope, and the like. Each device belonging to the endoscopic surgery system 5113 is also referred to as a medical device. On the other hand, the display devices 5103A to 5103D, the recorder 5105, the patient bed 5183, and the illumination 5191 are devices provided, for example, in the operating room separately from the endoscopic surgery system 5113. Each device not belonging to the endoscopic surgery system 5113 is also referred to as a non-medical device. The AV controller 5107 and/or the operating room control device 5109 cooperate with each other to control the operation of the medical devices and the non-medical devices.

The AV controller 5107 centrally controls processing relating to image display in the medical devices and non-medical devices. Specifically, among the devices included in the operating room system 5100, the device group 5101, the ceiling camera 5187, and the surgical field camera 5189 may be devices (hereinafter, also referred to as transmission source devices) having a function of transmitting information to be displayed during operation (hereinafter, also referred to as display information). Furthermore, the display devices 5103A to 5103D may be devices to which display information is output (hereinafter, also referred to as output destination devices). Furthermore, the recorder 5105 may be a device corresponding to both the transmission source device and the output destination device. The AV controller 5107 has a function of controlling the operation of the transmission source device and the output destination device, acquiring display information from the transmission source device, transmitting the display information to the output destination device, and causing the displaying or recording of the display information. Note that the display information is various images captured during the operation, various types of information related to the operation (for example, physical information of the patient, information regarding a past examination result, information regarding the operation method, or the like).

Specifically, information about an image of a surgical site in a patient's body cavity, which is captured by the endoscope, may be transmitted from the device group 5101 to the AV controller 5107 as display information. Furthermore, information about the image of the surgeon's hand captured by the ceiling camera 5187 may be transmitted from the ceiling camera 5187 as display information. Furthermore, information about an image indicating the situation of the entire operating room captured by the surgical field camera 5189 may be transmitted from the surgical field camera 5189 as display information. Note that, in a case where there is another device having an imaging function in the operating room system 5100, the AV controller 5107 may acquire information about an image captured by the another device from the another device as display information.

Alternatively, for example, in the recorder 5105, information about these images captured in the past is recorded by the AV controller 5107. The AV controller 5107 can acquire information about an image captured in the past from the recorder 5105 as display information. Note that, in the recorder 5105, various types of information regarding operation may be recorded in advance.

The AV controller 5107 causes at least one of the display devices 5103A to 5103D which are output destination devices to display the acquired display information (in other words, the image taken during the operation and various types of information related to the operation). In the illustrated example, the display device 5103A is a display device suspended from the ceiling of the operating room, the display device 5103B is a display device installed on the wall of the operating room, the display device 5103C is a display device installed on a desk in the operating room, and the display device 5103D is a mobile device (for example, a tablet personal computer (PC)) having a display function.

Furthermore, although not shown in FIG. 53, the operating room system 5100 may include devices outside the operating room. Examples of the devices outside the operating room include a server connected to a network built inside or outside a hospital, a PC used by medical staff, a projector installed in a conference room of a hospital, and the like. In a case where such an external device is outside the hospital, the AV controller 5107 can also cause the display information to be displayed on the display device of another hospital via a video conference system or the like for telemedicine.

The operating room control device 5109 centrally controls the processing other than the processing relating to the image display in the non-medical device. For example, the operating room control device 5109 controls the driving of the patient bed 5183, the ceiling camera 5187, the surgical field camera 5189, and the illumination 5191.

The operating room system 5100 is provided with a centralized operation panel 5111, and the user can give an instruction for image display to the AV controller 5107 through the centralized operation panel 5111, and give an instruction for operation of the non-medical device for the operating room control device 5109. The centralized operation panel 5111 is provided with a touch panel on the display surface of the display device.

Figure 54:
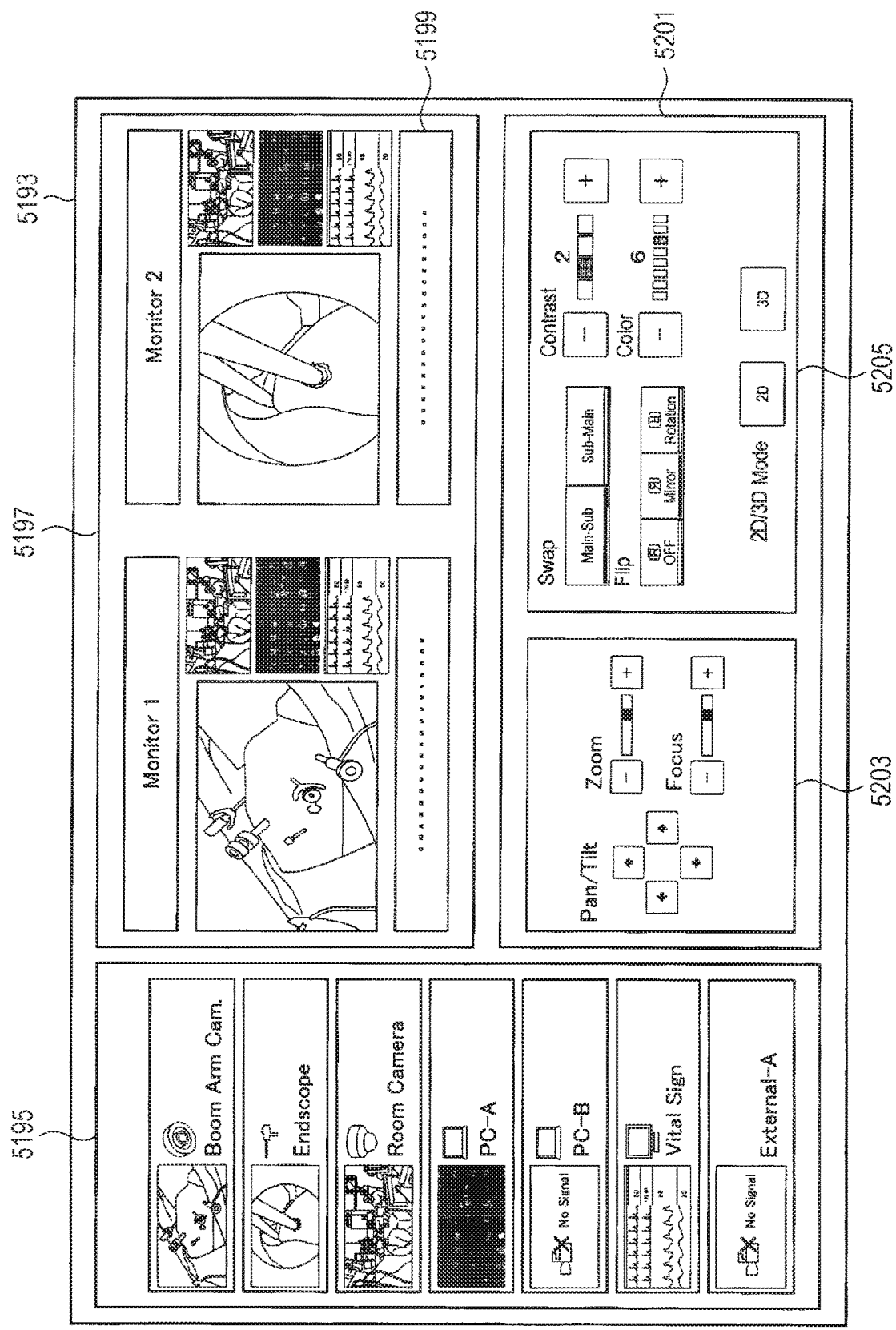
FIG. 54 is a view showing a display example of an operation screen on a centralized operation panel.

FIG. 54 is a view showing a display example of an operation screen on the centralized operation panel 5111. FIG. 54 shows, as an example, an operation screen corresponding to a case where two display devices are provided as an output destination device in the operating room system 5100. Referring to FIG. 54, the operation screen 5193 is provided with a transmission source selection region 5195, a preview region 5197, and a control region 5201.

In the transmission source selection region 5195, a transmission source device provided in the operating room system 5100 and a thumbnail screen representing display information of the transmission source device are displayed in association with each other. The user can select display information to be displayed on the display device from any of the transmission source devices displayed in the transmission source selection region 5195.

In the preview region 5197, a preview of a screen displayed on two display devices (Monitor 1 and Monitor 2) which are output destination devices is displayed. In the illustrated example, four images are displayed in PinP on one display device. The four images correspond to display information transmitted from the transmission source device selected in the transmission source selection region 5195. Of the four images, one is displayed relatively large as a main image, and the remaining three are displayed relatively small as sub-images. The user can replace the main image and the sub-image by appropriately selecting the region in which the four images are displayed. Furthermore, a status display region 5199 is provided below the region where the four images are displayed, and the status regarding the operation (for example, the elapsed time of the operation, the patient's physical information, or the like) may be appropriately displayed in the region.

The control region 5201 is provided with a transmission source operation region 5203 in which a graphical user interface (GUI) component for performing operation on a transmission source device is displayed, and an output destination operation region 5205 in which a GUI component for performing operation on an output destination device is displayed. In the illustrated example, the transmission source operation region 5203 is provided with GUI components for performing various types of operation (pan, tilt, and zoom) on the camera in the transmission source device having an imaging function. The user can operate the operation of the camera in the transmission source device by appropriately selecting these GUI components. Note that, although illustration is omitted, in a case where the transmission source device selected in the transmission source selection region 5195 is a recorder (in other words, in a case where an image recorded in the recorder in the past is displayed in the preview region 5197), the transmission source operation region 5203 may be provided with GUI components for performing operation such as reproduction, stop of reproduction, rewind, fast forward, and the like of the image.

Furthermore, the output destination operation region 5205 is provided with a GUI component for performing various types of operation (swap, flip, color adjustment, contrast adjustment, switching between 2D display and 3D display) on the display in the display device which is the output destination device. The user can operate the display on the display device by appropriately selecting these GUI components.

Note that the operation screen displayed on the centralized operation panel 5111 is not limited to the illustrated example, and the user may be able to perform operation input to each device that may be controlled by the AV controller 5107 and the operating room control device 5109 provided in the operating room system 5100 via the centralized operation panel 5111.

Figure 55:
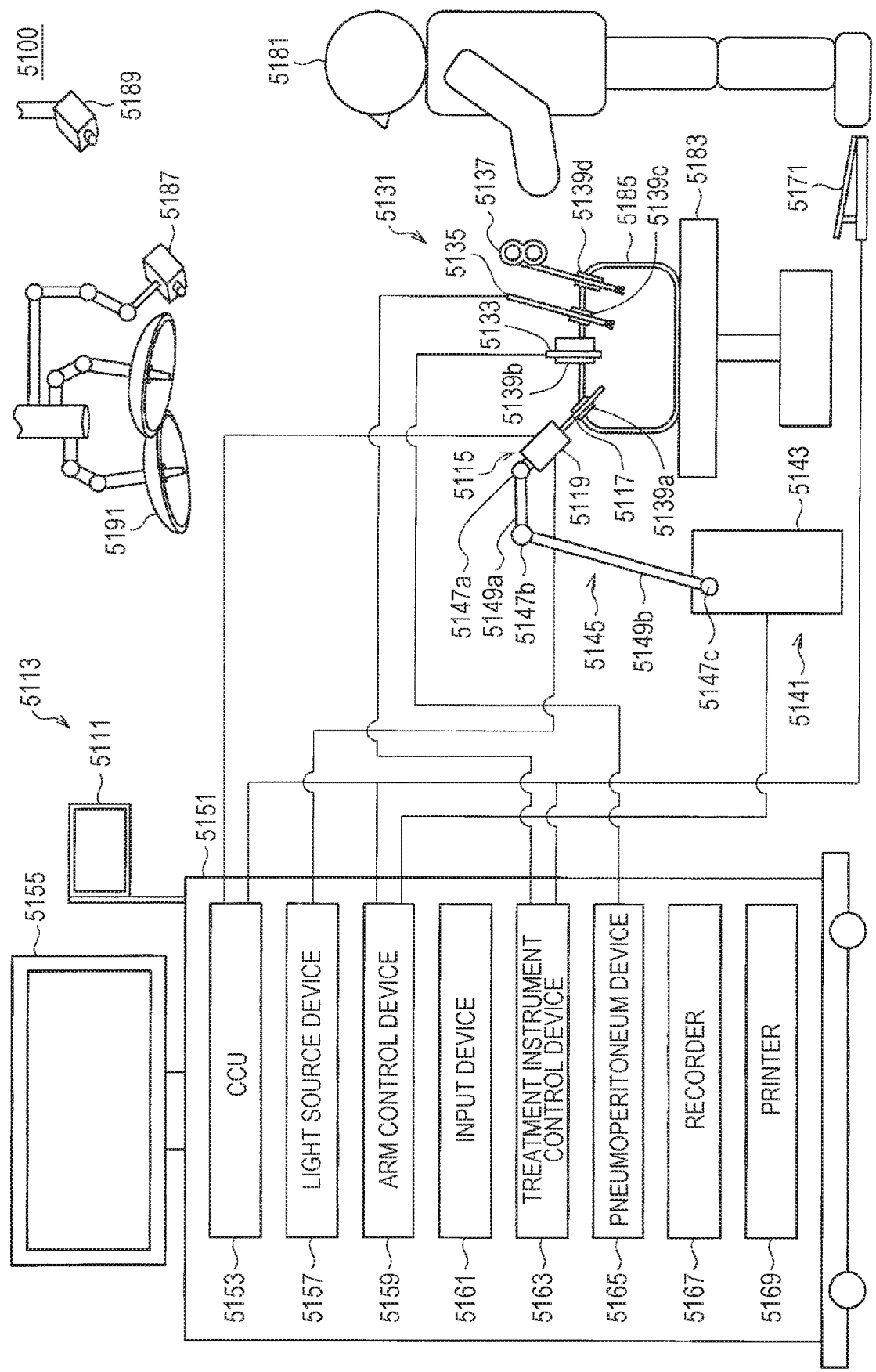
FIG. 55 is a diagram showing an example of a state of surgery to which the operating room system is applied.

FIG. 55 is a diagram showing an example of a state of surgery to which the operating room system is applied described above. The ceiling camera 5187 and the surgical field camera 5189 are provided on the ceiling of the operating room, and can take a picture of the hand of the surgeon (doctor) 5181 who performs treatment on the affected part of the patient 5185 on the patient bed 5183 and the entire operating room. The ceiling camera 5187 and the surgical field camera 5189 may be provided with a magnification adjustment function, a focal length adjustment function, an imaging direction adjustment function, and the like. The illumination 5191 is provided on the ceiling of the operating room and illuminates at least the hand of the surgeon 5181. The illumination 5191 may be capable of appropriately adjusting the irradiation light amount, the wavelength (color) of the irradiation light, the irradiation direction of the light, and the like.

As shown in FIG. 53, the endoscopic surgery system 5113, the patient bed 5183, the ceiling camera 5187, the surgical field camera 5189, and the illumination 5191 are connected via the AV controller 5107 and the operating room control device 5109 (not shown in FIG. 55) so as to cooperate with each other. The centralized operation panel 5111 is provided in the operating room, and as described above, the user can appropriately operate these devices present in the operating room via the centralized operation panel 5111.

Hereinafter, the configuration of the endoscopic surgery system 5113 will be described in detail. As shown in the drawing, the endoscopic surgery system 5113 includes an endoscope 5115, other surgical tools 5131, a support arm device 5141 that supports the endoscope 5115, and a cart 5151 on which various devices for endoscopic surgery are mounted.

In endoscopic surgery, instead of cutting and opening the abdominal wall, a plurality of cylindrical opening tools called trocars 5139a to 5139d is punctured in the abdominal wall. Then, a barrel 5117 of the endoscope 5115 and other surgical tools 5131 are inserted into the body cavity of the patient 5185 from the trocars 5139a to 5139d. In the illustrated example, an insufflation tube 5133, an energy treatment instrument 5135, and a forceps 5137 are inserted into the body cavity of the patient 5185 as the other surgical tools 5131. Furthermore, the energy treatment instrument 5135 is a treatment tool that performs incision and peeling of tissue, sealing of a blood vessel, and the like by high-frequency current or ultrasonic vibration. However, the illustrated surgical tool 5131 is merely an example, and various surgical tools generally used in endoscopic surgery, such as forceps and retractors, may be used as the surgical tool 5131, for example.

An image of the surgical site in the body cavity of the patient 5185 taken by the endoscope 5115 is displayed on the display device 5155. The surgeon 5181 performs a treatment such as excision of the affected part using the energy treatment instrument 5135 and the forceps 5137 while viewing the image of the surgical site displayed on the display device 5155 in real time. Note that, although illustration is omitted, the insufflation tube 5133, the energy treatment instrument 5135, and the forceps 5137 are supported by the surgeon 5181, an assistant, or the like during the operation.

(Support Arm Device) The support arm device 5141 includes an arm 5145 extending from a base 5143. In the illustrated example, the arm 5145 includes joints 5147a, 5147b, and 5147c, and links 5149a and 5149b, and is driven by control from an arm control device 5159. The endoscope 5115 is supported by the arm 5145, and its position and posture are controlled. As a result, stable position fixation of the endoscope 5115 can be achieved.

(Endoscope)

The endoscope 5115 includes a lens barrel 5117 in which a region of a predetermined length from the distal end is inserted into the body cavity of the patient 5185, and a camera head 5119 connected to the proximal end of the lens barrel 5117. In the illustrated example, the endoscope 5115 formed as a so-called rigid mirror having a rigid lens barrel 5117 is illustrated. However, the endoscope 5115 may be formed as a so-called flexible mirror having a flexible lens barrel 5117.

At the tip of the lens barrel 5117, an opening portion into which an objective lens is fitted is provided. The light source device 5157 is connected to the endoscope 5115 and light generated by the light source device 5157 is guided to the distal end of the lens barrel by a light guide extending inside the lens barrel 5117, and is emitted toward the observation target in the body cavity of the patient 5185 via the objective lens. Note that the endoscope 5115 may be a direct view mirror, a perspective mirror, or a side view mirror.

An optical system and an imaging element are provided inside the camera head 5119, and reflected light (observation light) from the observation target is collected to the imaging element by the optical system. The observation light is photoelectrically converted by the imaging element, and an electric signal corresponding to the observation light, that is, an image signal corresponding to the observation image is generated. The image signal is transmitted as RAW data to a camera control unit (CCU) 5153. Note that the camera head 5119 has a function of adjusting the magnification and the focal length by appropriately driving the optical system.

Note that, for example, in order to cope with stereoscopic vision (3D display) or the like, a plurality of imaging elements may be provided in the camera head 5119. In this case, a plurality of relay optical systems is provided inside the lens barrel 5117 in order to guide observation light to each of the plurality of imaging elements.

(Various Devices Installed in Cart) The CCU 5153 includes a central processing unit (CPU) or graphics processing unit (GPU), or the like, and centrally controls operation of the endoscope 5115 and the display device 5155. Specifically, the CCU 5153 performs various image processing for display of the image based on the image signal, such as, development processing (demosaic processing), for example, for the image signal received from the camera head 5119. The CCU 5153 provides the display device 5155 with the image signal subjected to the image processing. Furthermore, the AV controller 5107 shown in FIG. 53 is connected to the CCU 5153. The CCU 5153 also provides the image signal subjected to the image processing to the AV controller 5107. Furthermore, the CCU 5153 transmits a control signal to the camera head 5119 to control the driving thereof. The control signal may include information associated with imaging conditions such as magnification and focal length. The information associated with the imaging conditions may be input through the input device 5161 or may be input through the above-described centralized operation panel 5111.

The display device 5155 displays the image based on the image signal subjected to image processing by the CCU 5153 under the control of the CCU 5153. For example, in a case where the endoscope 5115 corresponds to high-resolution photographing such as 4K (3840 horizontal pixels×2160 vertical pixels) or 8K (7680 horizontal pixels×4320 vertical pixels), and/or 3D display, a device capable of high-resolution display and/or a device capable of 3D display corresponding to each may be used as the display device 5155. In a case of corresponding to high-resolution photographing such as 4K or 8K, by using the display device 5155 having a size of 55 inches or more, a further immersive feeling can be obtained. Furthermore, a plurality of display devices 5155 having different resolutions and sizes may be provided depending on the application.

The light source device 5157 includes a light source such as a light emitting diode (LED), for example, and supplies irradiation light to the endoscope 5115 in photographing a surgical site or the like.

The arm control device 5159 includes a processor such as a CPU, for example, and operates in accordance with a predetermined program to control the driving of the arm 5145 of the support arm device 5141 according to a predetermined control method.

The input device 5161 is an input interface to the endoscopic surgery system 5113. The user can input various information and input instructions to the endoscopic surgery system 5113 via the input device 5161. For example, the user inputs, via the input device 5161, various types of information related to surgery, such as physical information of a patient and information regarding a surgery procedure. Furthermore, for example, the user inputs an instruction to drive the arm 5145, an instruction to change the imaging conditions (type of irradiated light, magnification, focal length, or the like) by the endoscope 5115, an instruction to drive the energy treatment instrument 5135, or the like via the input device 5161.

The type of the input device 5161 is not limited, and the input device 5161 may be various known input devices. For example, a mouse, a keyboard, a touch panel, a switch, a foot switch 5171, a lever, and/or the like may be applied as the input device 5161. In a case where a touch panel is used as the input device 5161, the touch panel may be provided on the display surface of the display device 5155.

Alternatively, the input device 5161 is a device mounted by the user, such as a glasses-type wearable device or a head mounted display (HMD), for example, and various types of input are performed according to the user's gesture or line of sight detected by these devices. Furthermore, the input device 5161 includes a camera capable of detecting the motion of the user, and various types of input are performed according to the user's gesture and line of sight detected from the video captured by the camera. Moreover, the input device 5161 includes a microphone capable of picking up the user's voice, and various types of input are performed by audio via the microphone. In this manner, with the configuration of the input device 5161 in which various types of information can be input in a non-contact manner, the user (for example, the surgeon 5181) belonging to the clean area can operate the device belonging to the unclean area in a non-contact manner. Furthermore, since the user can operate the device without releasing his/her hand from the operating tool, the convenience of the user is improved.

The treatment instrument control device 5163 controls driving of the energy treatment instrument 5135 for cauterizing tissue, cutting incisions, sealing blood vessels, or the like. The pneumoperitoneum device 5165 feeds gas into the body cavity of the patient 5185 via the insufflation tube 5133 to inflate the body cavity for the purpose of securing a field of view by the endoscope 5115 and securing a working space of the surgeon. The recorder 5167 is a device capable of recording various kinds of information associated with surgery. The printer 5169 is a device capable of printing various kinds of information associated with surgery in various formats such as text, image, and graph.

The particularly characteristic features of the endoscopic surgery system 5113 will be described in more detail below.

(Support Arm Device) The support arm device 5141 includes a base 5143 which is a base table and an arm 5145 extending from the base 5143. In the illustrated example, the arm 5145 includes a plurality of joints 5147*a*, 5147*b*, and 5147*c*, and a plurality of links 5149*a* and 5149*b* coupled by the joint 5147*b*. However, in FIG. 55, for simplification, the configuration of the arm 5145 is shown in a simplified manner. In practice, the shape, number and arrangement of the joints 5147*a* to 5147*c* and the links 5149*a* and 5149*b*, the direction of the rotation axis of the joints 5147*a* to 5147*c*, and the like may be appropriately set so that the arm 5145 has a desired degree of freedom. For example, the arm 5145 may be preferably configured to have six or more degrees of freedom. As a result, the endoscope 5115 can be freely moved within the movable range of the arm 5145, so that the lens barrel 5117 of the endoscope 5115 can be inserted into the body cavity of the patient 5185 from a desired direction.

The joints 5147*a* to 5147*c* are provided with an actuator, and the joints 5147*a* to 5147*c* are configured to be rotatable around a predetermined rotation axis by driving the actuators. The driving of the actuator is controlled by the arm control device 5159 to control the rotation angles of the joints 5147*a* to 5147*c*, and control the driving of the arm 5145. As a result, control of the position and posture of the endoscope 5115 can be achieved. At this time, the arm control device 5159 can control the driving of the arm 5145 by various known control methods such as force control or position control.

For example, when the surgeon 5181 appropriately inputs operation via the input device 5161 (including the foot switch 5171), the driving of the arm 5145 may be appropriately controlled by the arm control device 5159 according to the operation input, and the position and posture of the endoscope 5115 may be controlled. According to the control, after the endoscope 5115 at the tip of the arm 5145 is moved from an arbitrary position to an arbitrary position, the endoscope 5115 can be fixedly supported at the position after the movement. Note that the arm 5145 may be operated by a so-called master slave method. In this case, the arm 5145 can be remotely controlled by the user via the input device 5161 installed at a location distant from the operating room.

Furthermore, in a case where force control is applied, the arm control device 5159 may perform so-called power assist control for driving actuator of each of joints 5147a to 5147c so that the external force from the user is received and the arm 5145 moves smoothly following the external force. As a result, when the user moves the arm 5145 while directly touching the arm 5145, the arm 5145 can be moved with a relatively light force. Accordingly, it is possible to move the endoscope 5115 more intuitively and with a simpler operation, and the convenience of the user can be improved.

Here, in general, in endoscopic surgery, the endoscope 5115 is supported by a doctor called scopist. On the other hand, by using the support arm device 5141, the position of the endoscope 5115 can be more reliably fixed without manual operation, so that it is possible to stably acquire an image of the surgical site, and the operation can be performed smoothly.

Note that the arm control device 5159 may not necessarily be provided in the cart 5151. Furthermore, the arm control device 5159 may not necessarily be one device. For example, the arm control device 5159 may be provided at each of the joints 5147a to 5147c of the arm 5145 of the support arm device 5141, and the plurality of the arm control devices 5159 may cooperate with each another to control the driving of the arm 5145.

(Light Source Device)

The light source device 5157 supplies the endoscope 5115 with illumination light for photographing the surgical site. The light source device 5157 includes, for example, a white light source including an LED, a laser light source, or a combination thereof. At this time, in a case where the white light source is configured by the combination of the RGB laser light sources, since the output intensity and the output timing of each color (each wavelength) can be controlled with high accuracy, adjustment of the white balance of the captured image by the light source device 5157 can be performed. Furthermore, in this case, the laser light from each of the RGB laser light sources is emitted to the observation target in time division and driving of the imaging element of the camera head 5119 is controlled in synchronization with the emission timing, so that it is possible to image images corresponding to each of RGB in time division. According to this method, a color image can be obtained without providing a color filter in the imaging element.

Furthermore, the light source device 5157 may be controlled to change the intensity of light to be output at predetermined time intervals. The driving of the imaging element of the camera head 5119 is controlled in synchronization with the timing of the change of the intensity of the light, images are obtained in time division, and the images are combined, so that it is possible to generate a high dynamic image in which so-called halation and black defects do not exist.

Furthermore, the light source device 5157 may be configured to be capable of supplying light of a predetermined wavelength band corresponding to special light observation. In the special light observation, for example, the wavelength dependence of light absorption in the body tissue is utilized, and narrow band light compared with irradiation light at the time of ordinary observation (in other words, white light) is emitted, so that photographing a predetermined tissue such as a blood vessel in the mucosal surface layer with high contrast, so-called narrow-band light observation (narrow band imaging), is performed. Alternatively, in the special light observation, fluorescence observation for obtaining an image by fluorescence generated by emitting excitation light may be performed. In the fluorescence observation, it is possible to irradiate a body tissue with excitation light to observe the fluorescence from the body tissue (autofluorescence observation), or to inject a reagent such as indocyanine green (ICG) to the body tissue and irradiate the body tissue with excitation light corresponding to the fluorescence wavelength of the reagent to obtain a fluorescent image, for example. The light source device 5157 can be configured to be able to supply narrow-band light and/or excitation light corresponding to such special light observation.

(Camera Head and CCU)

Figure 56:
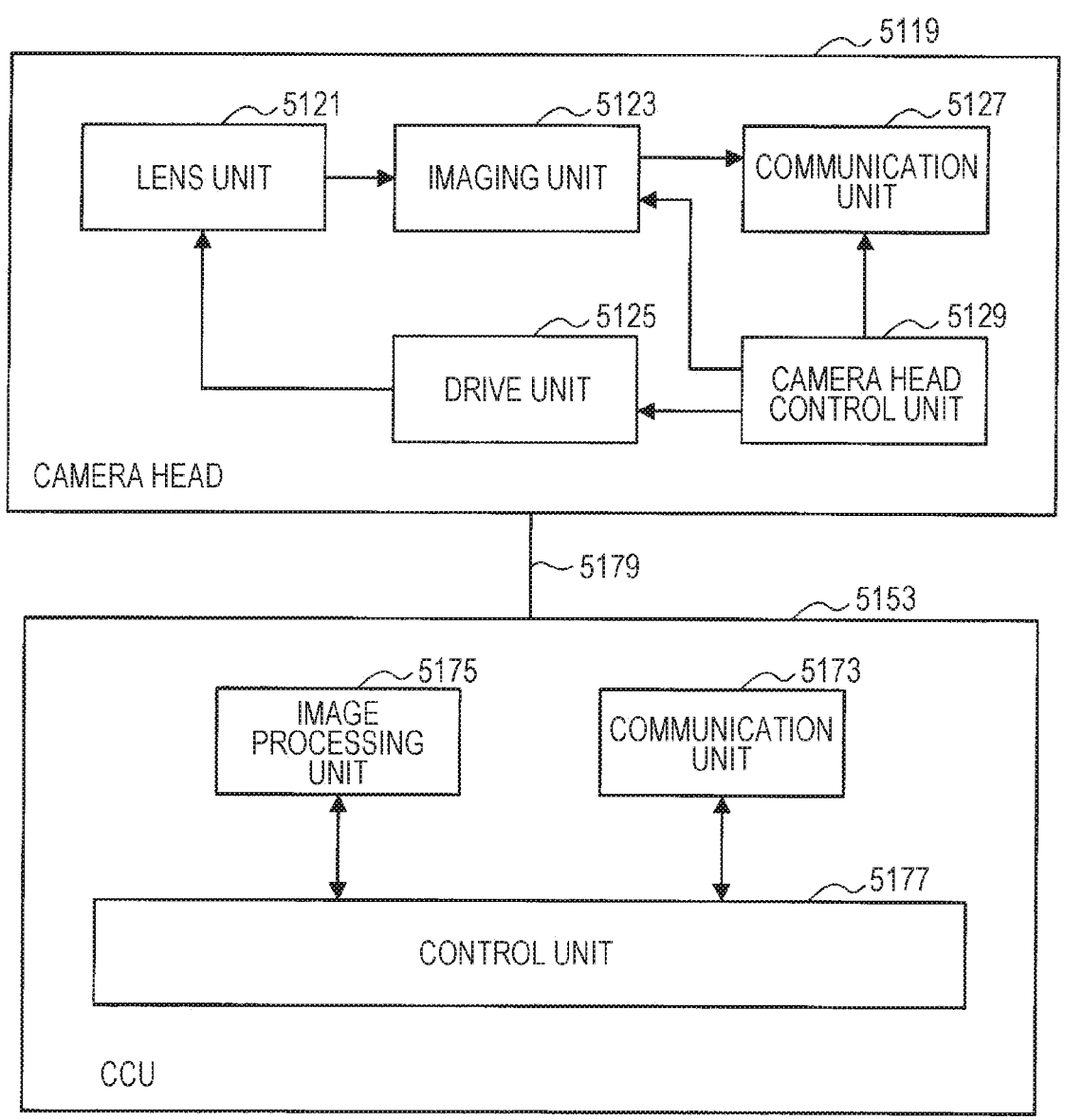
FIG. 56 is a block diagram showing an example of a functional configuration of a camera head and a CCU shown in FIG. 55.

The functions of the camera head 5119 and the CCU 5153 of the endoscope 5115 will be described in more detail with reference to FIG. 56. FIG. 56 is a block diagram showing an example of a functional configuration of the camera head 5119 and the CCU 5153 shown in FIG. 55.

Referring to FIG. 56, the camera head 5119 has a lens unit 5121, an imaging unit 5123, a drive unit 5125, a communication unit 5127, and a camera head control unit 5129 as its functions. Furthermore, the CCU 5153 also has a communication unit 5173, an image processing unit 5175, and a control unit 5177 as its functions. The camera head 5119 and the CCU 5153 are bidirectionally communicably connected to each other by a transmission cable 5179.

First, the functional configuration of the camera head 5119 will be described. The lens unit 5121 is an optical system provided at a connecting portion with the lens barrel 5117. The observation light taken in from the distal end of the lens barrel 5117 is guided to the camera head 5119 and is incident on the lens unit 5121. The lens unit 5121 is configured by combining a plurality of lenses including a zoom lens and a focus lens. The optical characteristic of the lens unit 5121 is adjusted so as to condense the observation light on the light receiving surface of the imaging element of the imaging unit 5123. Furthermore, the zoom lens and the focus lens are configured such that the position on the optical axis J can be moved in order to adjust the magnification and the focus of the captured image.

The imaging unit 5123 includes an imaging element, and is arranged in the subsequent stage of the lens unit 5121. The observation light which has passed through the lens unit 5121 is condensed on the light receiving surface of the imaging element, and an image signal corresponding to the observation image is generated by photoelectric conversion. The image signal generated by the imaging unit 5123 is provided to the communication unit 5127.

As an imaging element included in the imaging unit 5123, for example, an image sensor of a complementary metal oxide semiconductor (CMOS) type having Bayer arrangement and capable of color photographing is used. Note that, as the imaging element, for example, an imaging element capable of corresponding to photographing of the high resolution image of 4K or more may be used. By acquiring a high resolution image of the surgical site, the surgeon 5181 can grasp the situation of the surgical site in more detail, and can proceed the surgery more smoothly.

Furthermore, the imaging element included in the imaging unit 5123 has a pair of imaging elements for acquiring right-eye and left-eye image signals corresponding to 3 dimensional (3D) display, respectively. By the 3D display, the surgeon 5181 can grasp the depth of a living tissue in the surgical site more accurately. Note that, in a case where the imaging unit 5123 is formed in a multiple plate type, a plurality of lens units 5121 can be provided corresponding to each imaging element.

Furthermore, the imaging unit 5123 is not necessarily provided in the camera head 5119. For example, the imaging unit 5123 may be provided inside the lens barrel 5117 immediately after the objective lens.

The drive unit 5125 includes an actuator and moves the zoom lens and the focus lens of the lens unit 5121 by a predetermined distance along the optical axis J under the control of the camera head control unit 5129. As a result, the magnification and the focus of the captured image by the imaging unit 5123 can be appropriately adjusted.

The communication unit 5127 includes a communication device for transmitting and receiving various kinds of information to and from the CCU 5153. The communication unit 5127 transmits the image signal acquired from the imaging unit 5123 as RAW data to the CCU 5153 via the transmission cable 5179. At this time, it is preferable that the image signal be transmitted by optical communication in order to display the captured image of the surgical site with low latency. This is because, during the operation, the surgeon 5181 performs the operation while observing the condition of the affected part by the captured image, and for safer and more reliable operation, it is required that the moving image of the surgical site is displayed in real time as much as possible. In a case where optical communication is performed, the communication unit 5127 is provided with a photoelectric conversion module which converts an electrical signal into an optical signal. The image signal is converted into an optical signal by the photoelectric conversion module, and then transmitted to the CCU 5153 via the transmission cable 5179.

Furthermore, the communication unit 5127 receives a control signal for controlling driving of the camera head 5119 from the CCU 5153. The control signal may include, for example, information associated with imaging conditions such as information that a frame rate of the imaging image is designated, information that an exposure value at the time of imaging is designated, and/or information that the magnification and focus of the captured image is designated. The communication unit 5127 provides the received control signal to the camera head control unit 5129. Note that the control signal from the CCU 5153 may also be transmitted by optical communication. In this case, the communication unit 5127 is provided with a photoelectric conversion module that converts an optical signal into an electric signal, and the control signal is converted into an electric signal by the photoelectric conversion module and is then provided to the camera head control unit 5129.

Note that imaging conditions such as the frame rate, the exposure value, the magnification, and the focus described above are automatically set by the control unit 5177 of the CCU 5153 on the basis of the acquired image signal. That is, the so-called auto exposure (AE) function, the auto focus (AF) function, and the auto white balance (AWB) function are installed in the endoscope 5115.

The camera head control unit 5129 controls driving of the camera head 5119 on the basis of the control signal from the CCU 5153 received via the communication unit 5127. For example, the camera head control unit 5129 controls driving of the imaging element of the imaging unit 5123 on the basis of the information to designate the frame rate of the captured image and/or the information to designate the exposure at the time of imaging. Furthermore, for example, the camera head control unit 5129 appropriately moves the zoom lens and the focus lens of the lens unit 5121 via the drive unit 5125 on the basis of the information to designate the magnification and the focus of the captured image. The camera head control unit 5129 may further have a function of storing information for identifying the lens barrel 5117 and the camera head 5119.

Note that, by arranging the configuration such as the lens unit 5121, the imaging unit 5123, or the like in a sealed structure having high airtightness and waterproofness, the camera head 5119 can have resistance to autoclave sterilization.

Next, the functional configuration of the CCU 5153 will be described. The communication unit 5173 includes a communication device for transmitting and receiving various kinds of information to and from the camera head 5119. The communication unit 5173 receives an image signal transmitted from the camera head 5119 via the transmission cable 5179. At this time, as described above, the image signal can be preferably transmitted by optical communication. In this case, in accordance with the optical communication, the communication unit 5173 is provided with a photoelectric conversion module which converts an optical signal into an electrical signal. The communication unit 5173 provides the image processing unit 5175 with the image signal converted into the electrical signal.

Furthermore, the communication unit 5173 transmits a control signal for controlling driving of the camera head 5119 to the camera head 5119. The control signal may also be transmitted by optical communication.

The image processing unit 5175 performs various image processing on the image signal which is RAW data transmitted from the camera head 5119. Examples of the image processing include various known signal processing such as development processing, high image quality processing (band enhancement processing, super-resolution processing, noise reduction (NR) processing, and/or camera blur correction processing, for example), and/or enlargement processing (electronic zoom processing). Furthermore, the image processing unit 5175 also performs detection processing on the image signal to perform AE, AF, and AWB.

The image processing unit 5175 includes a processor such as a CPU or a GPU, and may perform the image processing and the detection processing described above by the processor operating according to a predetermined program. Note that, in a case where the image processing unit 5175 includes a plurality of GPUs, the image processing unit 5175 appropriately divides the information related to the image signal, and performs image processing in parallel by the plurality of GPUs.

The control unit 5177 performs various types of control regarding imaging of the surgical site by the endoscope 5115 and display of the captured image. For example, the control unit 5177 generates a control signal for controlling driving of the camera head 5119. At this time, in a case where the imaging condition is input by the user, the control unit 5177 generates a control signal on the basis of the input by the user. Alternatively, in a case where the endoscope 5115 is equipped with the AE function, the AF function, and the AWB function, the control unit 5177 calculates the optimum exposure value, focal length, and the white balance appropriately according to the result of the detection processing by the image processing unit 5175, to generate a control signal.

Furthermore, the control unit 5177 causes the display device 5155 to display the captured image including a surgical site or the like on the basis of the image signal subjected to the image processing by the image processing unit 5175. In this case, the control unit 5177 recognizes various objects in the surgical site image using various image recognition techniques. For example, the control unit 5177 can recognize a surgical tool such as a forceps, a specific body part, bleeding, a mist at the time of using the energy treatment instrument 5135, or the like by detecting the shape, color, or the like of the edge of the object included in the surgical site image. When causing the display device 5155 to display the surgical site image, the control unit 5177 causes various surgical operation support information to be superimposed and displayed on the image of the surgical site using the recognition result. The surgical operation support information is superimposed and displayed, and presented to the surgeon 5181, so that the operation can be safely and reliably proceeded.

The transmission cable 5179 connecting the camera head 5119 and the CCU 5153 is an electric signal cable corresponding to communication of electric signals, an optical fiber corresponding to optical communication, or a composite cable thereof.

Here, in the example shown in the drawing, communication is performed by wire using the transmission cable 5179. However, communication between the camera head 5119 and the CCU 5153 may be performed wirelessly. In a case where the communication between the two is performed wirelessly, it is not necessary to lay the transmission cable 5179 in the operating room, so that a situation can be solved where the movement of the medical staff in the operating room is disturbed by the transmission cable 5179.

An example of the operating room system 5100 to which the technology according to the present disclosure can be applied has been described above. Note that, although the case where the medical system to which the operating room system 5100 is applied is the endoscopic surgery system 5113 is described here as an example, the configuration of the operating room system 5100 is not limited to this example. For example, the operating room system 5100 may be applied to a flexible endoscopic system for examination or a microsurgery system instead of the endoscopic surgery system 5113.

Of the configurations described above, the technology related to the imaging apparatus 1 of the present disclosure is assumed to be used in place of or together with the ceiling camera 5187 and the surgical field camera 5189. Specifically, the surgeon or the assistant can wear the imaging apparatus 1 and record the operation situation as a moving image. Furthermore, by applying the fisheye distortion correction and the blur correction to the captured image data, a system can be provided which presents the operation situation in an easy-to-see manner.

Note that the effects described in the present specification are merely examples and are not intended to be limiting, and other effects may be provided.

16. Present Technology

The present technology can adopt the following configuration.

(1) An imaging apparatus including:
an imaging unit that generates image data; a posture data generation unit that generates posture data;
a notification unit that performs notification for correlating the image data and the posture data on the basis of a trigger; and
a detector that detects notification by the notification unit.

(2) The imaging apparatus according to (1) described above,
in which the notification unit performs notification so that notification information is included in the captured image data.

(3) The imaging apparatus according to (1) or (2) described above,
in which the notification unit is a light emitting unit, and the detector is the imaging unit.

(4) The imaging apparatus according to (3) described above,
in which a light emission period of the light emitting unit is a time within one frame period.

(5) The imaging apparatus according to any of (1) to (4) described above,
in which the posture data generation unit performs posture data generation once per frame on the basis of a frame synchronization signal asynchronous with the imaging unit.

(6) The imaging apparatus according to any of (1) to (4) described above,
in which the posture data generation unit performs posture data generation once or a plurality of times per frame on the basis of a frame synchronization signal common with the imaging unit.

(7) The imaging apparatus according to any of (3) to (6) described above,
in which the light emitting unit is provided so as to expose only an imaging element which is out of the incident range of the subject light by the optical system in the imaging unit.

(8) The imaging apparatus according to any of (1), (2), (3), (4), and (7) described above,
in which the posture data generation unit generates posture data a plurality of times per frame period of the image data generated by the imaging unit.

(9) The imaging apparatus according to (8) described above,
in which, in the imaging unit, in a case of performing image data generation as an intermittent frame moving image,
the posture data generation unit sets the number of times of generation of posture data in one frame period smaller in the ineffective frame period than the number of times in the effective frame period.

(10) The imaging apparatus according to any of (1), (2), (3), (4), and (7) described above,
in which, in the imaging unit, in a case of performing image data generation as an intermittent frame moving image,
the posture data generation unit performs posture data generation in both the effective frame period and the ineffective frame period.

(11) The imaging apparatus according to any of (1) to (10) described above,
in which the posture data generation unit adds information based on a frame synchronization signal to posture data.

(12) The imaging apparatus according to any of (1) to (11) described above,
in which the posture data generation unit generates posture data based on detection information of a gyro sensor.

(13) The imaging apparatus according to any of (1) to (12) described above,
in which the posture data generation unit generates posture data based on detection information of an acceleration sensor.

(14) The imaging apparatus according to any of (1) to (13) described above, in which the trigger is a trigger based on detection of user operation.

(15) The imaging apparatus according to any of (1) to (14) described above,
in which generation of image data stored as a moving image by the imaging unit and generation of posture data corresponding to image data stored as a moving image by the posture data generation unit are started by a common trigger.

(16) The imaging apparatus according to any of (1) to (15) described above,
in which generation of image data stored as a moving image by the imaging unit and generation of posture data corresponding to image data stored as a moving image by the posture data generation unit are started by different triggers.

(17) The imaging apparatus according to any of (1) to (16) described above,
in which electronic shutter speed control for controlling an exposure time is performed as exposure adjustment, and
an adjustment range of the exposure time of the electronic shutter speed control is switched between a first range and a second range in which the longest exposure time is set to shorter than that in the first range, on the basis of the detection information of a gyro sensor or an acceleration sensor.

(18) The imaging apparatus according to (17) described above,
in which gain adjustment of an imaging signal is further performed in the imaging unit as the exposure adjustment, and
in a case where the exposure time is switched to the second range, the gain maximum value in the gain adjustment is made higher than the gain maximum value in a case of the first range.

(19) An imaging method of an imaging apparatus including
an imaging unit that captures an image by an optical system to generate image data, and
a posture data generation unit that generates posture data of a casing including the imaging unit at a timing corresponding to the image data,
the imaging method including
a notification procedure for performing notification for correlating the image data with the posture data on the basis of a trigger, and
a detection procedure for detecting the notification by the notification procedure.

REFERENCE SIGNS LIST

1 Imaging apparatus
2 Casing
3 Optical system
4 Strap
5 Front surface portion
6 Rear surface portion
7 Side surface portion
8 Upper surface portion
9 Lower surface portion
10 Moving image button
11 Time lapse button
12 Function button
13 Attachment part
14 Notifying unit
20 Vibration unit
23 Male connector
25 Female connector
30 Magnet
33 Guide part
34 Magnet
35 Microphone
36 Lens cover
100 Image data generation unit
101 Posture data generation unit
112 Imaging element unit
117 Storage unit
118 Communication unit
122 Control unit
126 Gyro sensor
127 Acceleration sensor
129 Light emitting unit
150 Information processing apparatus
162 Memory card
172 Fisheye distortion correction button
173 Blur correction button
174 Gravity direction correction button
390 Distortion correction processing unit
391 Blur correction processing unit
392 Gravity direction correction processing unit

The invention claimed is:

1. An imaging apparatus, comprising:
an imaging element configured to generate image data;
at least one sensor configured to generate posture data of a casing that includes the imaging element; and
a light source configured to notify, based on a trigger, correlation for the image data and the posture data, wherein
a light emission period of the light source is a time within one frame period of the generated image data, and
the imaging element is further configured to detect the notification of the correlation for the image data and the posture data.

2. The imaging apparatus according to claim 1, wherein the generated image data includes notification information that corresponds to information related to the notification of the correlation for the image data and the posture data.

3. The imaging apparatus according to claim 1, further comprising an optical system configured to emit subject light, wherein
the light source is further configured to expose an imaging region of the imaging element, and
the imaging region of the imaging element is out of an incident range of the subject light.

4. The imaging apparatus according to claim 1, wherein the at least one sensor is further configured to generate, based on a frame synchronization signal, the posture data once per frame of the generated image data, and
the frame synchronization signal is asynchronous with the imaging element.

5. The imaging apparatus according to claim 1, wherein the at least one sensor is further configured to generate, based on a frame synchronization signal, the posture data at least once per frame of the generated image data, and
the frame synchronization signal is common with the imaging element.

6. The imaging apparatus according to claim 1, wherein the at least one sensor is further configured to generate the posture data a plurality of times per frame period of the generated image data.

7. The imaging apparatus according to claim 6, wherein, in a case the generated image data is an intermittent frame moving image, the at least one sensor is further configured to set a number of times of the generation of the posture data in one frame period smaller in an ineffective frame period than a number of times of the generation of the posture data in one frame period in an effective frame period.

8. The imaging apparatus according to claim 1, wherein, in a case of the generated image data is an intermittent frame moving image, the at least one sensor is further configured to generate the posture data in both an effective frame period and an ineffective frame period.

9. The imaging apparatus according to claim 1, wherein the at least one sensor is further configured to add information to the posture data based on a frame synchronization signal.

10. The imaging apparatus according to claim 1, wherein the at least one sensor includes a gyro sensor.

11. The imaging apparatus according to claim 1, wherein the at least one sensor includes an acceleration sensor.

12. The imaging apparatus according to claim 1, wherein the trigger is based on a user operation.

13. The imaging apparatus according to claim 1, wherein each of the generation of the image data and the generation of the posture data corresponding to the image data is based on a common trigger.

14. The imaging apparatus according to claim 1, wherein each of the generation of the image data and the generation of the posture data corresponding to the image data is based on different triggers.

15. The imaging apparatus according to claim 1, further comprising a controller configured to switch, based on the notification, an exposure time of the imaging element between a first range and a second range, wherein a longest exposure time of the second range is shorter than a longest exposure time of the first range.

16. The imaging apparatus according to claim 15, wherein the controller is further configured to adjust, based on the switch of the exposure time to the second range, gain of an imaging signal, and
a gain maximum value in the second range is higher than a gain maximum value in the first range.

17. An imaging apparatus, comprising:
an imaging element configured to generate image data;
at least one sensor configured to generate posture data of a casing that includes the imaging element;
an optical system configured to emit subject light; and
a light source configured to:
notify, based on a trigger, correlation for the image data and the posture data; and
expose an imaging region of the imaging element, wherein
the imaging element is further configured to detect the notification of the correlation for the image data and the posture data, and
the imaging region of the imaging element is out of an incident range of the subject light by the optical system.

18. The imaging apparatus according to claim 17, wherein the generated image data includes notification information that corresponds to information related to the notification of the correlation for the image data and the posture data.

19. An imaging apparatus, comprising:
an imaging element configured to generate image data;
at least one sensor configured to generate posture data of a casing that includes the imaging element; and
a light source configured to notify, based on a trigger, correlation for the image data and the posture data, wherein
the imaging element is further configured to detect the notification of the correlation for the image data and the posture data,
the posture data of the casing is generated a plurality of times per frame period of the generated image data, and
in a case the generated image data is an intermittent frame moving image, the at least one sensor is further configured to set a number of times of the generation of the posture data in one frame period in an ineffective frame period smaller than a number of times of the generation of the posture data in one frame period in an effective frame period.

20. The imaging apparatus according to claim 19, wherein the generated image data includes notification information that corresponds to information related to the notification of the correlation for the image data and the posture data.

* * * * *